(12) United States Patent
Wittenbreder

(10) Patent No.: US 6,304,065 B1
(45) Date of Patent: Oct. 16, 2001

(54) POWER ELECTRONIC CIRCUITS WITH ALL TERMINAL CURRENTS NON-PULSATING

(75) Inventor: Ernest H. Wittenbreder, Flagstaff, AZ (US)

(73) Assignee: Technical Witts, Inc., Flagstaff, AZ (US)

( * ) Notice: Subject to any disclaimer, the term of this patent is extended or adjusted under 35 U.S.C. 154(b) by 0 days.

(21) Appl. No.: 09/798,419

(22) Filed: Mar. 2, 2001

(51) Int. Cl.[7] ............................................. G05F 1/24
(52) U.S. Cl. .............................. 323/259; 323/225; 363/40
(58) Field of Search .................................... 323/222, 223, 323/224, 225, 259, 262, 271, 282, 284; 363/16, 24, 40, 41, 131, 133, 134

(56) References Cited

U.S. PATENT DOCUMENTS 5,977,754 * 11/1999 Cross ..................................... 323/222
6,198,260 * 3/2001 Wittenbreder ......................... 323/271
6,232,752 * 5/2001 Bissell ................................... 323/225

* cited by examiner

Primary Examiner—Jessica Han

(57) ABSTRACT

Three terminal PWM DC to DC converter networks which accomplish both non-pulsating input and non-pulsating output currents using a single simple coupled inductor is revealed. The DC to DC converter networks accomplish buck, boost, buck boost (flyback), buck complement, boost complement, or flyback complement (SEPIC) conversion using a simple circuit requiring only two switches, one of which may be a simple diode rectifier, one or two capacitors, and three or four inductors, which may be co-located on a single common magnetic core. Also revealed are techniques to accomplish isolation, high order (quadrature) transfer functions, methodology for reducing current ripple to near zero levels at all terminals simultaneously, and methodology for generalizing the process of changing three terminal networks with pulsating terminal currents into three terminal networks with non-pulsating terminal currents.

12 Claims, 44 Drawing Sheets

POWER ELECTRONIC CIRCUITS WITH ALL TERMINAL CURRENTS NON-PULSATING

BACKGROUND OF THE INVENTION

1. Field of the Invention

The subject invention generally pertains to electronic power conversion circuits, and more specifically to high frequency, switched mode power electronic converter circuits.

2. Description of Related Art

There are some power conversion circuits which accomplish power conversion from one DC voltage level to another DC voltage level using an intermediate energy storage mechanism such as a power inductor. Examples of such power conversion circuits include the buck, boost, and buck boost (flyback) converters which are well known to those skilled in the art of power conversion. These converters are simple, requiring only one large magnetic storage element, the power inductor, and two switches. Typically input and output capacitors are added to the basic circuit. For isolated power conversion an isolation transformer or a coupled inductor is required in addition to or instead of the power inductor. One problem associated with practical non-isolated power conversion circuits that employ the buck, boost, or buck boost (flyback) converters is that either the input current, the output current, or both the input and output current are pulsating, that is discontinuous. The pulsating currents result in high ripple currents and high ripple voltages by comparison to inputs or outputs in which the input or output current is continuous or non-pulsating. In order to reduce the effects of the pulsating currents an additional filter stage using an additional inductor and capacitor, or LC combination, or the use of a much larger input and/or output capacitor is required. The consequence of the additional filtering is higher cost and, in the case of the LC filter, higher losses. For example, the buck converter has a pulsating (discontinuous) input current and a non-pulsating (continuous) output current. Power supplies that use buck converters often employ an LC input filter to reduce the ripple resulting from the pulsating input current. One specific example is the Datel dual output BMP models which use a buck post regulator with an LC input filter to generate a second power supply output. The BMP models employ the main output of the power supply as the input to the buck post regulator. If they did not use an input LC filter with the buck post regulator the pulsating input current of the buck post regulator would compromise the ripple performance of the converter's main output. One example of prior art that overcomes the problem is the famous Cuk converter, shown in FIG. 1. The Cuk converter circuit is optimal in the sense that both the input current and output current are non-pulsating. One of the likely reasons that the Cuk converter was not chosen in the Datel design is that the non-isolated Cuk converter has an output voltage that is opposite in sign to its input. Another shortcoming of the Cuk converter is that its control to output transfer function has a right half plane zero which, in practical terms, limits the available bandwidth, which in some cases, especially where fast load current transient response is a requirement, renders the Cuk converter unsuitable. Cuk, in a paper included in his book entitled "Advances in Switched-Mode Power Conversion" on page 319 explains how the re-orientation or rotation of the switching cell in the Cuk converter leads to buck and boost converters with continuous input and output currents. The continuous input and output current buck and boost converters that Cuk describes in his book on page 319 are simply the well known buck converter with an LC input filter and the well known boost converter with an LC output filter, respectively. The Datel design is then the buck implementation of the Cuk converter as described by Cuk in his own writings. The same process of generating continuous input and output current buck and boost converters from the Cuk switching cell is also described in a recent book by Robert Erickson entitled "Fundamentals of Power Electronics" on pages 141 and 142. In Erickson's book he describes a process for generating the buck and boost forms of the Cuk converter similar to the process described by Cuk with identical results. There is one important feature of the Cuk converter which is missing in the buck and boost derivations described by Cuk and Erickson. The Cuk described buck and boost derivations both require two separate inductors which cannot be magnetically coupled. This requirement is due to the fact that the AC wave forms of the two inductors are dissimilar, whereas the AC wave forms of the two inductors in the Cuk converter are very similar or identical at all times which enables the combination of the two chokes of the Cuk converter in a single simple magnetically coupled inductor construction. In general two inductors in the same circuit can be coupled on a single magnetic core if the ratio of the winding voltages are always proportional or nearly proportional to the ratio of the turns of the two inductors. In the non-pulsating buck and boost converters described by Cuk and Erickson one of the chokes has a large AC winding voltage component and the other has a very small AC winding voltage component. In the same book by Cuk on page 337 Cuk describes how his optimal topology converter works when implemented with the two chokes combined in a single simple coupled inductor, as illustrated in FIG. 1. Several patents have been issued on the basic Cuk converter and the coupled inductor versions of the Cuk converter. Several patents have been issued on zero ripple variations of the Cuk converter. These patents describe simple methods to reduce or null the ripple at one terminal and more complex means to achieve zero ripple at both input and output terminals. What is needed are simple optimal topology converters in which the two inductors can be combined into a single simple magnetically coupled inductor and can accomplish step up or step down DC to DC conversion without inversion or isolating transformer. What is also needed is a less complex converter topology that can achieve zero ripple at both input and output terminals. By achieving zero ripple at both input and output terminals one can reduce the inductance of the coupled inductor and achieve superior transient response, lower cost, and lower EMI simultaneously. Such an optimal topology converter in the buck form would reduce the size and cost of converters of the Datel BMP type by combining the two inductors into a smaller simple single coupled magnetic circuit element. Such an optimal topology converter in the boost form would satisfy a need for converters similar to the Datel BMP type, but where the main output voltage is lower than the voltage of the second output. The boost form would also find application in power factor correction circuits.

Consider the Cuk converter of FIG. 2. Here we emphasize that the Cuk converter can be considered to be a three terminal network. The fact that the input terminal contains a series inductor suggests that the Cuk converter's input terminal current will be non-pulsating. The output terminal also contains a series inductor so the output terminal current of the Cuk converter will also be non-pulsating. FIG. 3 also illustrates a three terminal network. Let the FIG. 3 network be a single pole double throw (SPDT) switch which is pulse width modulated (PWM). We will assume that either S1 is closed or S2 is closed but not both at the same time. We can develop a simple relationship between the terminal voltages which we will call the unified PWM SPDT transfer function. This relationship is $$V_C = V_B + D \cdot (V_A - V_B) \quad (1)$$

where $V_A$ is the average A terminal voltage, $V_B$ is the average B terminal voltage, $V_C$ is the average C terminal voltage, and D is the duty cycle of the S1 switch. Suppose that there are voltage sources connected to both the A and B terminals of FIG. 3. The voltage at the C terminal will be a square wave whose average voltage is given by equation (1), but which has a large AC component. If we wanted to attach a load at the C terminal that required a DC voltage we could filter the C terminal voltage. A capacitor connected to ground provides a filtering function that will reduce the AC component, but placing a capacitor connected to ground will create higher currents and high stress in real world S1 and S2 switches. To avoid this problem power conversion engineers place an inductor in the C terminal, as illustrated in FIG. 4. The FIG. 4 circuit provides a basic three terminal PWM conversion network. The equation (1) still applies to the average terminal voltages because the addition of the inductor does nothing to change the average terminal voltages. An ideal inductor is a DC short circuit and an AC impedance so that the DC voltage on either side of the inductor in FIG. 4 is the same.

By connecting the A terminal to an input DC source $V_{IN}$, connecting the B terminal to ground or zero volts, and connecting the C terminal to a load whose voltage is $V_{OUT}$ we create a buck converter and the unified PWM SPDT transfer function, equation (1), reduces to $V_{OUT} = D \cdot V_{IN}$, which is the well known transfer function for a buck converter. Alternately, if we connect the input DC source to the C terminal, ground to the B terminal, and connect the load to the A terminal then the unified PWM SPDT transfer function reduces to $$V_{OUT} = \frac{V_{IN}}{D} = \frac{V_{IN}}{(1-D')},$$

where D' is the duty cycle of the S2 switch and D+D'=1. Alternately, if we connect the A terminal to the input DC source, the C terminal to ground, and the B terminal to the load, applying the unified PWM SPDT transfer function yields the result $$V_{OUT} = -\frac{D \cdot V_{IN}}{(1-D)},$$

which is the well known result for the buck boost (flyback) converter. We have shown that a single unified PWM SPDT transfer function applies to all three basic converter types when applied to a generic PWM SPDT three terminal conversion network.

In the parent patent application it was shown that the FIG. 5 circuit, a variation of the FIG. 4 circuit, can yield converters with buck and boost transfer functions. FIG. 5 represents another general PWM SPDT power conversion network to which the unified PWM SPDT transfer function applies. Consider the average voltage at the terminals of the C1 capacitor. The positive terminal is connected through an inductor to the A terminal. The average or DC voltage across L_A will be zero so the average voltage at the positive terminal of C1 will be $V_A$. Similarly the average voltage at the negative terminal will be $V_B$ because the negative terminal of C1 is connected to the B terminal through an inductor whose DC voltage is zero. The average terminal voltages of our SPDT switch are the same in the FIG. 5 circuit as they are in the FIG. 4 circuit. The buck boost (flyback) form of the FIG. 5 circuit is the well known Cuk converter.

OBJECTS AND ADVANTAGES

One object of the subject invention is to provide simple DC to DC power conversion circuits with both continuous input current and continuous output current using a single simple magnetically coupled inductor.

Another object of the subject invention is to provide a simple non-inverting optimal topology step down DC to DC power conversion circuit without a right half plane zero in the control to output transfer function.

Another object of the subject invention is to provide a simple non-inverting optimal topology step up DC to DC power conversion circuit.

Another object of the subject invention is to provide a simpler circuit topology that can achieve zero ripple at all terminals with buck, boost, or buck boost (flyback) transfer functions, thereby enabling converters with smaller cheaper inductors and capacitors and converters with superior transient response and superior EMI performance.

Another object of the subject invention is to provide single active switch quadrature converters with non-pulsating terminal currents for applications with wide input or output voltage ranges.

Another object of the subject invention is to provide boost complement, flyback complement, and buck complement converters with non-pulsating terminal currents.

Figure 1:
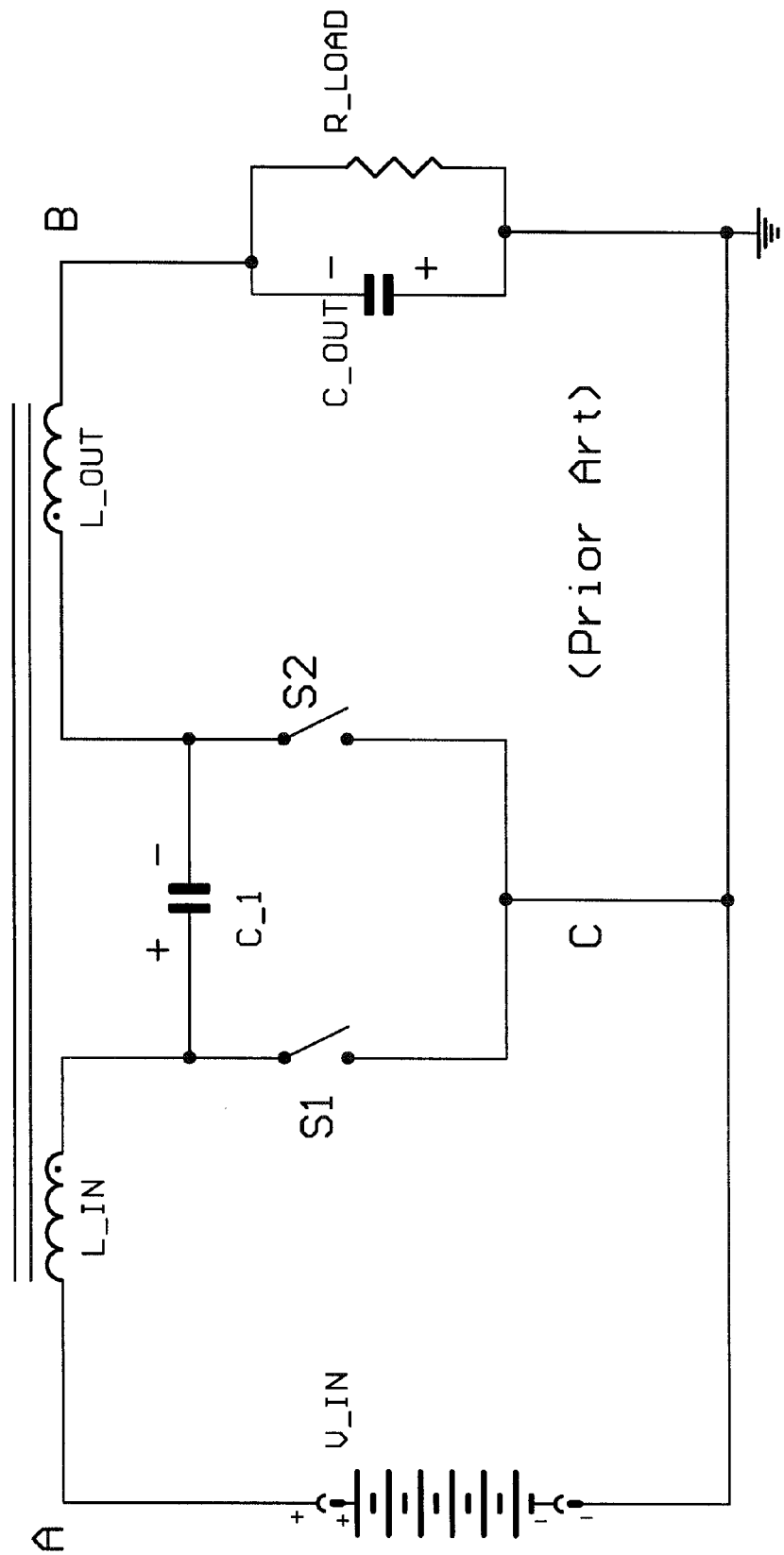
FIG. 1 illustrates a Cuk converter with coupled magnetics.
Figure 2:
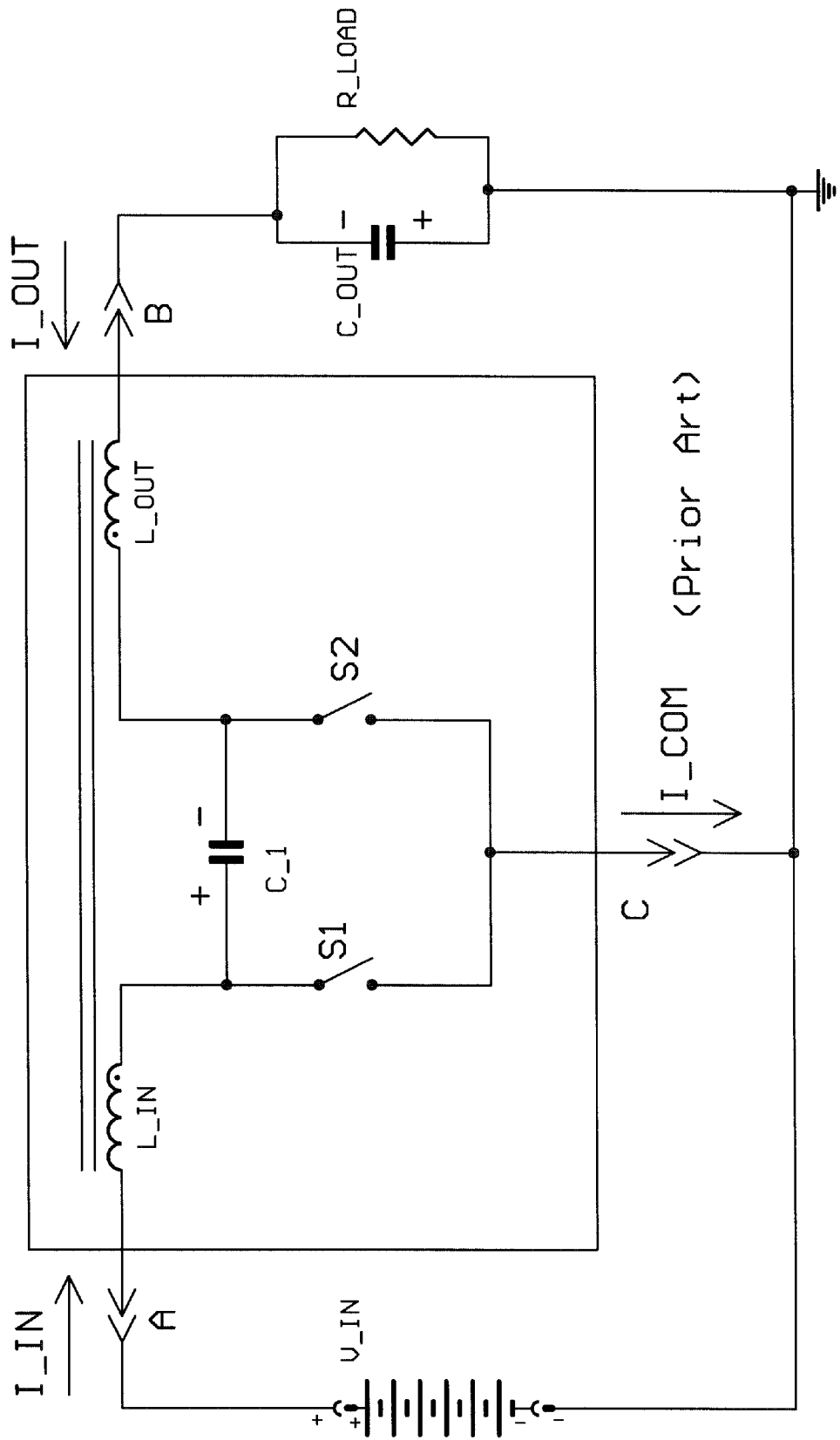
FIG. 2 illustrates a Cuk converter with coupled magnetics as a three terminal network.

| Reference Numerals | |
|---|---|
| 100 terminal | 101 terminal |
| 102 terminal | 103 inductor |
| 104 inductor | 105 inductor |
| 106 node | 107 node |
| 108 switch | 109 switch |
| 110 capacitor | 111 node |
| 200 terminal | 201 terminal |
| 202 terminal | 203 inductor |
| 204 inductor | 205 inductor |
| 206 switch | 207 switch |
| 208 capacitor | 209 capacitor |
| 210 node | 211 node |
| 212 node | 213 node |
| 300 terminal | 301 terminal |
| 302 terminal | 303 inductor |
| 304 inductor | 305 inductor |
| 306 switch | 307 switch |
| 308 capacitor | 309 capacitor |
| 310 node | 311 node |
| 312 node | 313 node |
| 314 inductor | |

SUMMARY

The subject invention uses coupled multiple inductors arranged so that their AC winding voltages are always proportional to their turns, a pair of switches, and one or two coupling capacitors to achieve buck, boost, buck boost (flyback), buck complement, boost complement, and flyback complement converters with non-pulsating input and output terminal currents. The most preferred embodiments couple all of the inductors on a common core so that only one magnetic circuit element is required. Embodiments that provide wide input and output voltage ranges and zero ripple terminal currents are also described.

DESCRIPTION OF THE PREFERRED EMBODIMENTS

PWM SPDT Three Terminal Network With Three Inductors

Figure 6:
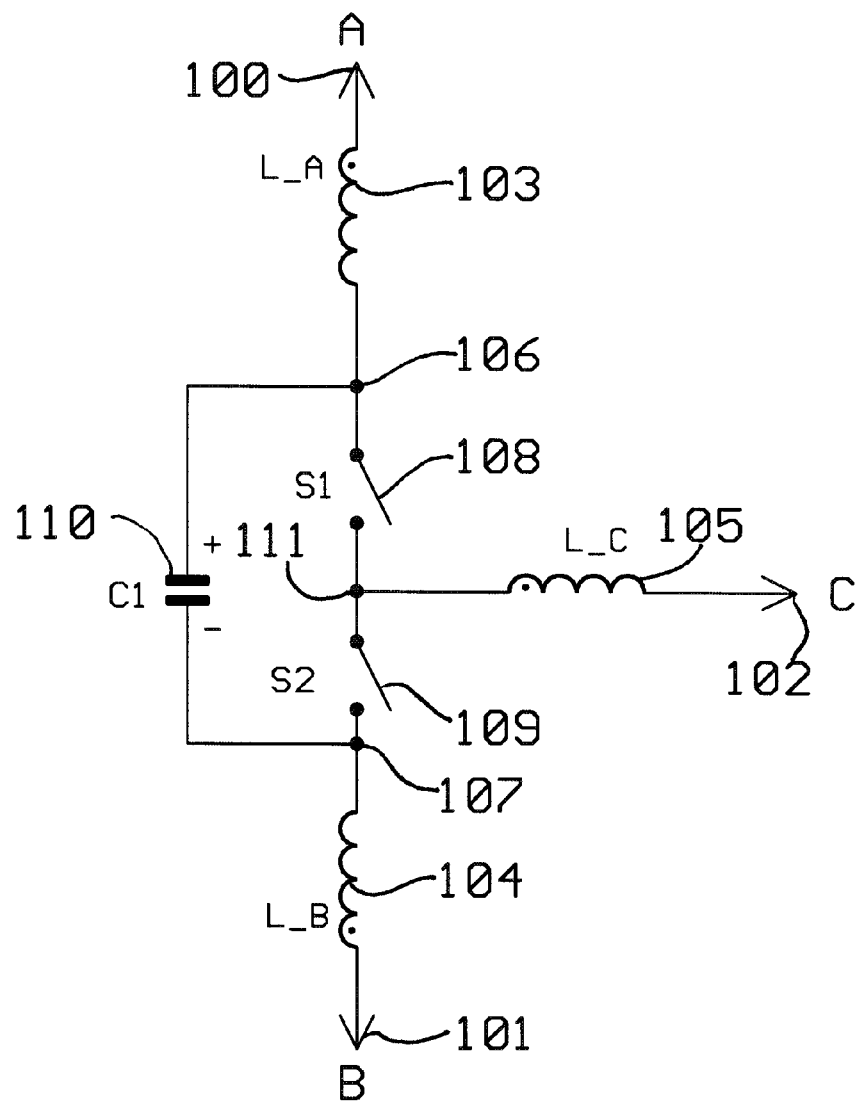
FIG. 6 illustrates a three terminal PWM SPDT converter network similar to the FIG. 5 network but with three inductors.

FIG. 6 illustrates a three terminal network which is a PWM SPDT power conversion network to which the unified PWM SPDT transfer function applies. The conversion network contains three inductors, a capacitor and a pair of switches that function as a single PWM SPDT switch, as described above for the prior art. The circuit achieves non-pulsating terminal currents for all terminals. This fact is apparent based on the fact that each terminal contains a series inductor. The three terminals are connected to two voltage sources and a load. One of the voltage sources may be ground. No restrictions are imposed on which terminals are connected to which sources or which terminal is connected to the load.

Referring to FIG. 6 there is shown a three terminal PWM SPDT power conversion network in which input DC voltages are converted into an output DC voltage. The circuit requires a pair of input sources, one of which may be ground, of substantially DC voltage, three inductors, a pair of switches, and a capacitor coupling two of the inductors and the switches. For purposes of the operational state analysis, it is assumed that the coupling capacitor is sufficiently large that the voltage developed across the capacitor is approximately constant over a switching interval and equal to the difference in voltage between two of the terminal voltages. We will also assume for purposes of analysis that the inductors are large so that the current in the inductors is invariant over a switching cycle. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction.

Structure

The structure of the circuit of the subject invention is shown in FIG. 6. A first network terminal 100 is connected to a dotted terminal of an inductor 103. An undotted terminal of inductor 103 is connected to a node 106. The node 106 is connected to a first terminal of a capacitor 110 and to a first terminal of a switch 108. A second terminal of switch 108 is connected to a node 111. A second terminal of capacitor 110 is connected to a node 107. A first terminal of a switch 109 is connected to node 107. A second terminal of switch 109 is connected to node 111. An undotted terminal of an inductor 104 is connected to node 107. A dotted terminal of inductor 104 is connected to a second network terminal 101. A dotted terminal of an inductor 105 is connected to the node 111. An undotted terminal of inductor 105 is connected to a third network terminal 102.

Operation

Figure 7:
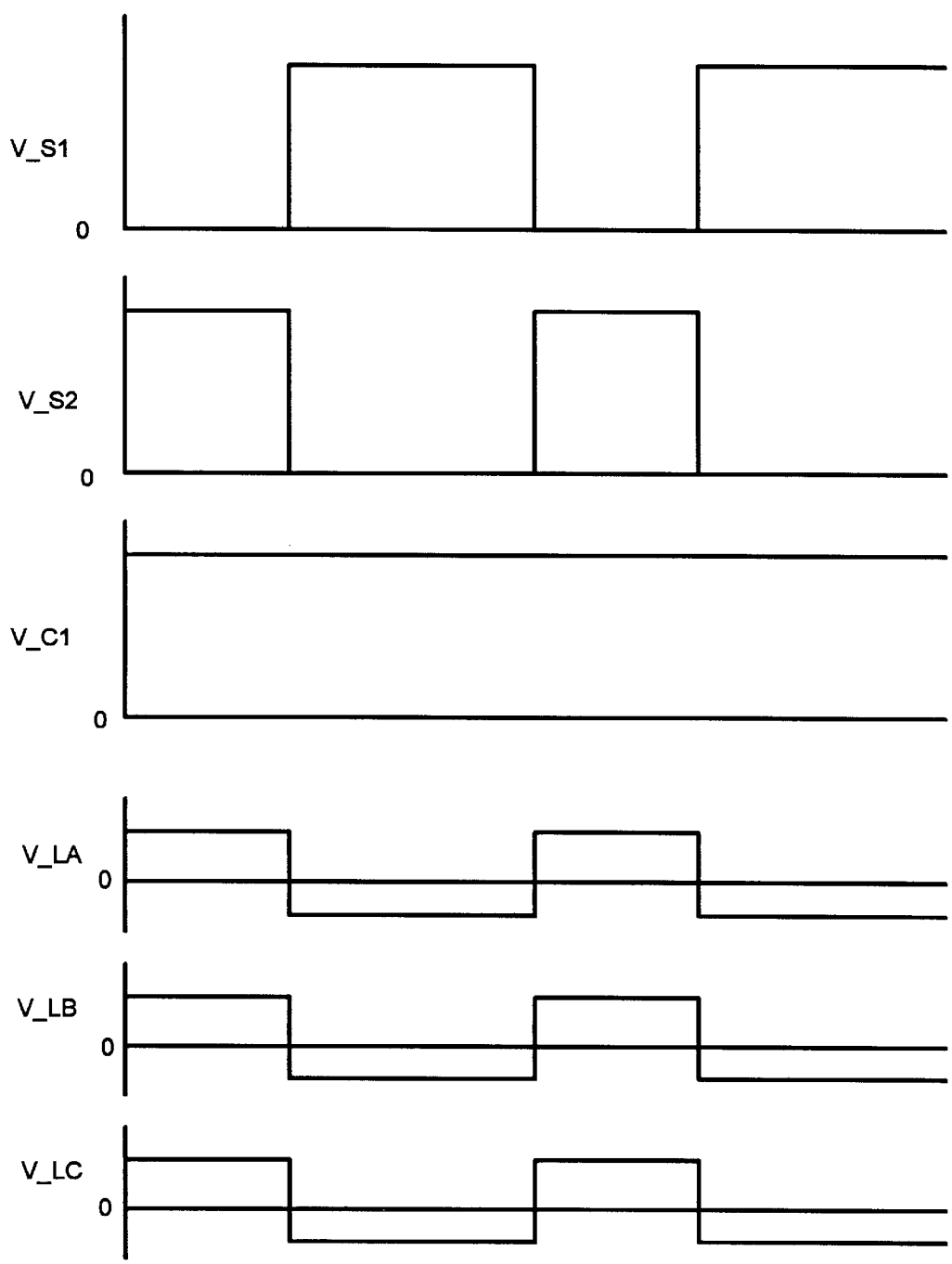
FIG. 7 illustrates the voltage wave forms for each component of the FIG. 6 circuit.
Figure 8:
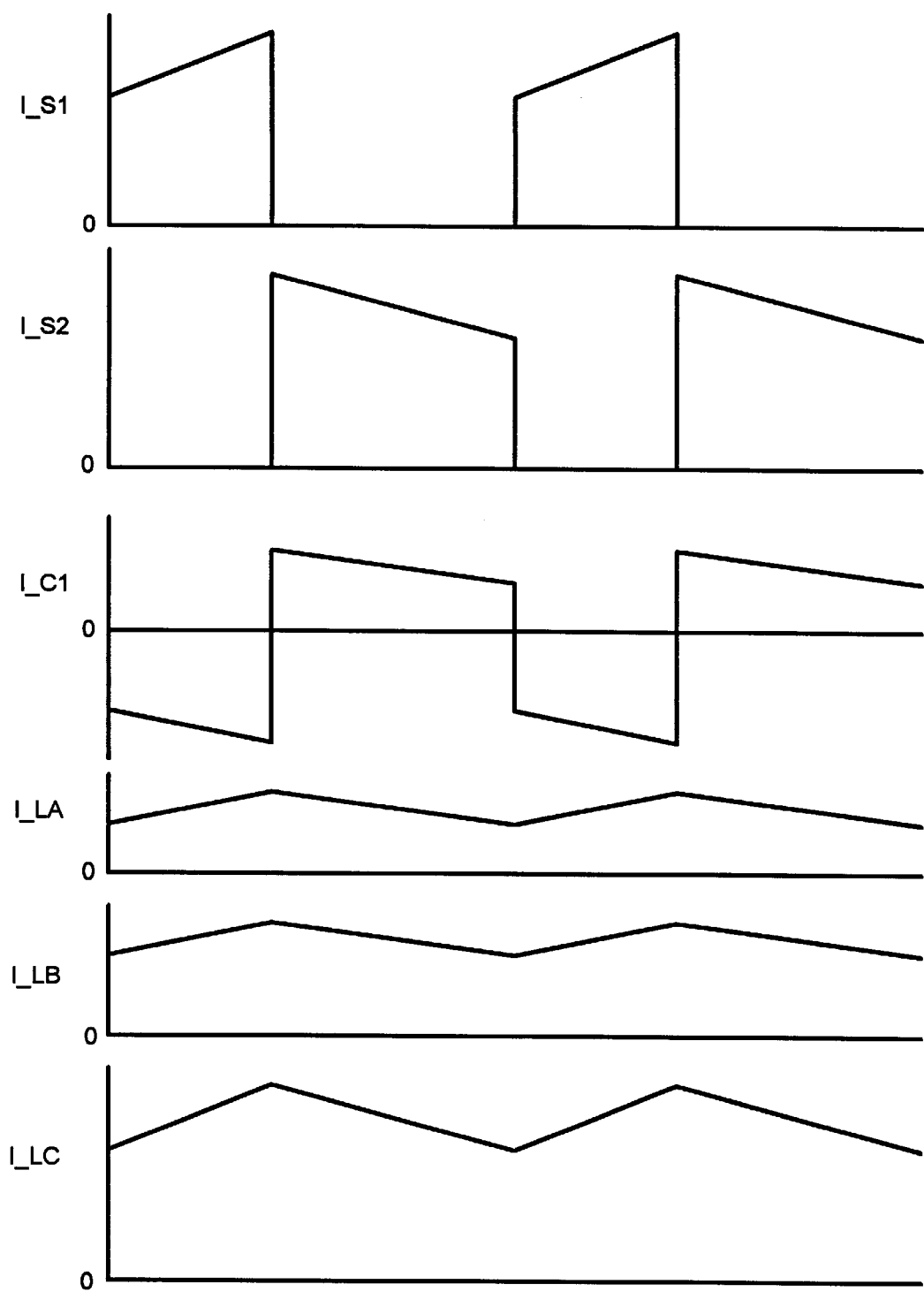
FIG. 8 illustrates the current wave forms for each component of the FIG. 6 circuit.
Figure 9:
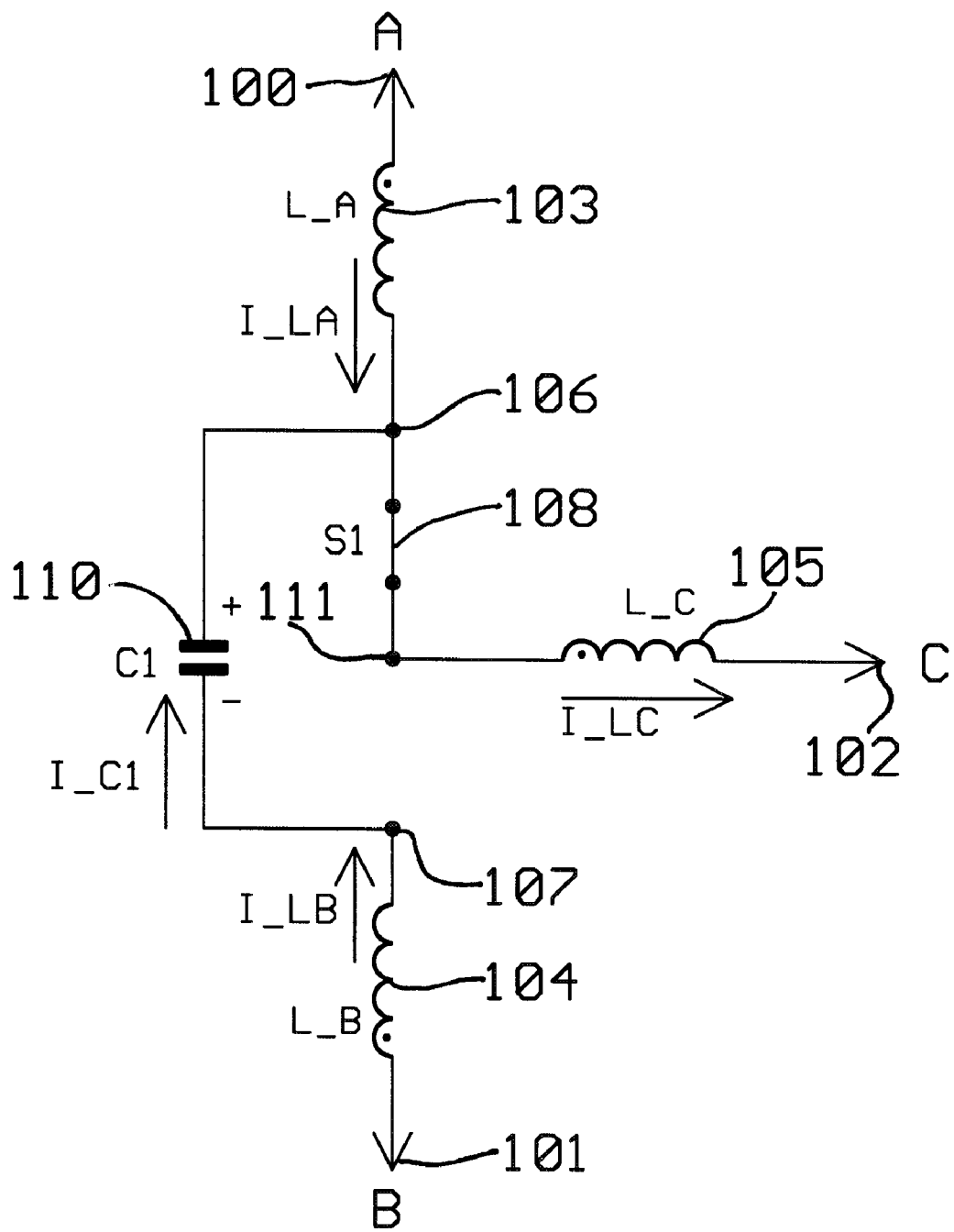
FIG. 9 illustrates an on state of the FIG. 6 circuit.

It is assumed in this analysis that the system has reached a settled operating condition. Except for the short, but finite, switching intervals there are two states of the circuit of FIG. 6, an on state and an off state. We will assume for the operational state analysis that the A first network terminal 100 voltage is more positive than the C third network terminal 102 voltage is greater than the B second terminal 101 voltage. The applied voltage to the capacitor 110, $V_{C1}$, will be equal to the voltage difference between the A first network terminal 100 voltage, $V_A$ and the B second terminal 101 voltage, $V_B$, or $V_{C1}=V_A-V_B$. This results from the fact that the terminals of the capacitor 110 are connected to the first and second network terminals 100 and 101 through inductors 103 and 104, whose average applied voltage is zero. Consider an initial condition as illustrated in FIG. 9. The initial condition represents the on state. During the initial condition the switch 108 is on (closed) and the switch 109 is off (open). The voltage wave forms for each component are illustrated in FIG. 7. The current wave forms for each component are illustrated in FIG. 8. The current in the inductor 103, $I_{LA}$, is flowing from top to bottom into the dotted terminal and out of the undotted terminal. The current in the inductor 104, $I_{LB}$, is flowing from bottom to top into the dotted terminal and out of the undotted terminal. The current in the inductor 105, $I_{LC}$, is flowing from left to right into the dotted terminal and out of the undotted terminal. The current in all three inductors will be increasing in value during the on state. Since the switch 109 is off (open) the current in the capacitor 110 will be equal to the current in the inductor 104, $I_{LB}$, discharging the capacitor 110. The current in the first switch 108 will be equal to the sum of the currents in the first and second inductors 103 and 104, or $I_{LA}$ plus $I_{LB}$, which is also equal to the current in the third inductor 105, $I_{LC}$. The voltage of the undotted terminal of inductor 105 is equal to the third network terminal 102 voltage. The voltage at the first (positive) terminal of capacitor 110 will be intermediate between the voltage at the A first network terminal 100 and the C third network terminal 102. For each inductor the dotted terminal voltage will be more positive than the undotted terminal voltage during the on state.

Figure 10:
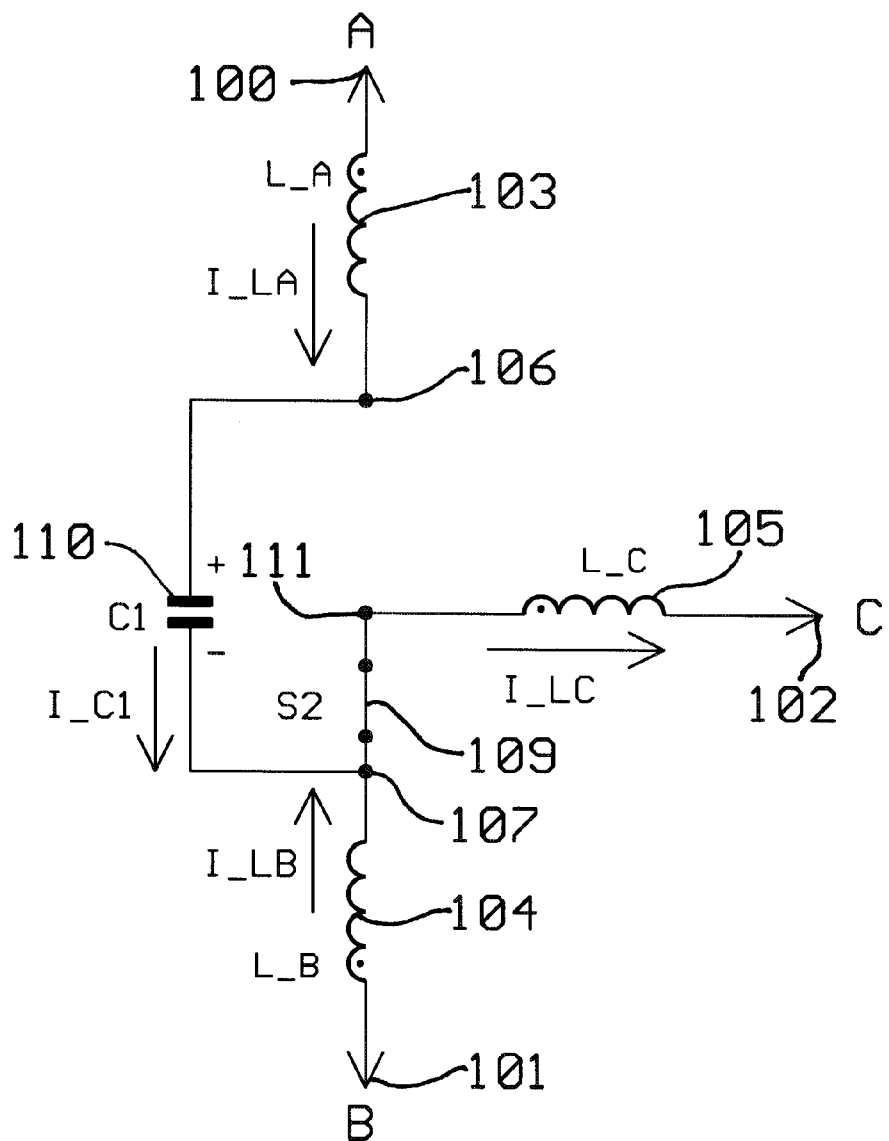
FIG. 10 illustrates an off state of the FIG. 6 circuit.

At a time determined by the control circuit the switches change state so that the S1 switch 108 is off (open) and the S2 switch 109 is on (closed) and the network enters the off state illustrated in FIG. 10. During the off state the currents in all three inductors decrease. With the S1 switch 108 open the first inductor 103 current, $I_{LA}$, flows in the capacitor 110 charging the capacitor 110. The S2 switch 109 current will be equal to the sum of the first and second inductor, 103 and 104, currents, $I_{LA}$ plus $I_{LB}$, and equal to the third inductor 105 current, $I_{LC}$. The voltage at the second (negative) terminal of the capacitor 110 will be intermediate between the voltages at the B second network terminal 101 and the C third network terminal 102. For each inductor the dotted terminal voltage will be more negative than the undotted terminal voltage during the off state. When the inductors currents have ramped down to their values at the beginning of the on state the switches 108 and 109 change state again and the cycle repeats.

Figure 3:
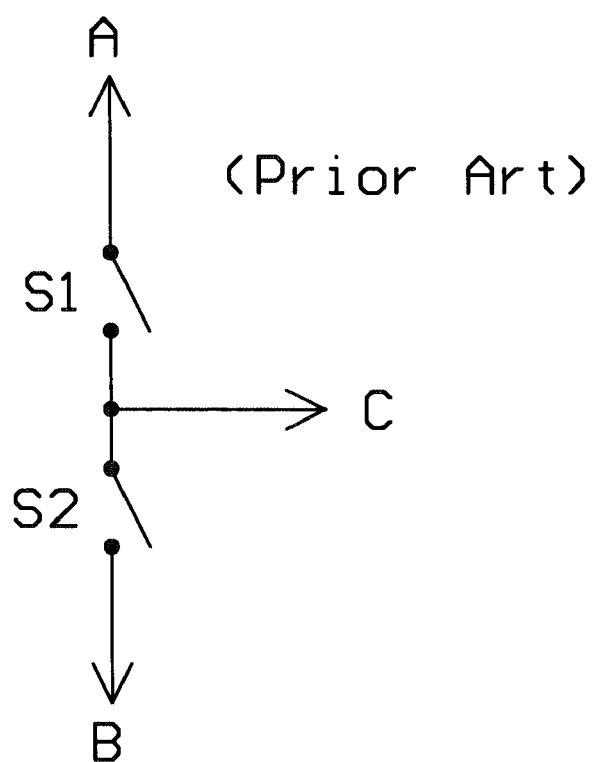
FIG. 3 illustrates a simple PWM SPDT switching cell.
Figure 4:
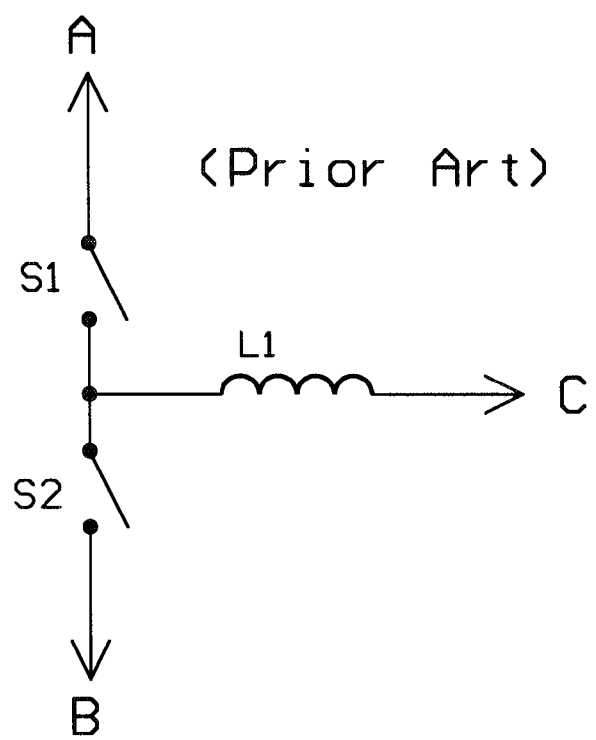
FIG. 4 illustrates the simple PWM SPDT three terminal network with an inductor placed in series with the C terminal.

Because each terminal of the three terminal network contains a series inductor each terminal current must be non-pulsating. In order for a terminal current to pulse, which implies an instantaneous step change in inductor current, there would have to be an infinite voltage applied to the subject inductor, which is impossible. The unified PWM SPDT transfer function applies to this network. One can argue this result by observing that the network of FIG. 6 is the same as the networks of FIGS. 4 and 5 with the addition of inductors whose average voltage is zero. With the inductors removed all three networks look like the FIG. 3 network. One can also prove that the unified PWM SPDT transfer function applies by applying Faraday's Law to any of the three inductors which requires that the volt second product sum for any inductor is zero over a full switching cycle.

Let us assume for operational analysis purposes that the inductors 103 and 104 are equal in value and that the inductor 105 is half the inductance of the other two inductors. We can assert that the voltage applied to the inductor 103 is always equal to the voltage applied to the inductor 104 because the voltage difference between the dotted terminals of the two inductors is always $V_A-V_B$ and the difference between the undotted terminals of the two inductors is always $V_{C1}=V_A-V_B$. Since the two inductors have the same inductance and the same applied voltages we can also say that $$\frac{dI_{LA}}{dt} = \frac{dI_{LB}}{dt}.$$

Since $I_{LC}=I_{LA}+I_{LB}$ it follows that $$\frac{dI_{LC}}{dt} = \frac{dI_{LA}}{dt} + \frac{dI_{LB}}{dt} = 2 \cdot \frac{dI_{LA}}{dt}.$$

We have assumed that $L_A=2 \cdot L_C$ so we can say that $$V_{LC} = L_C \cdot \frac{dI_{LC}}{dt} = \frac{1}{2}L_A \cdot \left(2 \cdot \frac{dI_{LA}}{dt}\right) = L_A \cdot \frac{dI_{LA}}{dt} = V_{LA}.$$

During the on state the applied voltage on the inductor 103, $V_{LA}$, plus the applied voltage on the inductor 105, $V_{LC}$, is just equal to the A first network terminal 100 voltage, $V_A$, minus the C third network terminal 102 voltage, $V_C$, or we can say that $$V_{LA} + V_{LC} = V_A - V_C \text{ or } V_{LA} = V_{LC} = \frac{1}{2}(V_A - V_C).$$

During the off state the difference in terminal voltages divides evenly between the inductor 104 and the inductor 105. For the off state we can say that $$V_{LA} = V_{LB} = V_{LC} = \frac{1}{2} \cdot (V_B - V_C).$$

Applying Faraday's Law to sum the volt second products for any of the inductors we get $$\frac{1}{2} \cdot (V_A - V_C) \cdot D \cdot T + \frac{1}{2} \cdot (V_B - V_C)(1 - D) \cdot T = 0,$$

where T is the switching period. Solving the last equation for $V_C$ yields the unified PWM SPDT transfer function which is equation (1).

$$V_C = V_B + D \cdot (V_A - V_B) \quad (1)$$

We already know that $$I_{LC} = I_{LA} + I_{LB}. \quad (2)$$

We also know the current in the capacitor 110 is $I_{LB}$ during the on time and $I_{LA}$ during the off time. In the steady state the net charge flow into the capacitor 110 must be zero so that $$I_{LB} \cdot D \cdot T - I_{LA} \cdot (1-D) \cdot T = 0. \quad (3)$$

combining equations (2) and (3) and solving for $I_{LB}$ and $I_{LA}$ yields $I_{LA}=D \cdot I_{LC}$ and $I_{LB}=(1-D) \cdot I_{LC}$.

Related Embodiments

Figure 11:
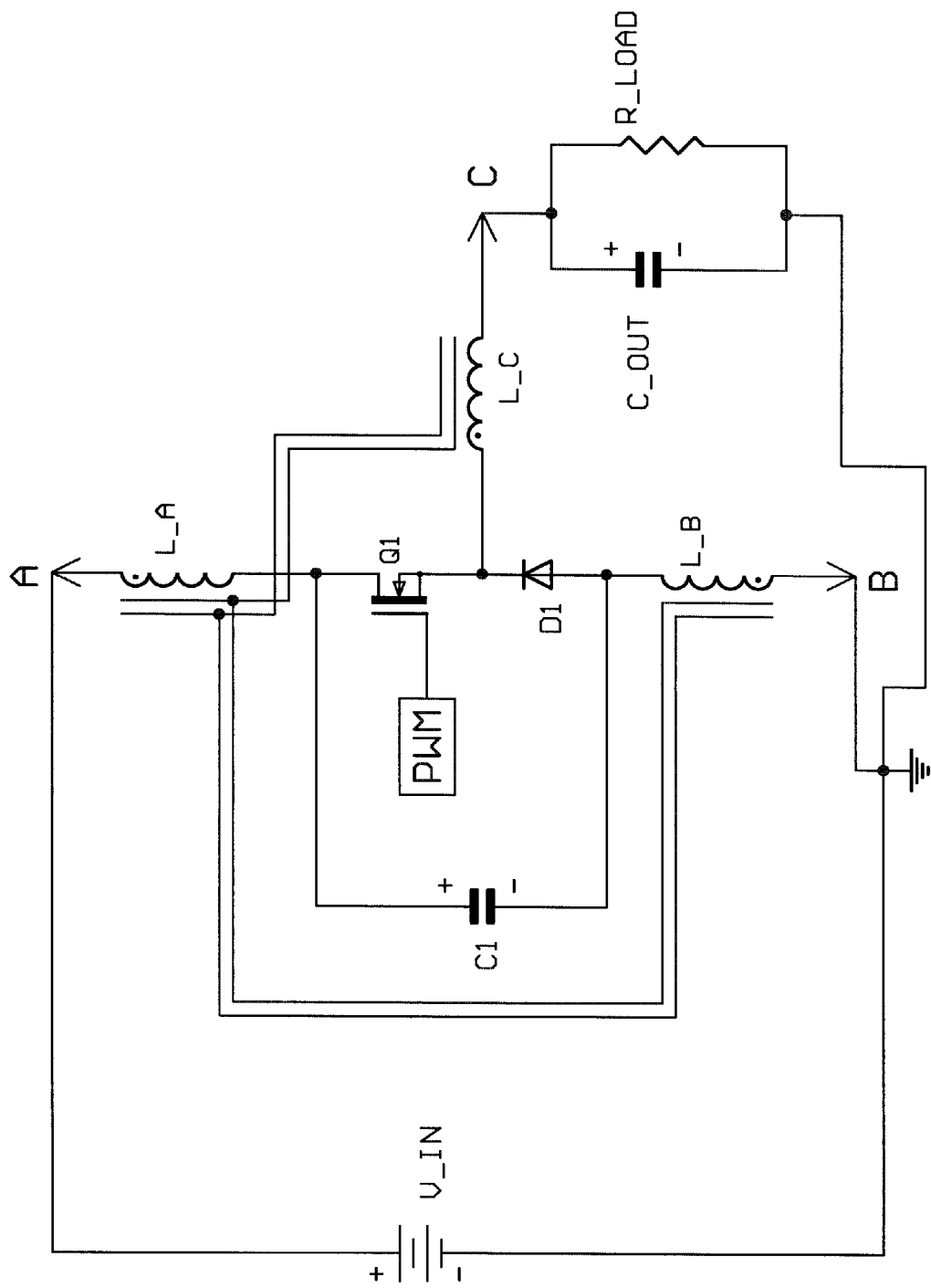
FIG. 11 illustrates a buck embodiment of the FIG. 6 circuit with all three inductors coupled on a single core and with the S1 switch implemented with a mosfet and the S2 switch implemented with a diode.

FIG. 11 illustrates a buck embodiment of the FIG. 6 circuit in which the S1 switch 108 is implemented with a power mosfet, the S2 switch 109 is implemented with a diode, and all three inductors are coupled on a single magnetic core. In general, inductors in the same circuit which have AC winding voltages that are proportional to their turns at all times can be coupled on a common core. This is the case with all three FIG. 6 inductors. With the three inductors coupled on a common core a single magnetic circuit element equivalent in size and performance to the inductor of the FIG. 4 circuit is realized. For example, if the number of turns for each winding is equal then with half of the window area allotted to the C winding and the remaining window area allotted to the other two windings weighted according to the DC currents in the other two windings and the winding inductance set to one quarter of the winding inductance of the FIG. 4 network, the resulting choke will have the same copper and core losses and equivalent electrical performance and the switch currents in the FIG. 4 circuit will be the same as the switch currents in the FIG. 11 circuit for the same source and load. The only significant difference then between the FIG. 4 and FIG. 11 circuits is that the FIG. 11 circuit achieves non-pulsating terminal currents at all terminals and the FIG. 4 circuit achieves non-pulsating terminal current at only one terminal. One might argue that the FIG. 11 circuit contains a capacitor that is not required in the FIG. 4 circuit, but for practical reasons almost all real world three terminal networks of the FIG. 4 type employ a capacitor equivalent to the FIG. 11 capacitor at the pulsating terminal(s) of the FIG. 4 network.

Figure 12:
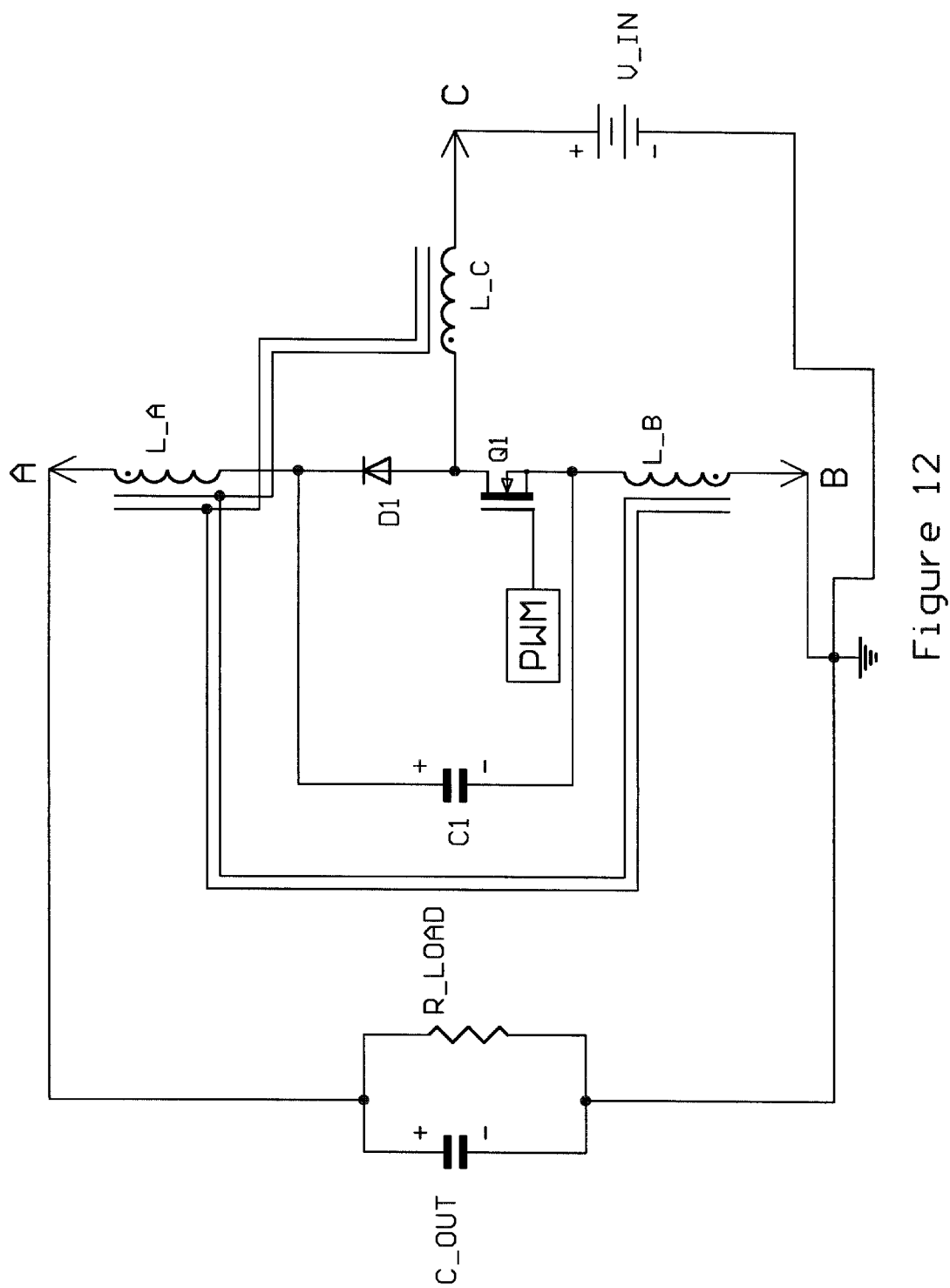
FIG. 12 illustrates a boost embodiment of the FIG. 6 circuit.

FIG. 12 illustrates a boost embodiment of the FIG. 6 circuit in which the Si switch 108 is implemented with a diode, the S2 switch 109 is implemented with a power mosfet, and all three inductors are coupled on a single magnetic core.

Figure 13:
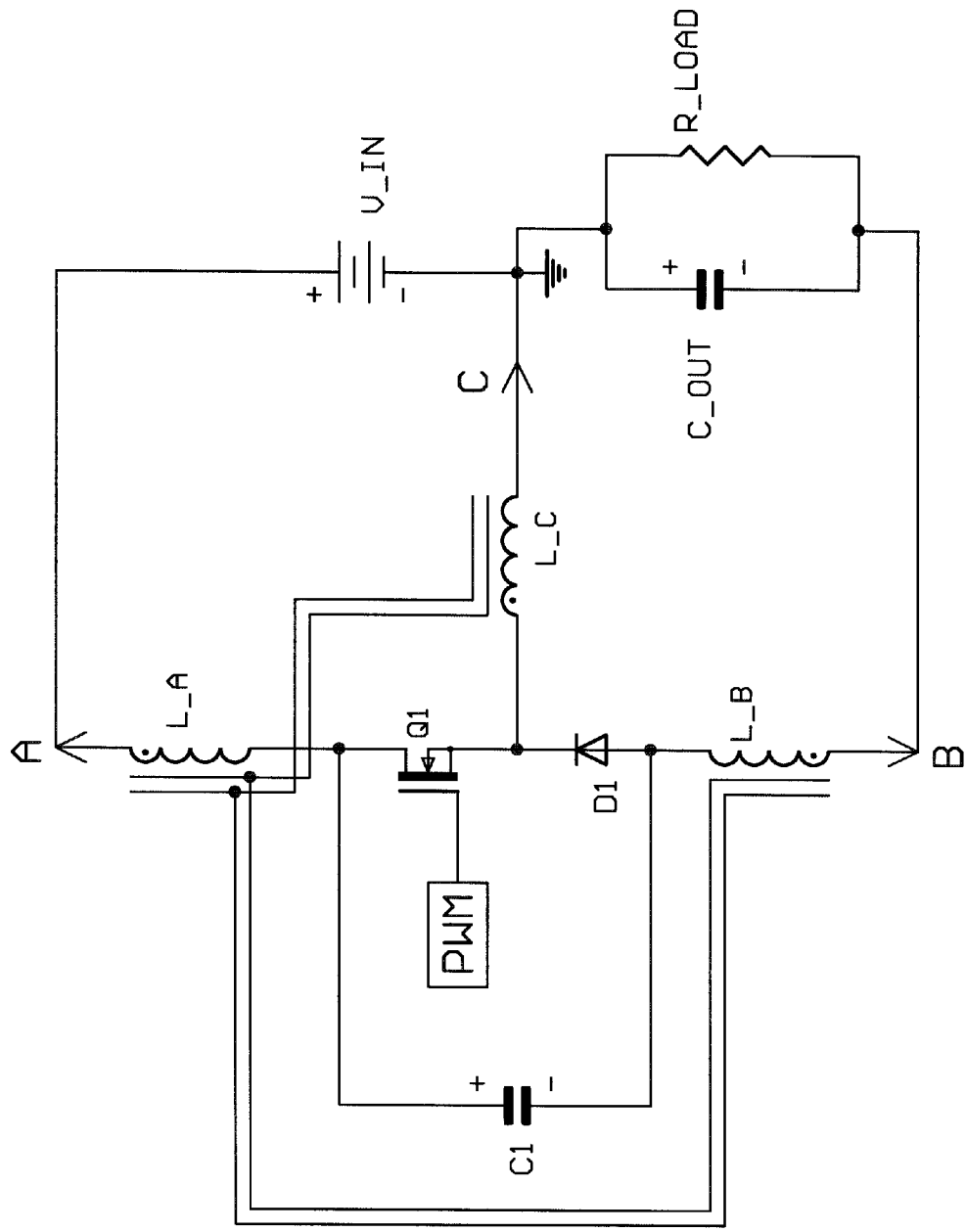
FIG. 13 illustrates a buck boost embodiment of the FIG. 6 circuit.

FIG. 13 illustrates a buck boost (flyback) embodiment of the FIG. 6 circuit in which the S1 switch 108 is implemented with a power mosfet, the S2 switch 109 is implemented with a diode, and all three inductors are coupled on a single magnetic core.

Figure 14:
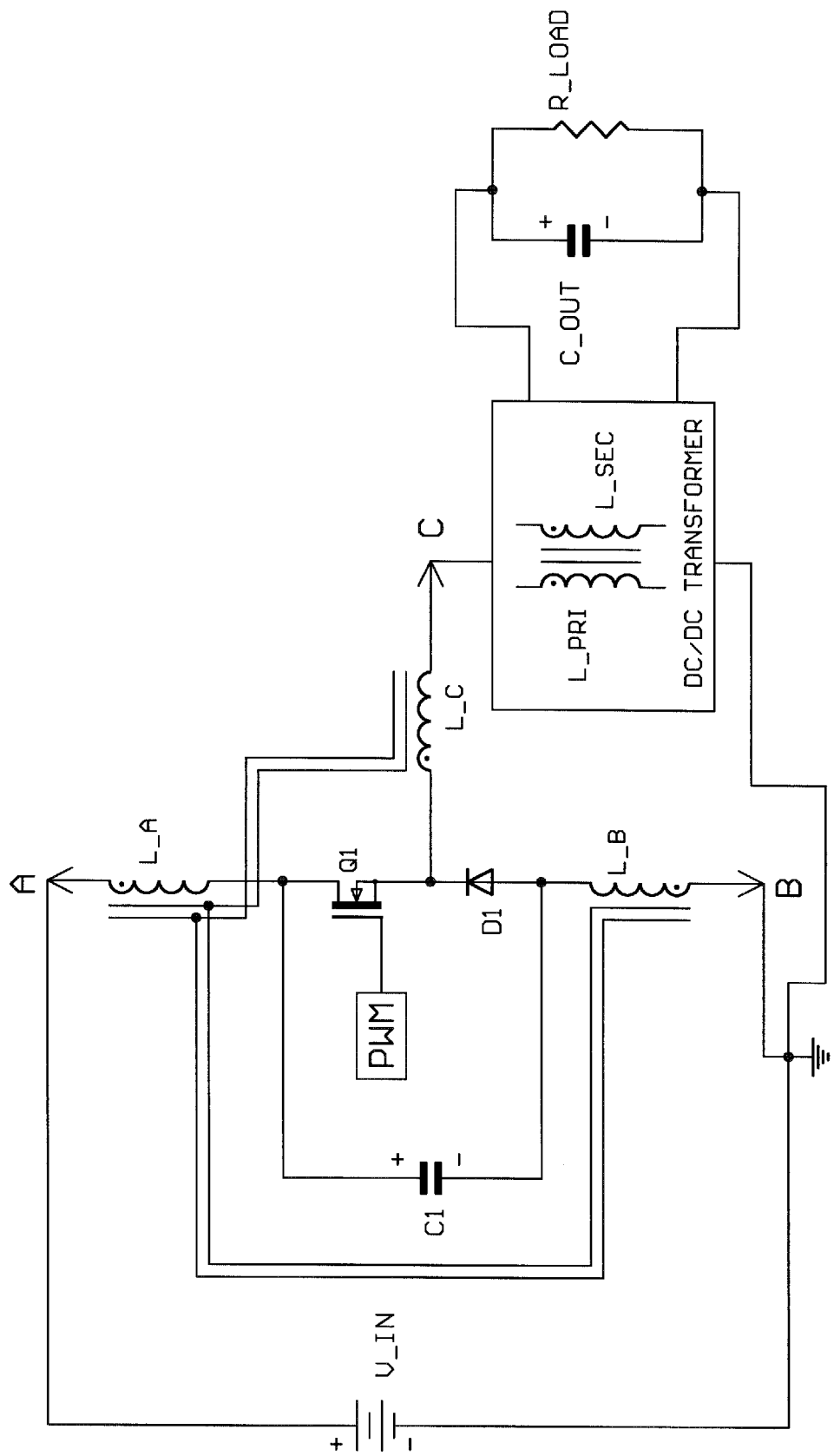
FIG. 14 illustrates a buck form of the FIG. 6 circuit with a DC/DC transformer circuit placed at the C terminal to provide load isolation and scaling.

FIG. 14 illustrates an other embodiment of the FIG. 6 circuit in which all three inductors are combined on a single magnetic core and a DC/DC transformer circuit is added at the C terminal to provide load isolation and scaling.

Figure 15:
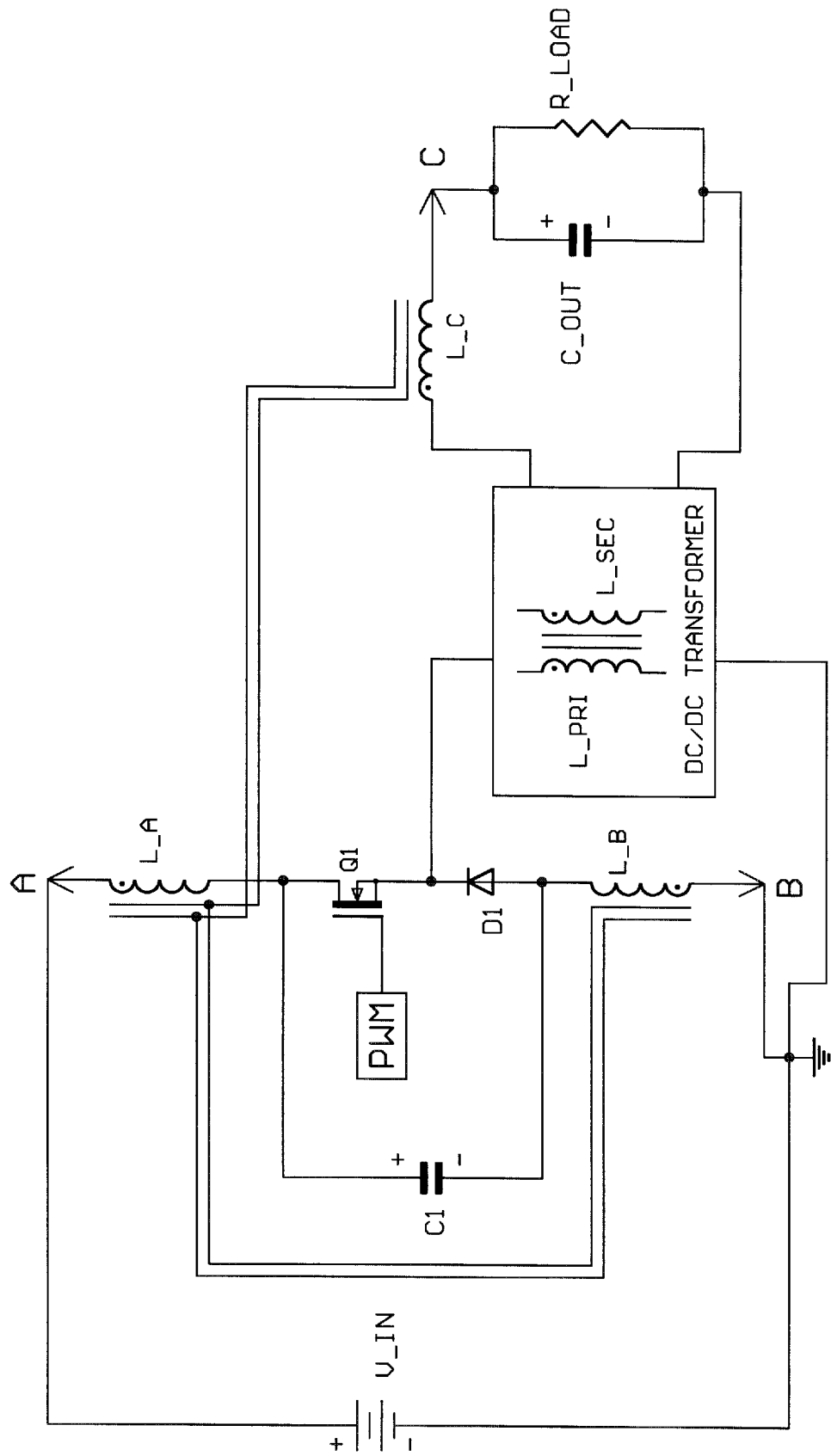
FIG. 15 illustrates a buck embodiment of the FIG. 6 circuit with the DC/DC transformer circuit placed inside the C terminal choke.

FIG. 15 illustrates another embodiment similar to the FIG. 14 embodiment in which the DC/DC transformer circuit is placed between the switches and the third inductor 105.

Figure 16:
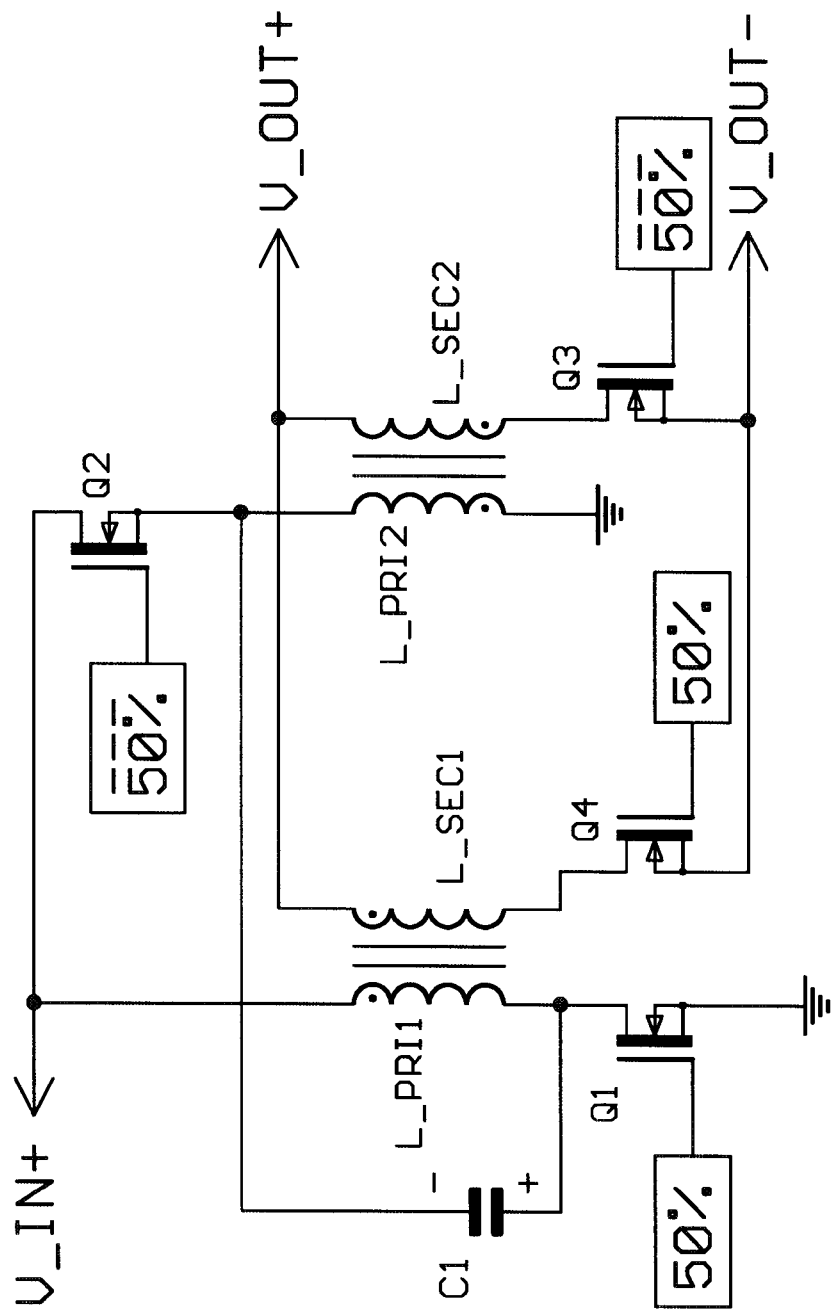
FIG. 16 illustrates an example of a DC/DC transformer circuit suitable for application in FIGS. 14 or 15.

FIG. 16 illustrates an example of a zero voltage switching DC/DC transformer circuit according to U.S. Pat. No. 6,195,270, which is one example of a suitable DC/DC transformer for application in the circuits of FIGS. 14 and 15.

Figure 17:
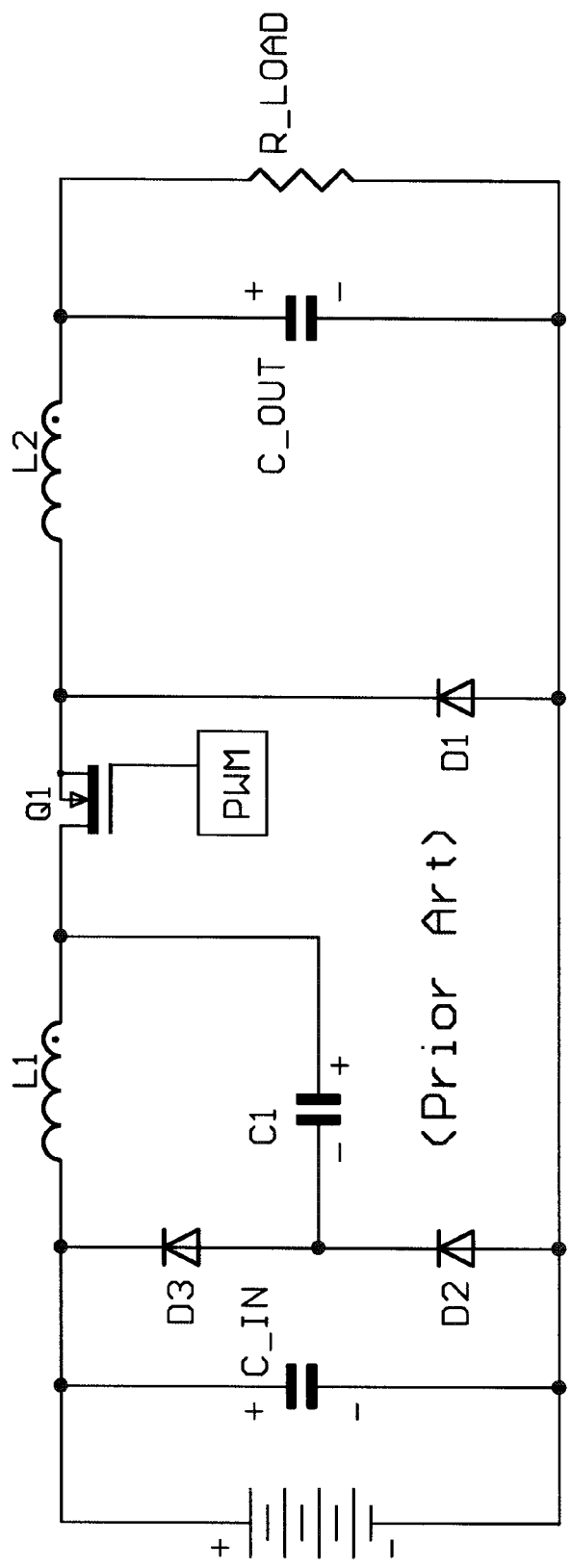
FIG. 17 illustrates a single active switch quadrature converter with pulsating input current.

FIG. 17 illustrates a prior art example of a single active switch quadrature converter. The transfer function of the FIG. 17 converter is $V_{OUT}=D^2 \cdot V_{IN}$. This quadrature converter is suitable for low power applications in which a wide input voltage range must be tolerated. The FIG. 17 circuit works well for high ratios of $V_{IN}$ to $V_{OUT}$. It has pulsating input terminal current.

Figure 5:
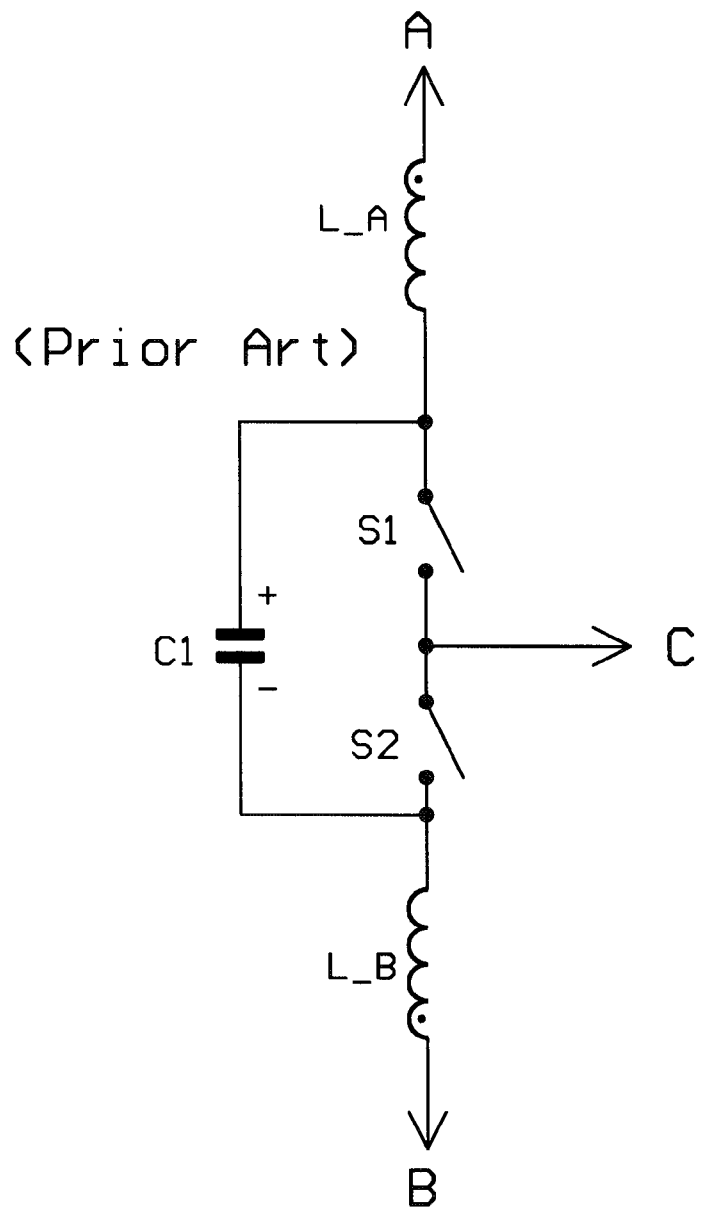
FIG. 5 illustrates a three terminal PWM SPDT converter network with a capacitor and two inductors.
Figure 18:
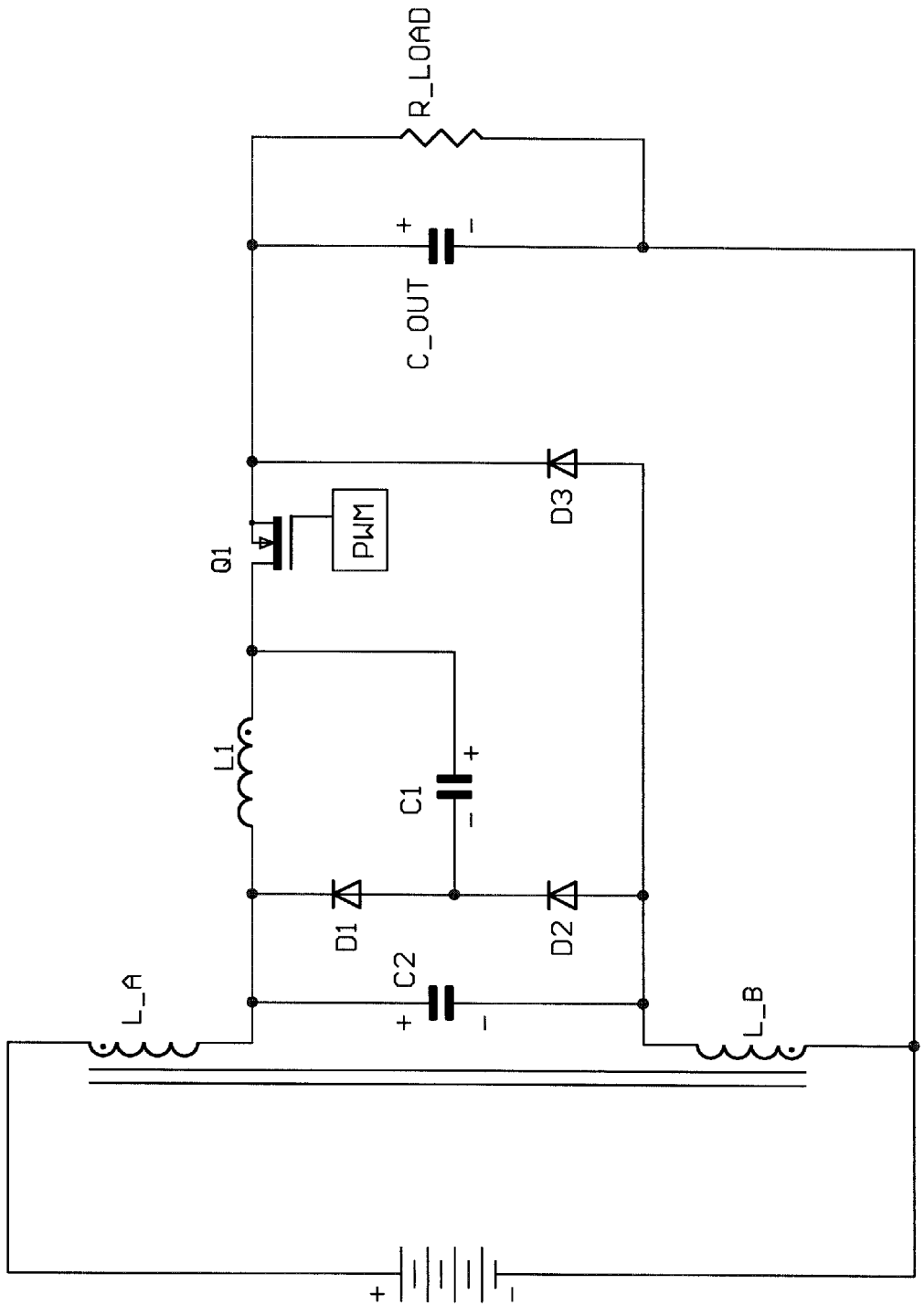
FIG. 18 illustrates a single active switch quadrature converter similar to the FIG. 17 circuit but altered to achieve non-pulsating terminal currents using the FIG. 5 circuit.

FIG. 18 illustrates a single active switch quadrature converter similar to the FIG. 17 circuit with the output buck converter network altered in the manner used by the FIG. 5 circuit. The transfer function for the FIG. 18 circuit is $V_{OUT}=D^2 \cdot V_{IN}$, same as the FIG. 17 circuit. The FIG. 18 circuit achieves non-pulsating terminal currents for all terminals.

Figure 19:
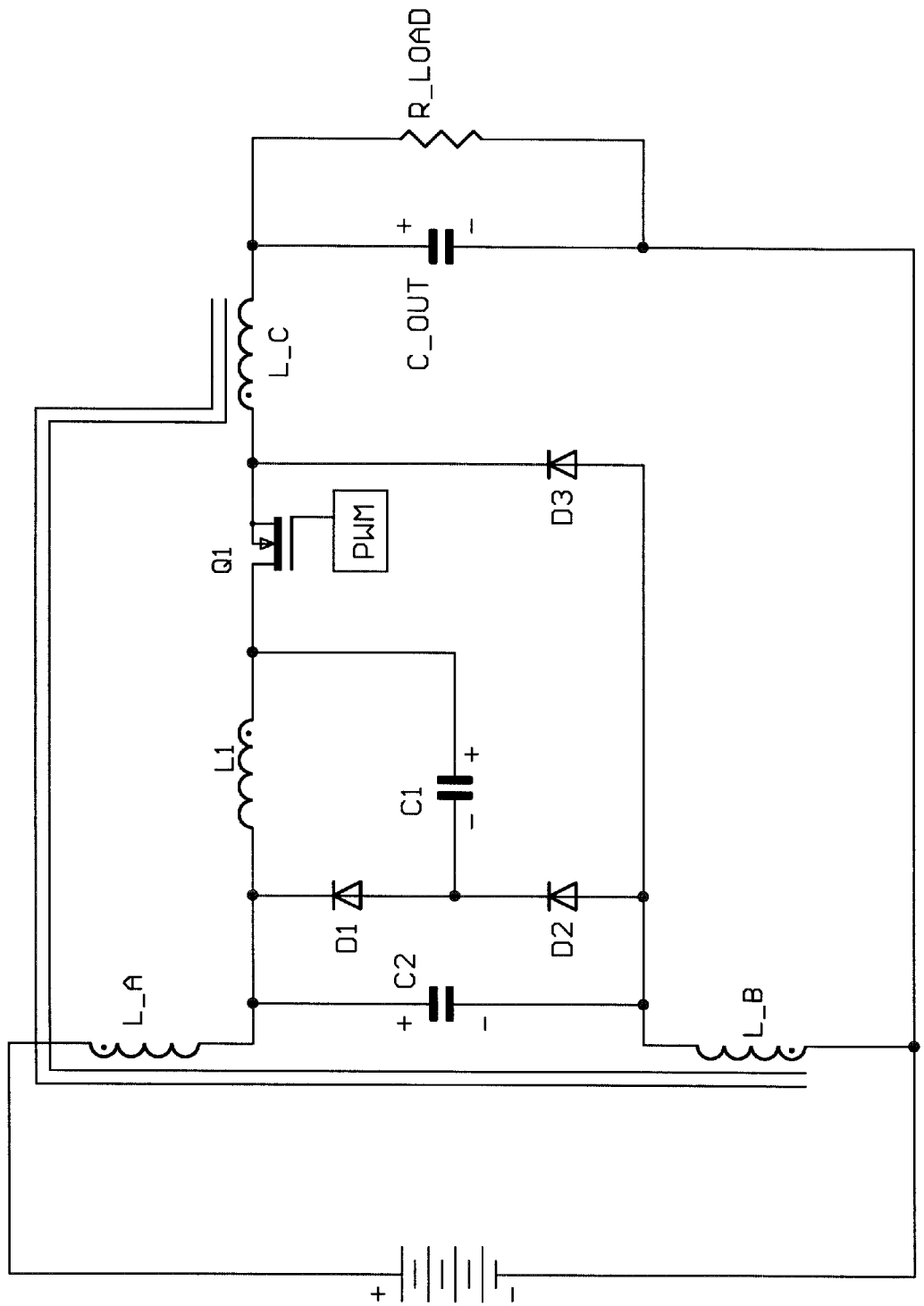
FIG. 19 illustrates a single active switch quadrature converter similar to the FIG. 17 circuit but altered to achieve non-pulsating terminal currents using the FIG. 6 circuit.

FIG. 19 illustrates another embodiment similar to the FIG. 18 embodiment but altered to use the FIG. 6 circuit in place of the output buck converter network rather than the FIG. 5 converter network. The FIG. 19 circuit achieves non-pulsating terminal currents for all terminals. Buck boost (flyback) variations of the FIG. 17, FIG. 18, and FIG. 19 circuits also exist with minor modifications to the circuits shown.

Figure 20:
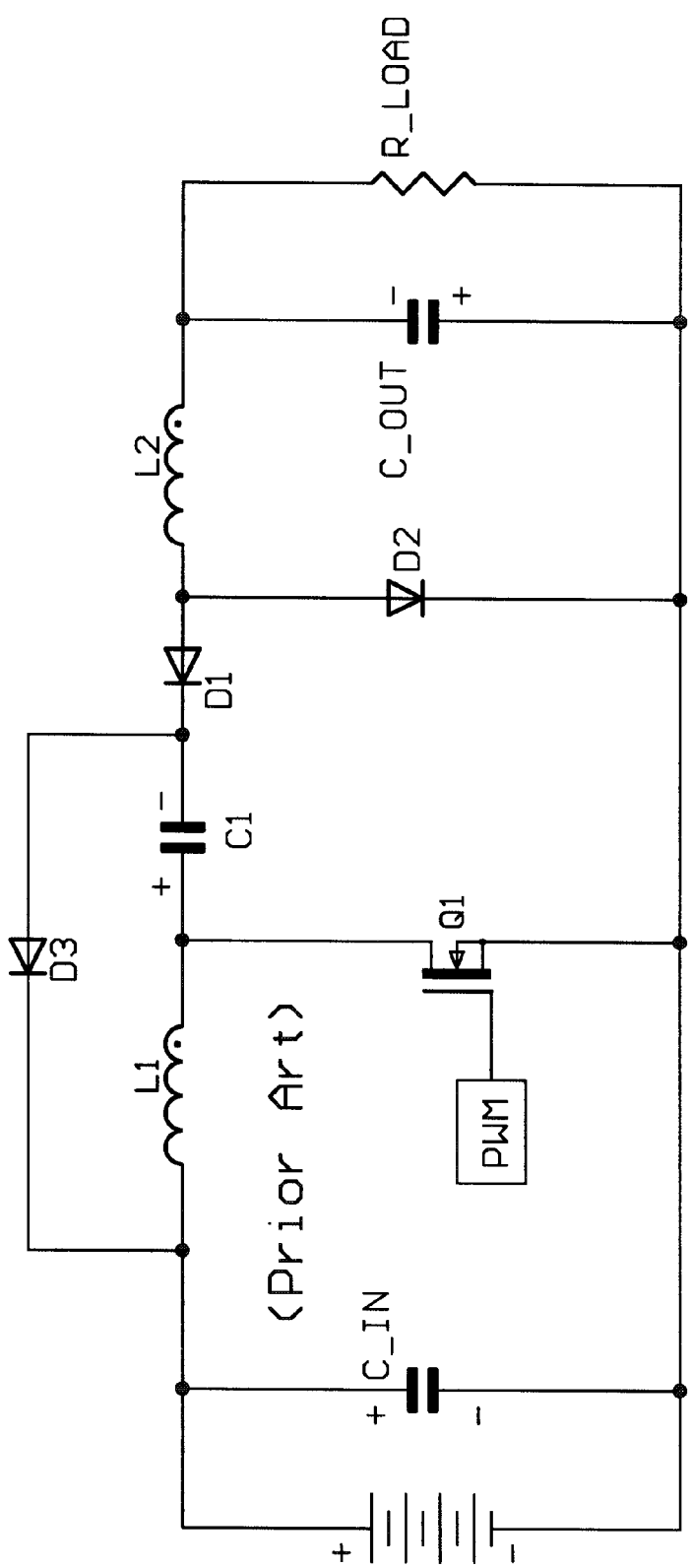
FIG. 20 illustrates another single active switch quadrature converter with pulsating input current.

FIG. 20 illustrates another prior art example of a quadrature converter with a single active switch. The transfer function of the FIG. 20 circuit is $$V_{OUT} = -\frac{D^2}{(1-D)} \cdot V_{IN}.$$

The FIG. 20 circuit is a step up or down inverting converter that works well for wide input voltage range applications. It has pulsating input terminal current.

Figure 21:
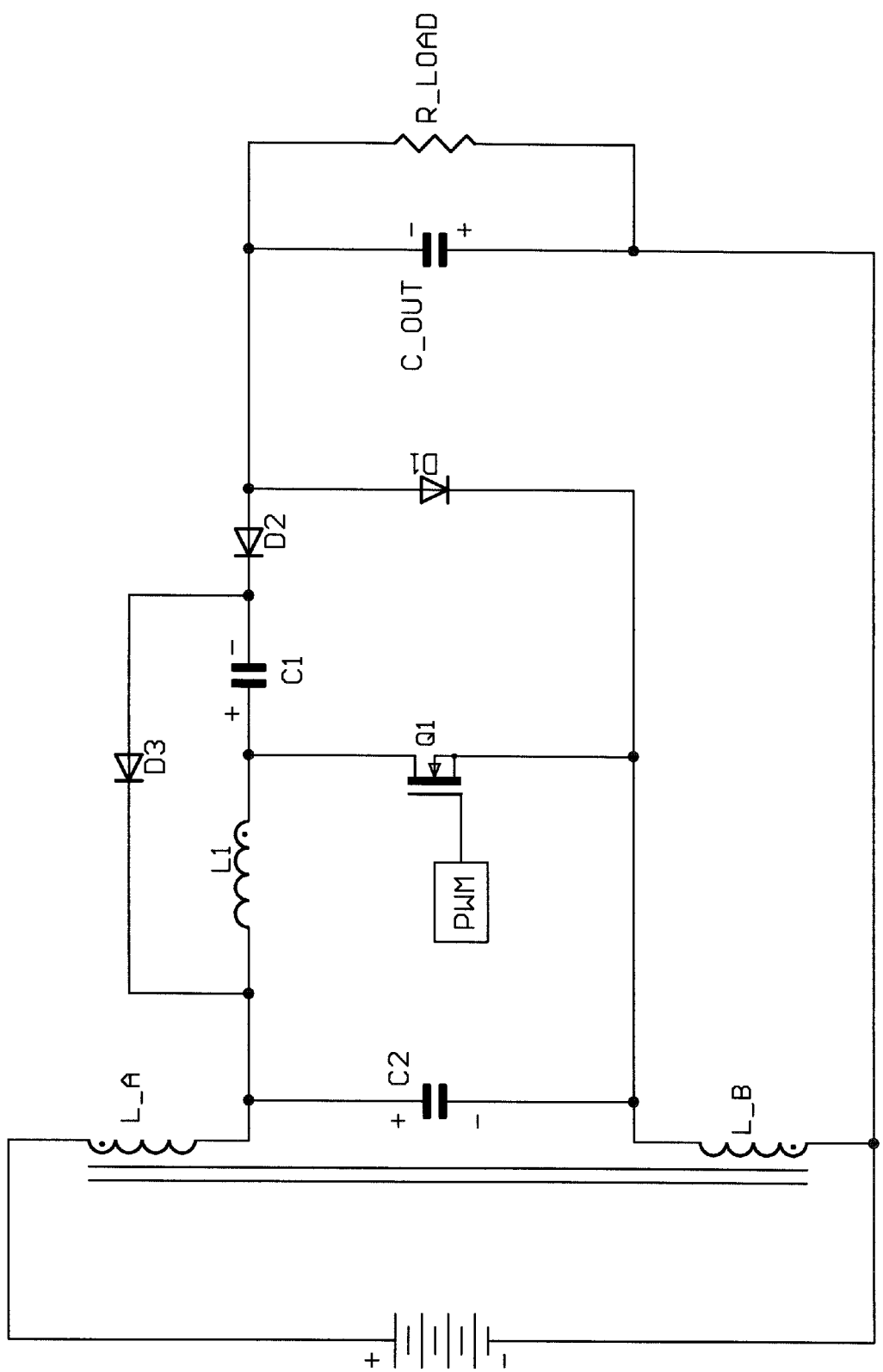
FIG. 21 illustrates a single active switch quadrature converter similar to the FIG. 20 circuit but altered to achieve non-pulsating terminal currents using the FIG. 5 circuit.

FIG. 21 illustrates a converter similar to the FIG. 20 circuit but altered to achieve non-pulsating terminal currents using the conversion network of FIG. 5. The transfer function for the network is $$V_{OUT} = -\frac{D^2}{(1-D)} \cdot V_{IN},$$

same as the FIG. 20 circuit. The FIG. 21 circuit achieves non-pulsating terminal currents for all terminals.

Figure 22:
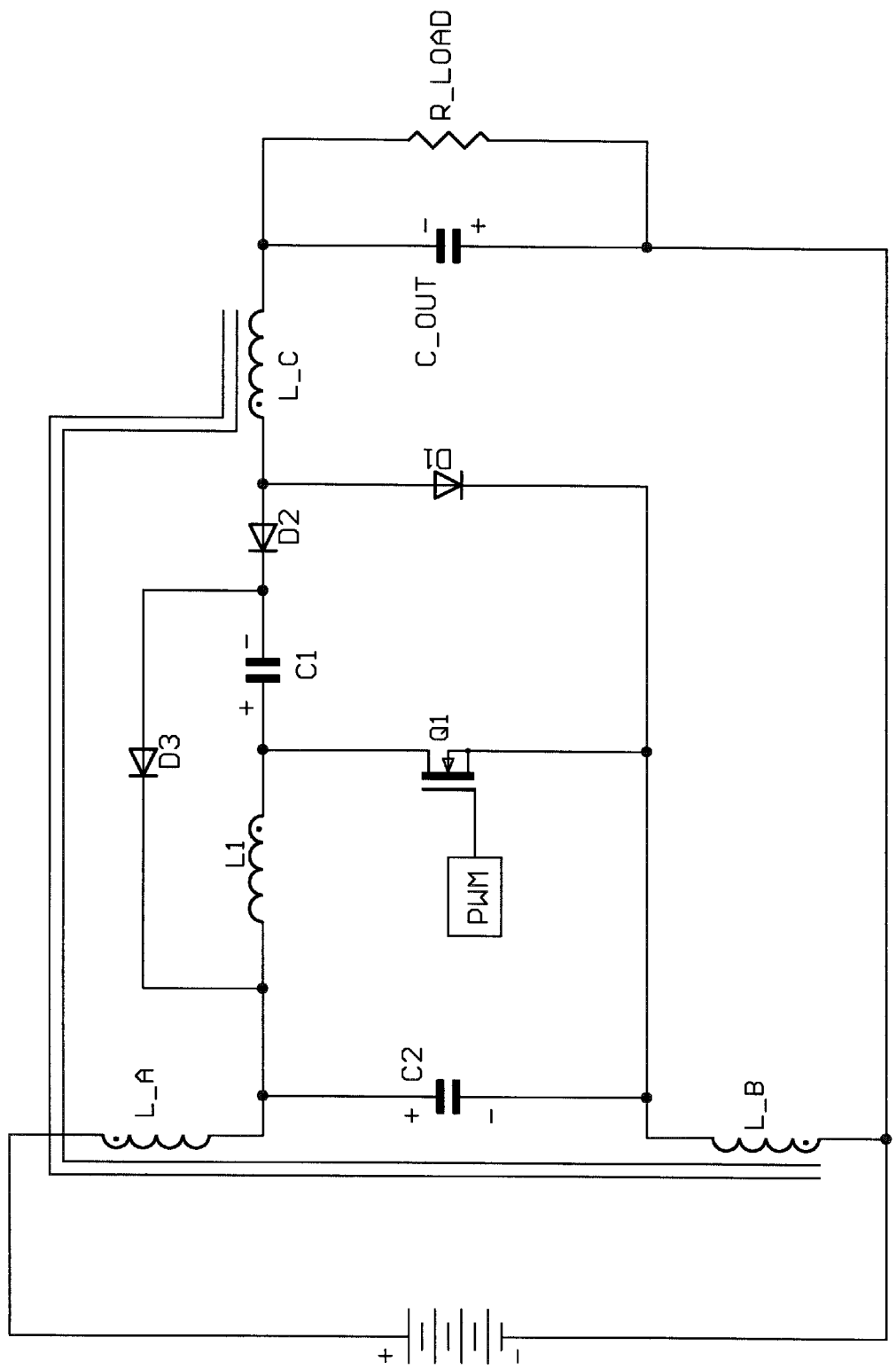
FIG. 22 illustrates a single active switch quadrature converter similar to the FIG. 20 circuit but altered to achieve non-pulsating terminal currents using the FIG. 6 circuit.

FIG. 22 illustrates a converter similar to the FIG. 21 converter but it uses the converter network of FIG. 6 rather than the converter network of FIG. 5. It also achieves non-pulsating terminal currents for all terminals.

Figure 23:
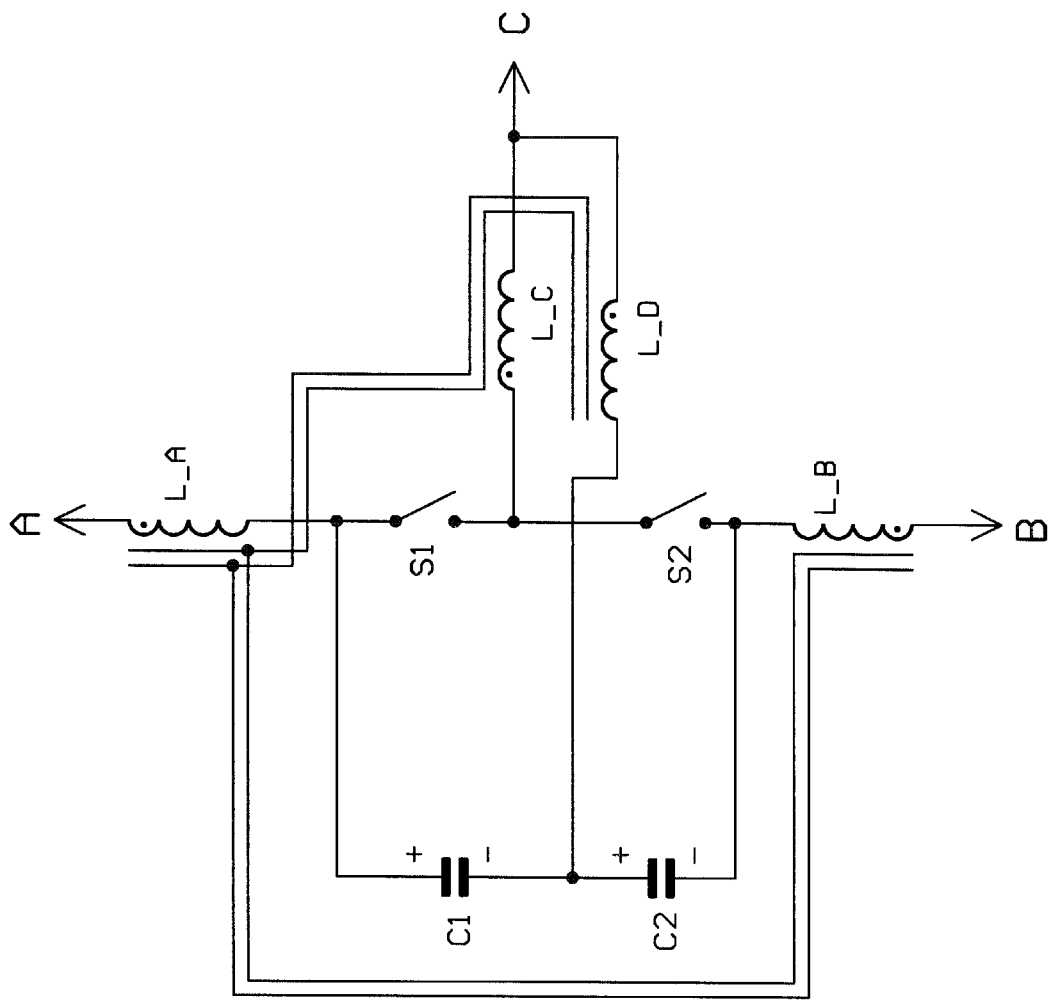
FIG. 23 illustrates an embodiment of the FIG. 6 circuit altered to achieve zero ripple current slope at all terminals.

FIG. 23 illustrates a zero ripple variation of the FIG. 6 converter network. The zero ripple condition can be achieved when the current slopes of the inductor 103 and the inductor 104 are both equal to zero. Let us assume for purposes of analysis that the self inductances of L__A, L__B, and L__C are equal to L and that each of these windings have the same number of turns, but not necessarily the same window area. Let us also assume that L__A, L__B, and L__C are in close mutual proximity and tightly coupled to each other and that the mutual inductance of any pair of these three windings is M. Let $L_D$ be the inductance of the fourth winding, which we will assume to be slightly less than the inductance of the other three windings, and let m be the mutual inductance between the D winding and any of the other three windings. In this case the D winding is separated from and loosely coupled to the other three windings so that m is less than M. The mutual inductances are not directly measurable but they can be calculated from measurable quantities, namely the open circuit self inductances of the windings and the self inductances measured with shorted windings. During the on state the applied voltage, $V_L$, to each winding is the same. Applying Faraday's Law to the A winding we can say that $$V_L = L \cdot \frac{dI_{LA}}{dt} + M \cdot \frac{dI_{LB}}{dt} + M \cdot \frac{dI_{LC}}{dt} + m \cdot \frac{dI_{LD}}{dt}. \quad (4)$$

For the B winding we can say that $$V_L = L \cdot \frac{dI_{LB}}{dt} + M \cdot \frac{dI_{LA}}{dt} + M \cdot \frac{dI_{LC}}{dt} + m \cdot \frac{dI_{LD}}{dt}. \quad (5)$$

For the C winding we can say that $$V_L = L \cdot \frac{dI_{LC}}{dt} + M \cdot \frac{dI_{LA}}{dt} + M \cdot \frac{dI_{LB}}{dt} + m \cdot \frac{dI_{LD}}{dt}. \quad (6)$$

For the D winding we can say that $$V_L = L_D \cdot \frac{dI_{LD}}{dt} + m \cdot \frac{dI_{LA}}{dt} + m \cdot \frac{dI_{LB}}{dt} + m \cdot \frac{dI_{LC}}{dt}. \quad (7)$$

We can also say that $$\frac{dI_{LC}}{dt} = \frac{dI_{LA}}{dt} + \frac{dI_{LB}}{dt} - \frac{dI_{LD}}{dt}. \quad (8)$$

This last result is based on the Law of Charge Conservation. If we solve equations (4) through (8) for $$\frac{dI_{LA}}{dt} \text{ and set } \frac{dI_{LA}}{dt} = 0$$

we find the condition $$L_D = 2 \cdot m - M \quad (9)$$

is required to obtain the zero result. By applying the condition, $L_D = 2 \cdot m - M$, we also find that $$\frac{dI_{LB}}{dt} = 0.$$

The results for $$\frac{dI_{LC}}{dt}$$

and $$\frac{dI_{LD}}{dt}$$

are not zero but that does not matter because applying equation (8) we find that $$\frac{dI_{LD}}{dt} + \frac{dI_{LC}}{dt} = 0,$$

so that the net current slope or ripple at the C terminal of the network is also zero. We can also argue that the C terminal current slope must be zero because we have a three terminal network and if two of the terminals have zero current slope then the third terminal must also have zero current slope.

By applying an additional winding to the basic converter network of FIG. 6 with reduced turns according to the condition of equation (9) we can reduce the ripple to zero at all of the terminals of the network simultaneously. Reducing the ripple to zero at all three terminals has some very significant benefits including (1) reduction of the size of the coupled inductor. Notice that the result does not depend on the inductance of the A, B, or C winding being any particular value only that the relative values maintain the relationship specified by equation (9). The reduction of the inductor value has the additional benefit of (2) improving the transient response of the converter. For converters where transient response is not important we have the benefit (3) that the input and output filter capacitors can be reduced in value, size, and cost. The zero ripple condition also provides the benefit of (4) reduced EMI.

It is well known that the Cuk converter can achieve zero ripple at one terminal by adjusting the turns and coupling coefficients between the windings. Zero ripple at all terminals can be achieved in the Cuk converter by adding a winding, a second capacitor, and some complexity to the magnetic structure. It is understood that the zero ripple condition is a theoretical result and, in practice, applying the zero ripple condition results in a null or minimum in the ripple current, but not actually zero ripple, and that the result is effectively the same as the results obtained by applying an LC filter at the terminal where zero ripple condition is desired. The results for the Cuk converter begs the question of whether or not one can make improvements with the three inductor network without the addition of windings and capacitors. In the Cuk converter one winding's self inductance was reduced to achieve the zero ripple condition. Let us suppose that the B winding has reduced turns so that the inductor 104 has a lesser inductance than the other two windings which we will assume have equal self inductance, L. Let the mutual inductance of the 103 104 AB inductor pair be $M_{AB}$, let the mutual inductance of the 103 105 AC inductor pair be $M_{AC}$, and let the mutual inductance of the 104 105 BC inductor pair be $M_{BC}$. We will not assume that the inductors have the same winding voltages, but the 103 and 104 winding voltages must be equal because of the connection to capacitor 110. Applying Faraday's Law to each inductor during the on state we get $$V_L = L \cdot \frac{dI_{LA}}{dt} + M_{AB} \cdot \frac{dI_{LB}}{dt} + M_{AC} \cdot \frac{dI_{LC}}{dt}, \quad (10)$$

$$V_L = L_B \cdot \frac{dI_{LB}}{dt} + M_{AB} \cdot \frac{dI_{LA}}{dt} + M_{BC} \cdot \frac{dI_{LC}}{dt}, \quad (11)$$

$$V_{LC} = L \cdot \frac{dI_{LC}}{dt} + M_{AC} \cdot \frac{dI_{LA}}{dt} + M_{BC} \cdot \frac{dI_{LB}}{dt}, \quad (12)$$

We also know that $$\frac{dI_{LC}}{dt} = \frac{dI_{LA}}{dt} + \frac{dI_{LB}}{dt} \quad (13)$$

and $$V_L + V_{LC} = V_A - V_C \quad (14)$$

during the on state, where VL is the applied voltage to the A and B windings and $V_{LC}$ is the applied voltage to the C winding. By solving the equations (10) through (14) for $$\frac{dI_{LA}}{dt} \text{ and } \frac{dI_{LB}}{dt}$$

and setting the results equal to zero we find that the necessary conditions for zero ripple are $$L_B = M_{AB} + M_{AC} - M_{BC} \quad (15)$$

and $$L = M_{AB} + M_{BC} - M_{AC}. \quad (16)$$

The condition from equation (15) is necessary to achieve zero ripple at the A terminal and both conditions are necessary to achieve zero ripple at the B terminal. If zero ripple is achieved at the B terminal then zero ripple is achieved at all three terminals. One way to physically realize these conditions is to place the B winding between the A and C windings and adjust the B windings turns and the space between windings to achieve the desired result.

Figure 24:
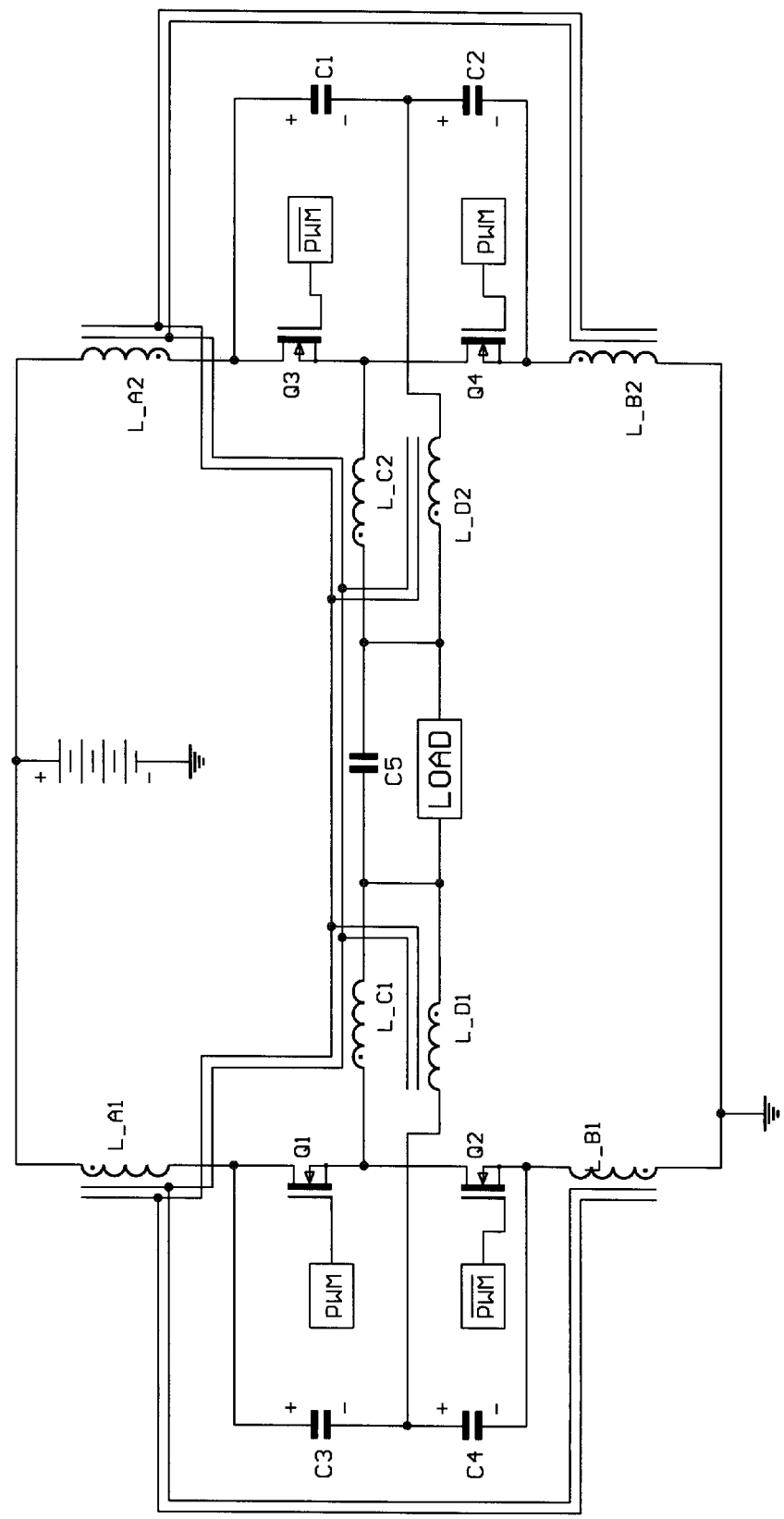
FIG. 24 illustrates an embodiment of the FIG. 6 circuit combining two of the FIG. 23 circuits using a single common magnetic core to form a power source with bi-polar or AC output.

FIG. 24 illustrates a power converter with bi-polar or AC output capability and zero ripple formed by combining two of the converter networks of FIG. 23 in a bridge arrangement with all of the windings combined on a single common magnetic core.

PWM SPDT Complement Three Terminal Network With Three Inductors

Figure 25:
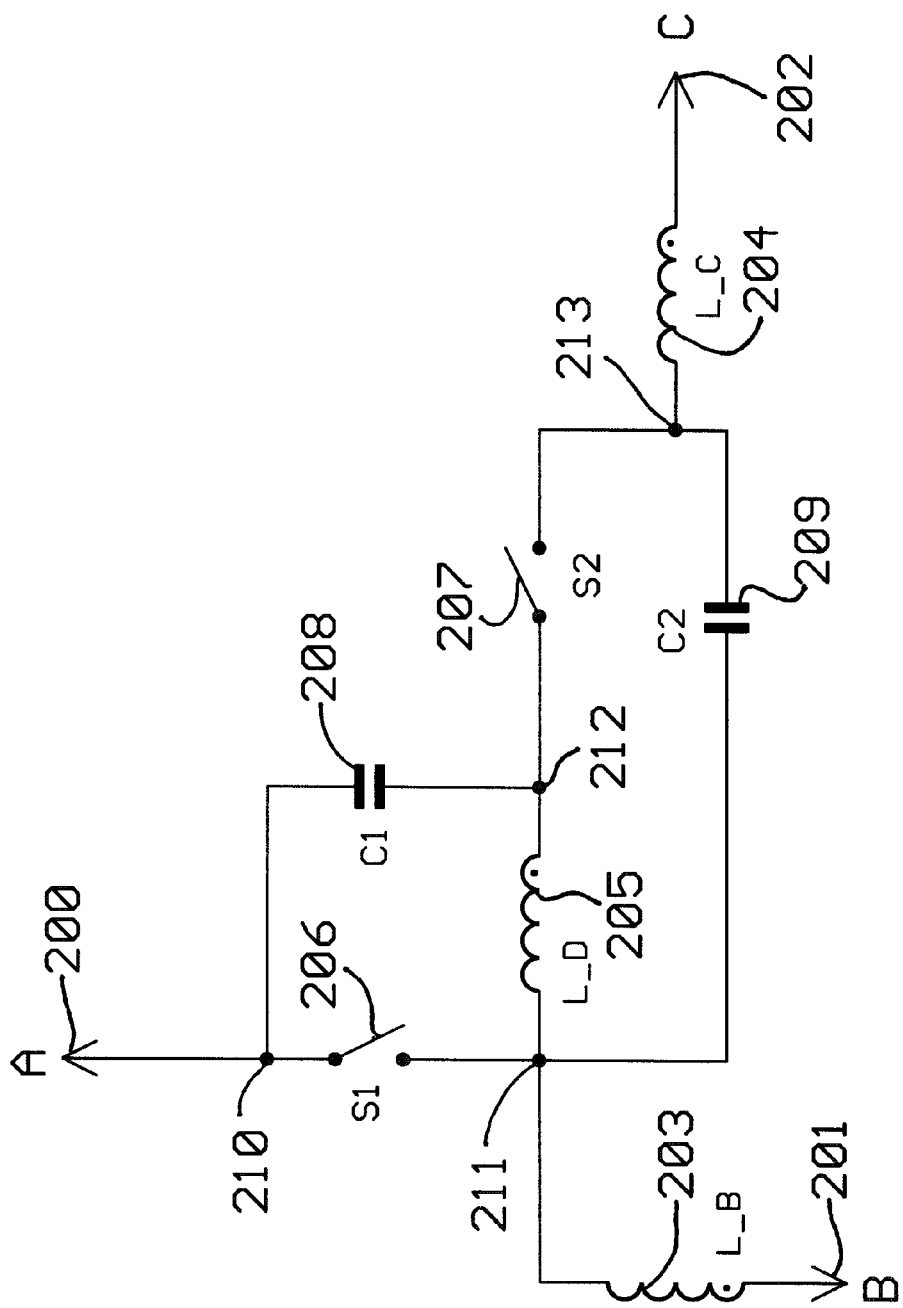
FIG. 25 illustrates a PWM SPDT complement three terminal network according to the subject invention with three inductors and all terminal currents non-pulsating.

FIG. 25 illustrates a three terminal network which is a PWM SPDT complement power conversion network to which the unified PWM SPDT complement transfer function applies. This transfer function is given by $$V_C = V_B + \frac{D}{1-D} \cdot (V_A - V_b). \quad (17)$$

We call the converters that are formed from the three terminal network complement converters because the output voltage ranges are the complements of the buck, boost, and flyback output voltage ranges. The conversion network contains three inductors, two capacitors and a pair of switches. The circuit achieves non-pulsating terminal currents for all terminals. This fact is apparent based on the fact that two of the three terminals contain a series inductor and, since two of the three terminal are non-pulsating the third must also be non-pulsating. The three terminals are connected to two voltage sources and a load. One of the voltage sources may be ground. No restrictions are imposed on which terminals are connected to which sources or which terminal is connected to the load.

Referring to FIG. 25 there is shown a three terminal PWM SPDT complement power conversion network in which input DC voltages are converted into an output DC voltage. The circuit requires a pair of input sources, one of which may be ground, of substantially DC voltage, three inductors, a pair of switches, and two capacitors coupling the inductors and the switches. For purposes of the operational state analysis, it is assumed that the capacitors are sufficiently large that the voltages developed across the capacitors are approximately constant over a switching interval and equal to the differences in voltage between two of the terminal voltages. We will also assume for purposes of analysis that the inductors are large so that the current in the inductors is invariant over a switching cycle. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction.

Structure

The structure of the circuit of the subject invention is shown in FIG. 25. A first network terminal 200 is connected to a node 210. The node 210 is connected to a first terminal of a switch 206 and to a first terminal of a capacitor 208. A second terminal of switch 206 is connected to a node 211. A second terminal of capacitor 208 is connected to a node 212. An undotted terminal of an inductor 205 is connected to node 211 and a dotted terminal of inductor 205 is connected to node 212. An undotted terminal of an inductor 203 is connected to node 211. A dotted terminal of inductor 203 is connected to a second network terminal 201. A first terminal of a capacitor 209 is connected to the node 211 and a second terminal of capacitor 209 is connected to a node 213. A first terminal of a switch 207 is connected to the node 212. A second terminal of switch 207 is connected to node 213. An undotted terminal of an inductor 204 is connected to the node 213 and a dotted terminal of inductor 204 is connected to a third network terminal 202.

Operation

Figure 26:
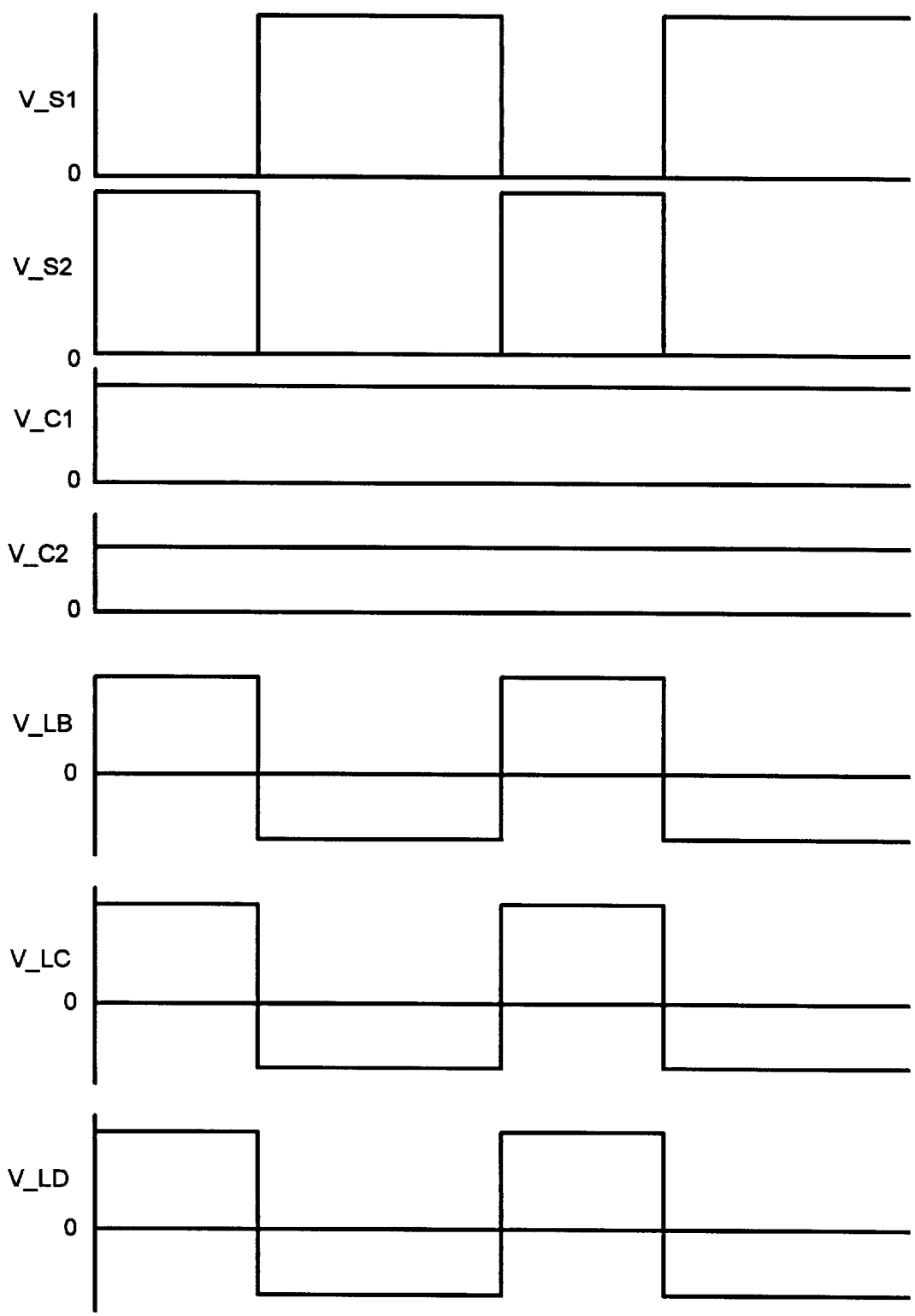
FIG. 26 illustrates the voltage wave forms for each component in the FIG. 25 circuit.
Figure 27:
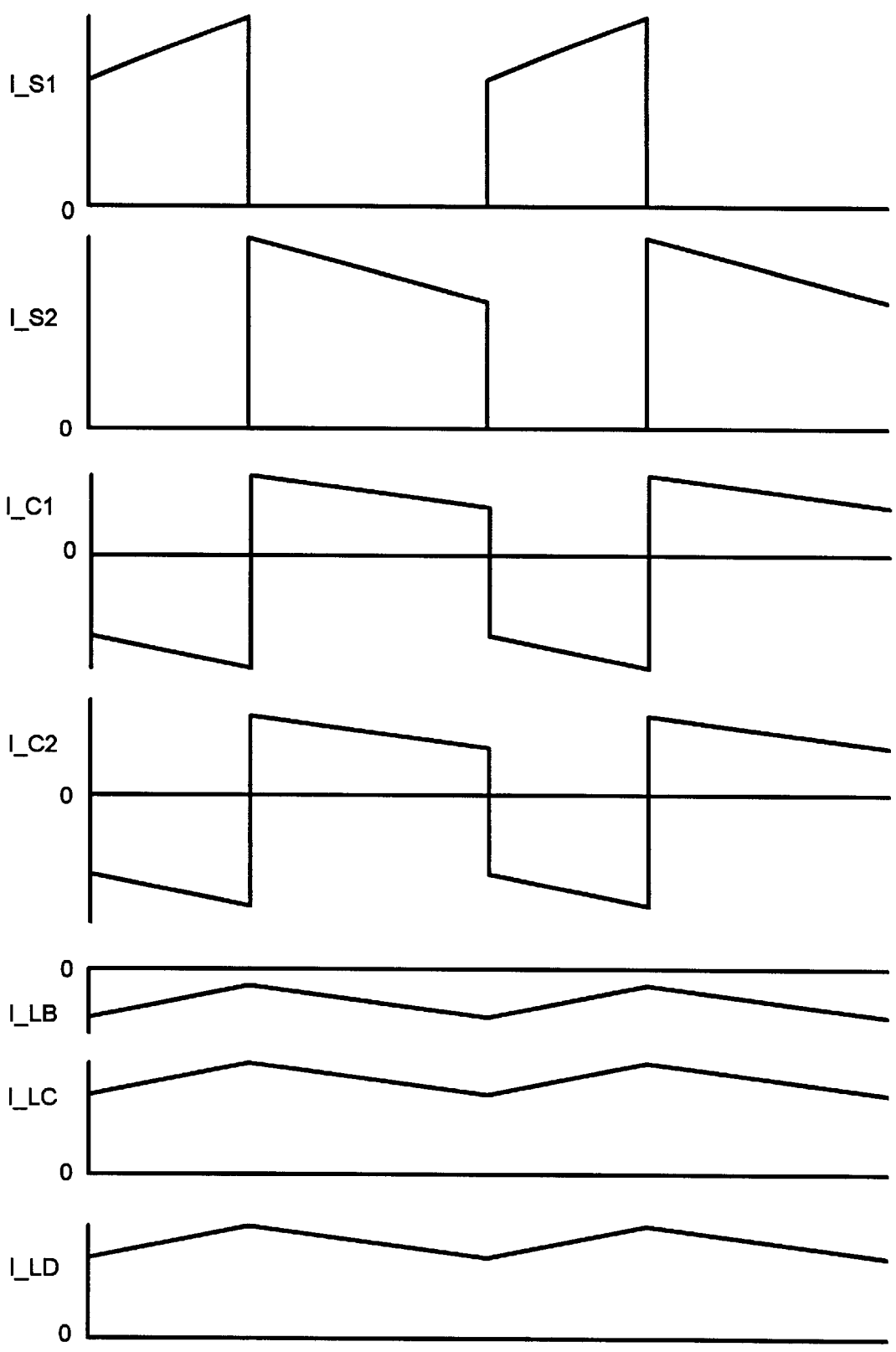
FIG. 27 illustrates the current wave forms for each component in the FIG. 25 circuit.
Figure 28:
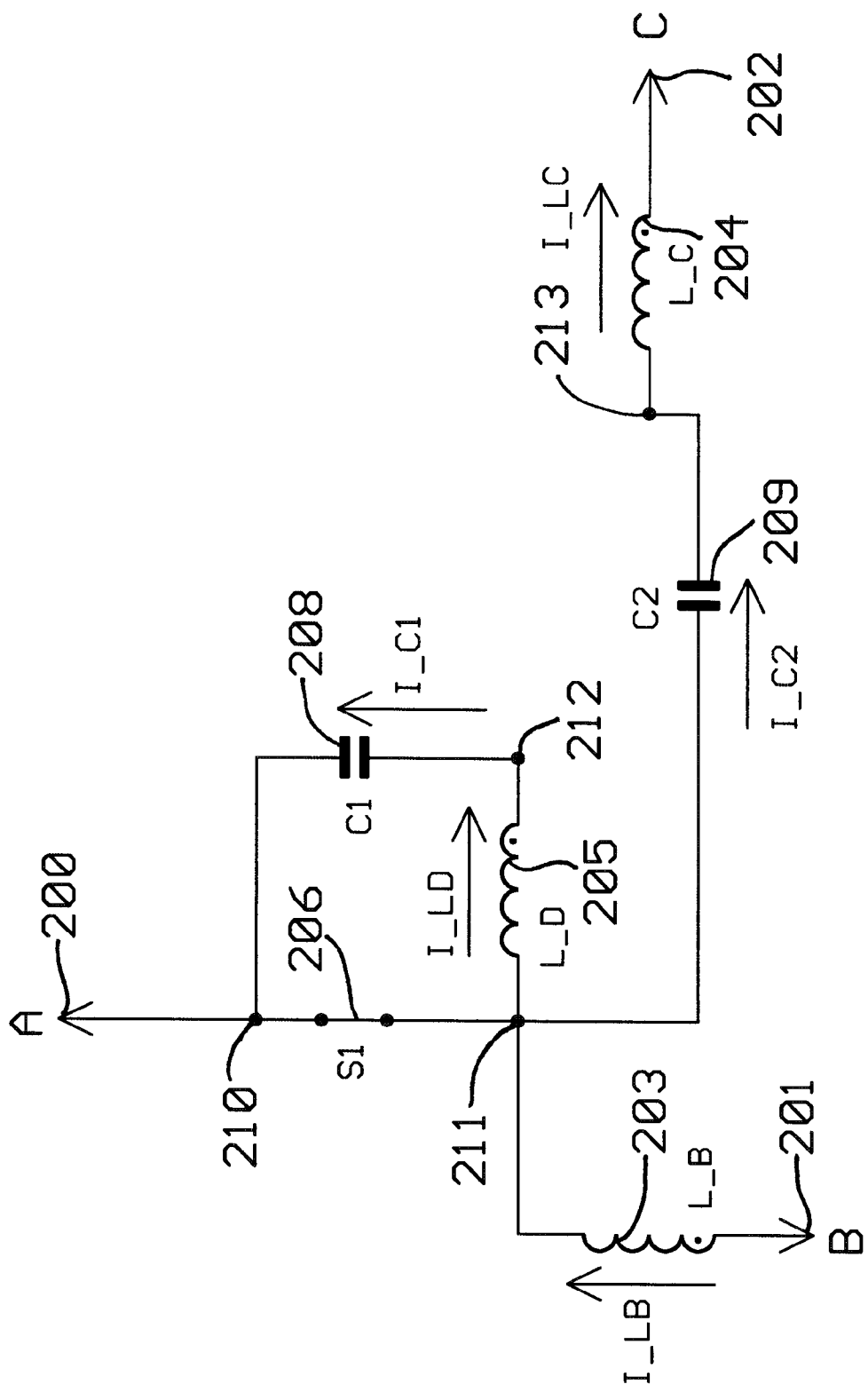
FIG. 28 illustrates an on state of the FIG. 25 circuit.

It is assumed in this analysis that the system has reached a settled operating condition. Except for the short, but finite, switching intervals there are two states of the circuit of FIG. 25, an on state and an off state. We will assume for the operational state analysis that the A first network terminal 200 voltage is more positive than the B second network terminal 201 voltage and that the C third network terminal 202 voltage is more positive than the B second network terminal 201 voltage. The applied voltage to the capacitor 208, $V_{C1}$, will be equal to the voltage difference between the A first network terminal 200 voltage, $V_A$ and the B second network terminal 201 voltage, $V_B$, or $V_{C1}=V_A-V_B$. This results from the fact that a terminal of the capacitor 208 is connected to the B second network terminal 201 through an inductor 203, whose average applied voltage is zero. The applied voltage to the capacitor 209, $V_{C2}$, will be equal to the voltage difference between the C third network terminal 202 voltage, $V_C$ and the B second network terminal 201 voltage, $V_B$, or $V_{C2}=V_C-V_B$. This results from the fact that the terminals of the capacitor 209 are connected to the B second network terminal 201 through an inductor 203 and to the C third network terminal 202 through the inductor 204, whose average applied voltages are zero. Consider an initial condition as illustrated in FIG. 28. The initial condition represents the on state. During the initial condition the switch 206 is on (closed) and the switch 207 is off (open). The voltage wave forms for each component are illustrated in FIG. 26. The current wave forms for each component are illustrated in FIG. 27. The current in the inductor 203, $I_{LB}$, is flowing from bottom to top into the dotted terminal and out of the undotted terminal. The current in the inductor 204, $I_{LC}$, is flowing from left to right into the undotted terminal and out of the dotted terminal. The current in the inductor 205, $I_{LD}$, is flowing from left to right into the undotted terminal and out of the dotted terminal. The current in all three inductors will be becoming more positive in value during the on state, where the positive direction is into the undotted terminal and out of the dotted terminal. Since the switch 207 is off (open) the current in the capacitor 208 will be equal to the current in the inductor 205, or $-I_{LD}$, discharging the capacitor 208 and the current in the capacitor 209 will be equal to the current in the inductor 204, or $-I_{LC}$, discharging the capacitor 209. The inductor 205 current, $I_{LD}$, is equal to the inductor 204 current, $I_{LC}$, so that the two capacitors have the same charging current. The current in the first switch 208 will be equal to the sum of the currents in the inductors 203, 204, and 205 or $I_{S1}=I_{LD}+I_{LC}+I_{LB}$. The voltage at the undotted terminal of inductor 203 is $V_A$ and the voltage at the dotted terminal of inductor 203 is $V_B$ so that the applied voltage to inductor 203 is $V_A-V_B$. The voltage applied to the inductor 205 is equal to the capacitor 208 voltage, $V_{C1}=V_A-V_B$. The voltage applied to the inductor 204 is equal to $V_A$ plus $V_{C2}$ minus the C third terminal 202 voltage, $V_C$, or $V_A+V_{C2}-V_C=V_A-V_B$. Each inductor, therefore, has the same winding voltage during the on state.

Figure 29:
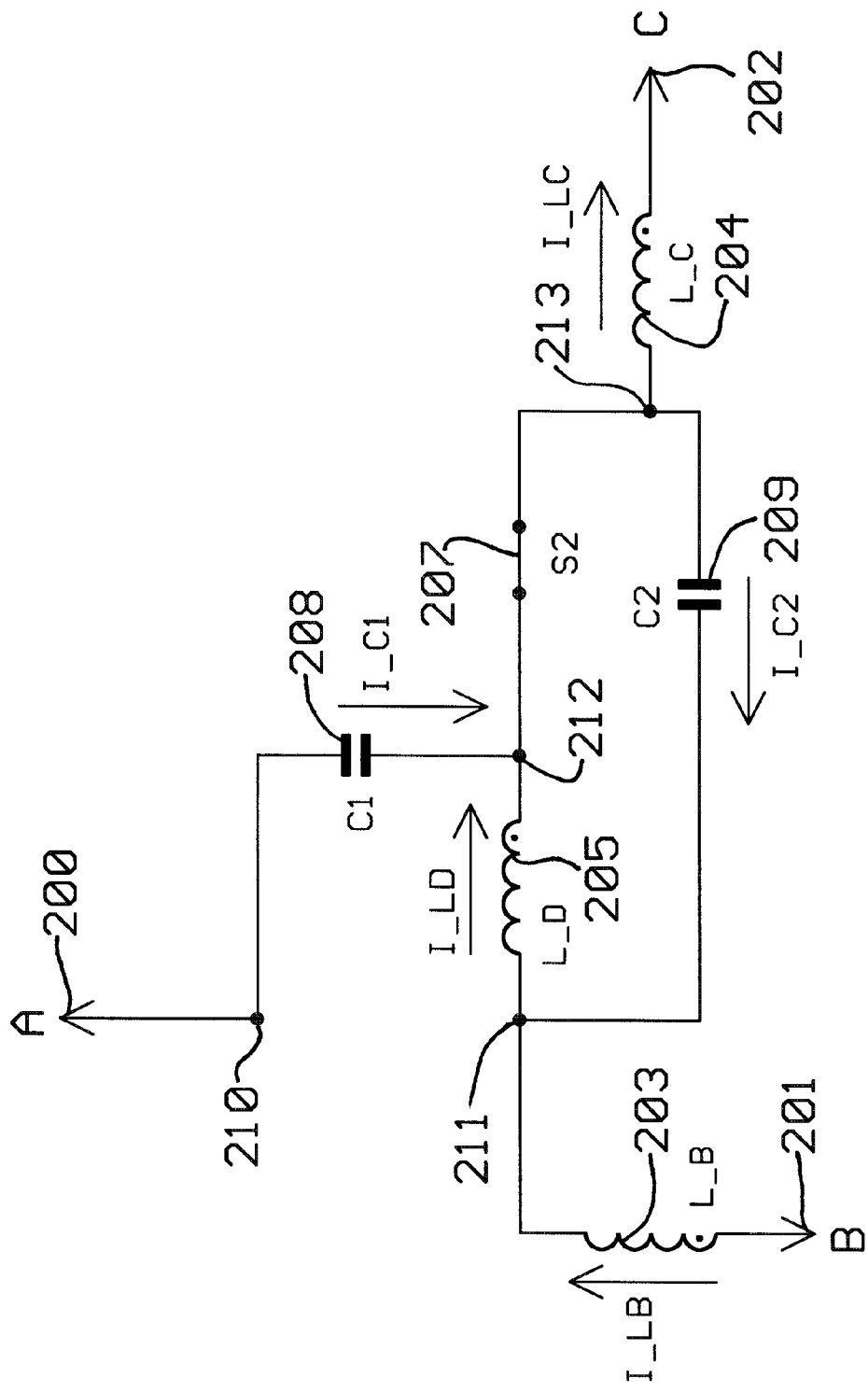
FIG. 29 illustrates an off state of the FIG. 25 circuit.

At a time determined by the control circuit the switches change state so that the S1 switch 206 is off (open) and the S2 switch 207 is on (closed) and the network enters the off state illustrated in FIG. 29. During the off state the currents in all three inductors decrease. With the S1 switch 206 open the inductor 205 current, $I_{LD}$, flows in the S2 switch 207. During the off state both capacitors are charged. Since they had the same discharge current during the on state they must have equal charging currents during the off state. Since we know the terminal currents at the network terminals 201 and 202 we can determine the terminal current at the A first network terminal 200. The A first network terminal 200 terminal current will be $I_A=I_{LC}+I_{LB}$. $I_A$ is the discharge current for the capacitor 208 so $I_A$ must also be the discharge current for the capacitor 209. When the inductors currents have ramped down to their values at the beginning of the on state the switches 206 and 207 change state again and the cycle repeats.

We have already indicated the transfer function for the network which can be readily determined by applying Faraday's Law to set the volt second products for any one of the inductors equal to zero. The universal PWM SPDT complement transfer function was indicated above in equation (17). We can apply the Law of Charge Conservation to find the inductor currents. We find that $$I_A = \frac{D}{1-D} \cdot I_{LC}, \qquad (18)$$

$$I_{LB} = -\frac{1-2 \cdot D}{1-D} \cdot I_{LC}, \qquad (19)$$

and $$I_{LD}=I_{LC}. \qquad (20)$$

The desired result is to achieve non-pulsating current at each terminal. We can see that this must be the case since two of the three terminal currents must be non-pulsating because they have inductors in series with terminals. The third terminal current must also be non-pulsating since the net current into the network must be zero because of charge conservation.

Related Embodiments

Figure 30:
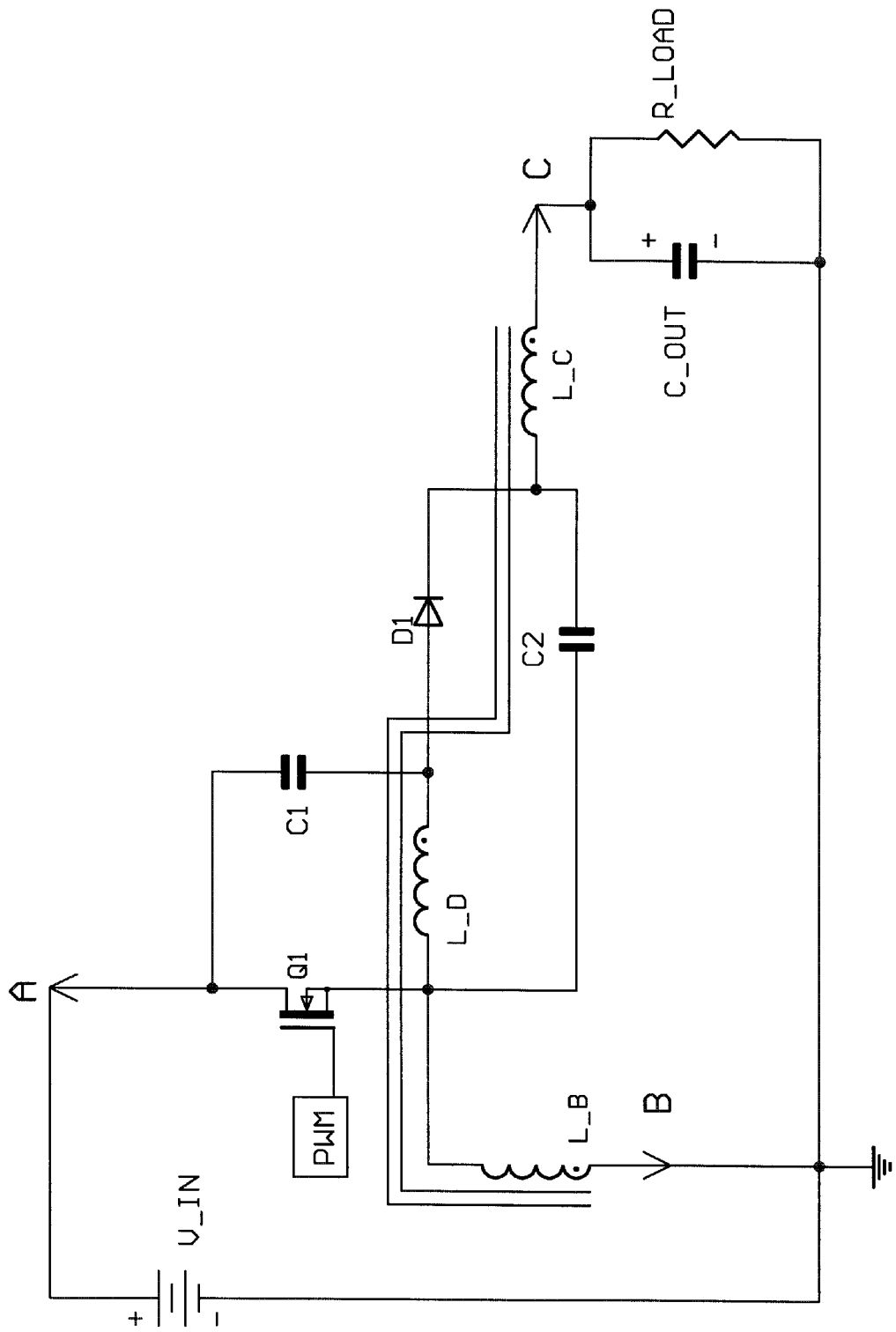
FIG. 30 illustrates the FIG. 25 circuit with the terminals connected to form a flyback complement converter in which all three inductors are coupled on a single magnetic core and the S1 switch is implemented with a mosfet and the S2 switch is implemented with a diode.

FIG. 30 illustrates an embodiment of the FIG. 25 network in which all three inductors are coupled on a single common core. The FIG. 30 circuit is a flyback complement implementation of the FIG. 25 circuit which will be recognized as a non-pulsating implementation of a SEPIC converter. Applying the unified PWM SPDT complement transfer function, equation (17), with $V_B=0$, $V_A=V_{IN}$, and $V_C=V_{OUT}$ yields the transfer function for the SEPIC converter $$V_{OUT} = \frac{D}{1-D} \cdot V_{IN}. \qquad (21)$$

The equation (21) transfer function is exactly equal to the negative of the transfer function for a flyback or buck boost converter. The output voltage range of the flyback is from zero to negative infinity. The output voltage range for the flyback complement is from zero to positive infinity. The FIG. 30 implementation uses a mosfet for the S1 switch 206 and a diode for the S2 switch 207.

Figure 31:
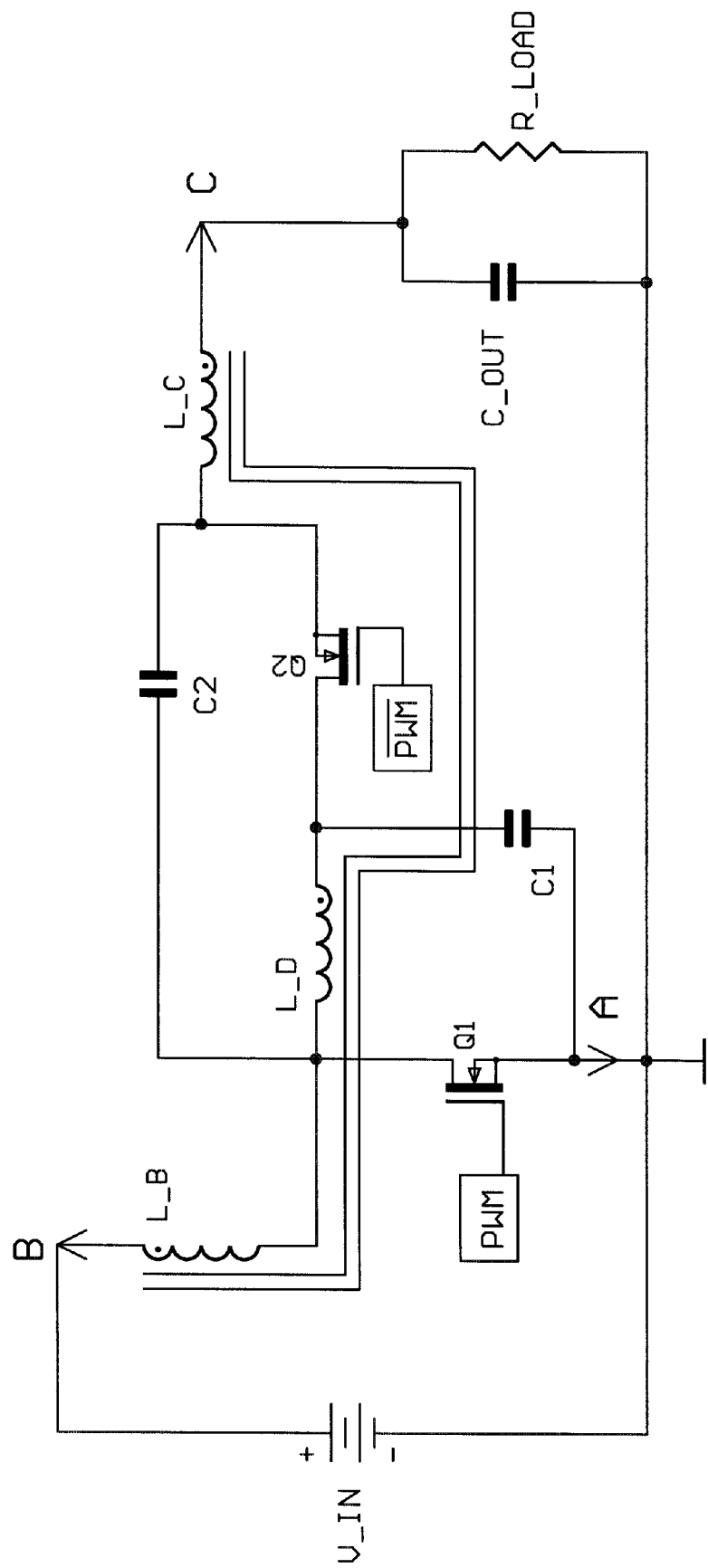
FIG. 31 illustrates the FIG. 25 circuit with the terminals arranged to form a boost complement converter in which all three inductors are coupled on a single magnetic core and both the S1 and S2 switches are implemented with power mosfets.

FIG. 31 illustrates a boost complement implementation of the FIG. 25 network. Both switches are implemented with mosfets so that power flow in two directions is possible. In this case $V_A=0$, $V_B=V_{IN}$, and $V_C=V_{OUT}$. By making these substitutions in the unified PWM SPDT complement transfer function we get the transfer function $$V_{OUT} = \frac{1-2 \cdot D}{1-D} \cdot V_{IN}. \quad (22)$$

This function yields $V_{OUT}=V_{IN}$ for D=0, $V_{OUT}=0$, for D=0.5, and $V_{OUT}=-\infty$ for D=1. Since the output voltage range of a boost converter is $V_{IN}$ to infinity one can see how this is a boost complement. This circuit has the unique ability to convert a positive voltage to either a positive or a negative voltage and to generate an AC output wave form from a positive supply with DC coupling using only two switches, one magnetic, and two capacitors. The FIG. 31 circuit also has the property of non-pulsating terminal currents at all terminals.

Figure 32:
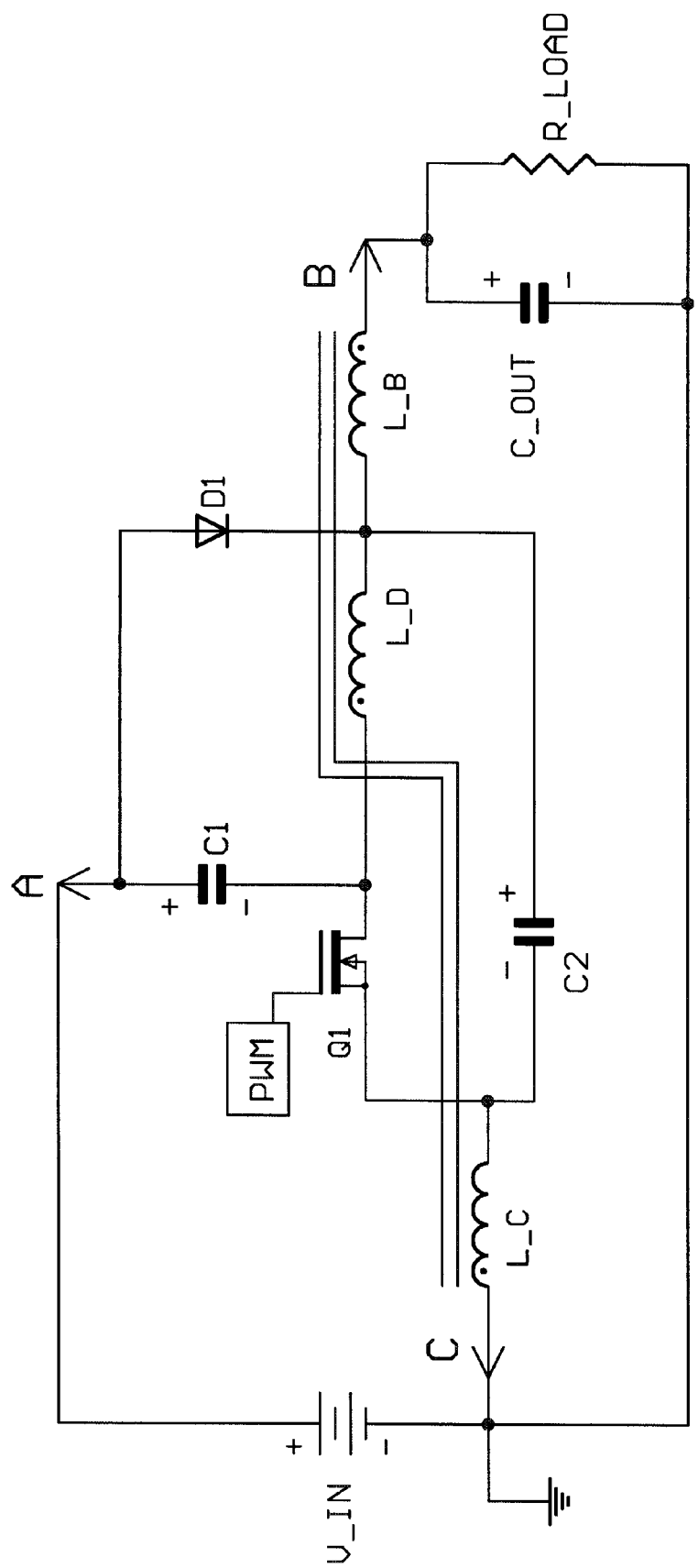
FIG. 32 illustrates the FIG. 25 circuit with the terminals arranged to form a buck complement converter with positive output in which all three inductors are coupled on a single magnetic core and the S1 switch is implemented with a diode and the S2 switch is implemented with a mosfet.

FIG. 32 illustrates the FIG. 25 network configured as a positive output buck complement converter with all terminal currents non-pulsating. Applying the unified PWM SPDT complement transfer function with $V_A=V_{IN}$, $V_B=V_{OUT}$, and $V_C=0$ yields $$V_{OUT} = \frac{1-D'}{1-2 \cdot D'} \cdot V_{IN}, \quad (23)$$

where D'=1−D is the duty cycle of the S2 switch, which is implemented here with a mosfet while the S1 switch is implemented with a diode. The output voltage is greater than the input voltage for D'≦0.5. At D'=0.5 the output voltage goes to infinity and changes sign so the FIG. 32 circuit is intended for operation at duty cycles less than one half.

Figure 33:
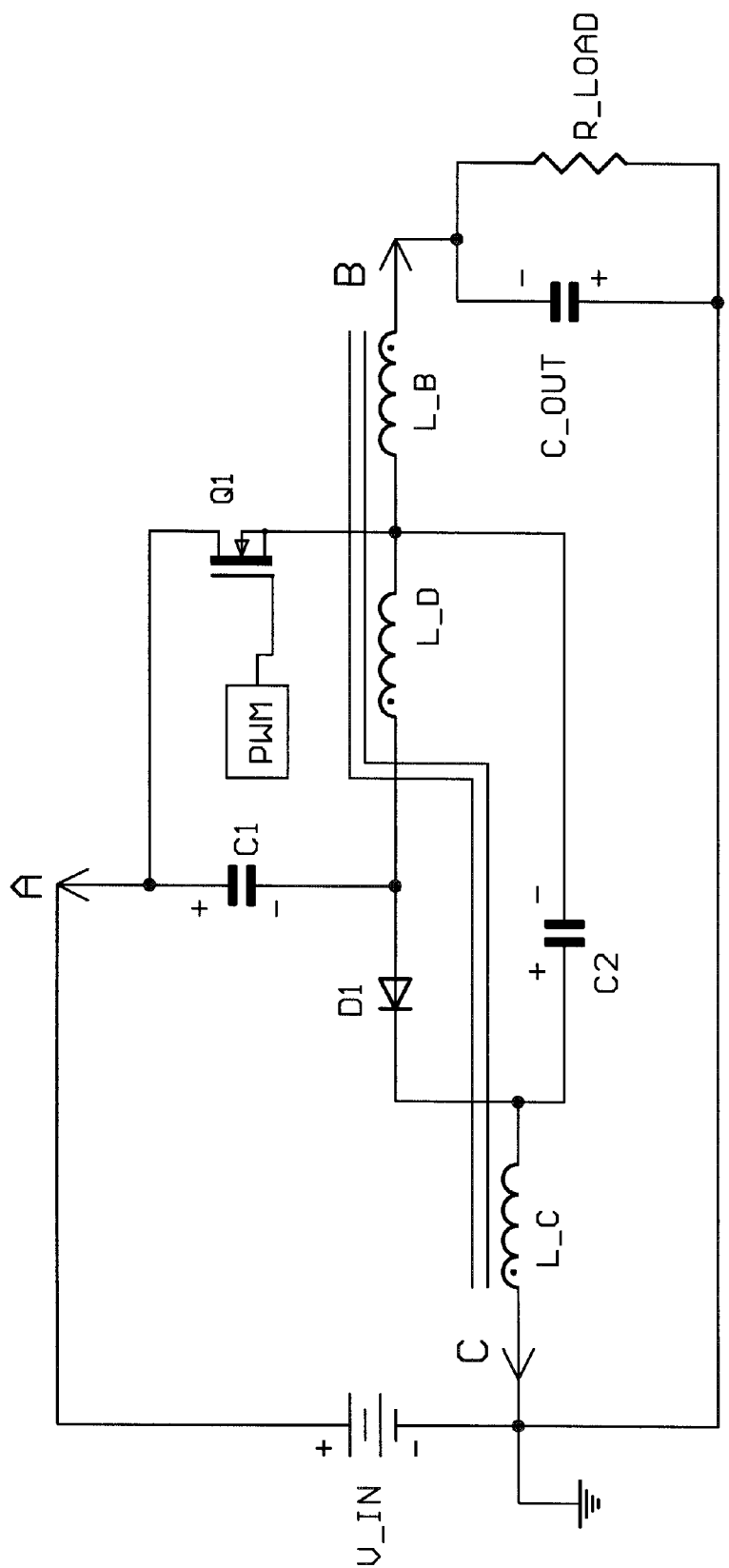
FIG. 33 illustrates the FIG. 25 circuit with the terminals arranged to form a buck complement converter with negative output in which all three inductors are coupled on a single magnetic core and the S2 switch is implemented with a diode and the S1 switch is implemented with a mosfet.

FIG. 33 illustrates the FIG. 25 network configured as a negative output buck complement converter with all terminal currents non-pulsating. The transfer function is $$V_{OUT} = \frac{-D}{12 \cdot -D} \cdot V_{IN}. \quad (24)$$

The output voltage range is zero to negative infinity for duty cycles less than one half. The FIG. 33 circuit is implemented with a mosfet for the S1 switch and a diode for the S2 switch.

PWM SPDT Complement Three Terminal Network With Four Inductors

Figure 34:
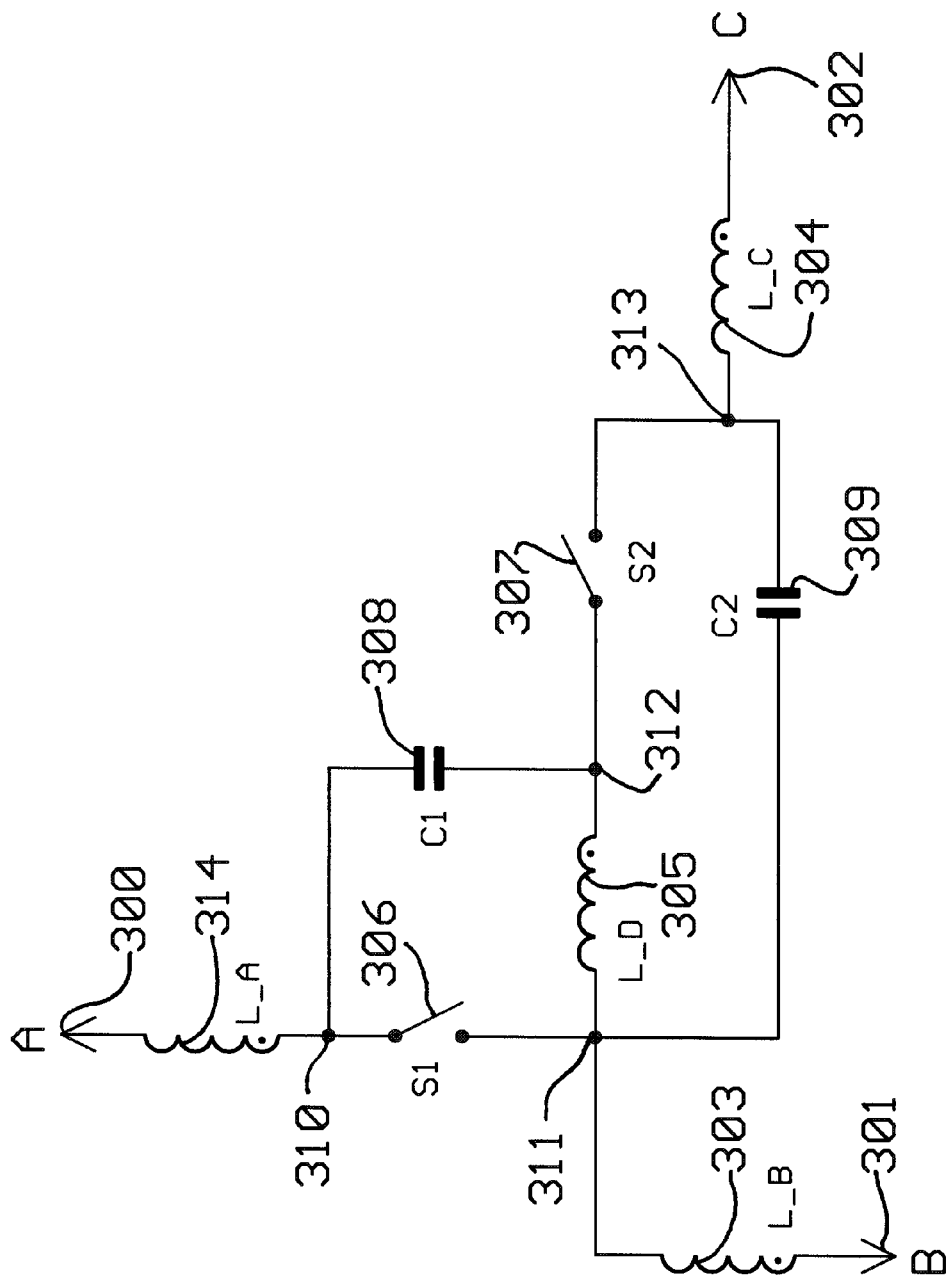
FIG. 34 illustrates a PWM SPDT complement three terminal network according to the subject invention with four inductors and all terminal currents non-pulsating.

FIG. 34 illustrates a three terminal network which is a PWM SPDT complement power conversion network to which the unified PWM SPDT complement transfer function, equation (10) applies. The conversion network contains four inductors, two capacitors, and a pair of switches. The circuit achieves non-pulsating terminal currents for all terminals. This fact is apparent based on the fact that all of the three terminals contain a series inductor. The three terminals are connected to two voltage sources and a load. One of the voltage sources may be ground. No restrictions are imposed on which terminals are connected to which sources or which terminal is connected to the load.

Referring to FIG. 34 there is shown a three terminal PWM SPDT complement power conversion network in which input DC voltages are converted into an output DC voltage. The circuit requires a pair of input sources, one of which may be ground, of substantially DC voltage, four inductors, a pair of switches, and two capacitors coupling the inductors and the switches. For purposes of the operational state analysis, it is assumed that the capacitors are sufficiently large that the voltages developed across the capacitors are approximately constant over a switching interval and equal to the differences in voltage between two of the terminal voltages. We will also assume for purposes of analysis that the inductors are large so that the current in the inductors is invariant over a switching cycle. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction.

Structure

The structure of the circuit of the subject invention is shown in FIG. 34. A first network terminal 300 is connected to an undotted terminal of an inductor 314. A dotted terminal of the inductor 314 is connected to a node 310. The node 310 is connected to a first terminal of a switch 306 and to a first terminal of a capacitor 308. A second terminal of switch 306 is connected to a node 311. A second terminal of capacitor 308 is connected to a node 312. An undotted terminal of an inductor 305 is connected to node 311 and a dotted terminal of inductor 305 is connected to node 312. An undotted terminal of an inductor 303 is connected to node 311. A dotted terminal of inductor 303 is connected to a second network terminal 301. A first terminal of a capacitor 309 is connected to the node 311 and a second terminal of capacitor 309 is connected to a node 313. A first terminal of a switch 307 is connected to the node 312. A second terminal of switch 307 is connected to node 313. An undotted terminal of an inductor 304 is connected to the node 313 and a dotted terminal of inductor 304 is connected to a third network terminal 302.

Operation

Figure 35:
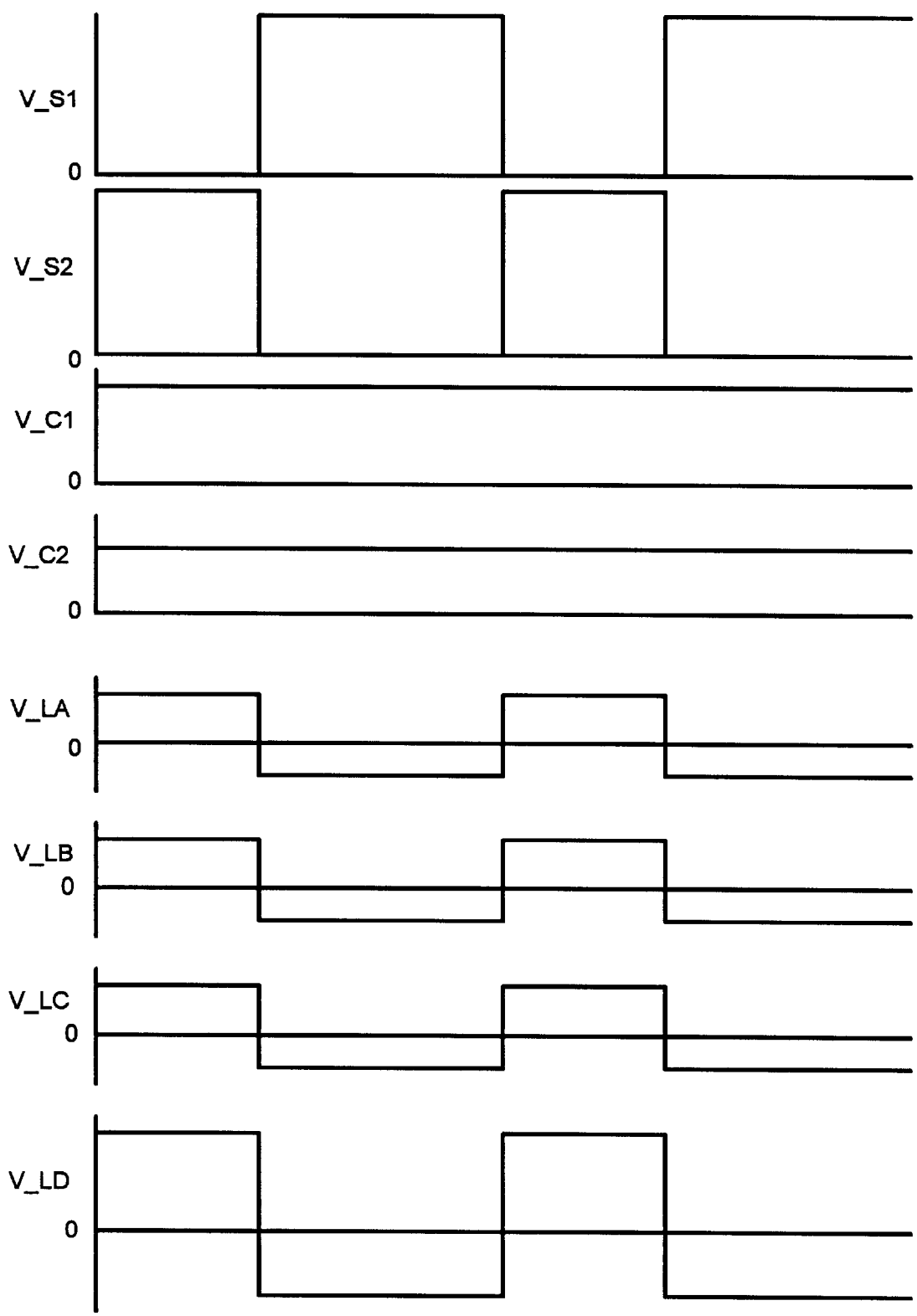
FIG. 35 illustrates the voltage wave forms for each component in the FIG. 34 circuit.
Figure 36:
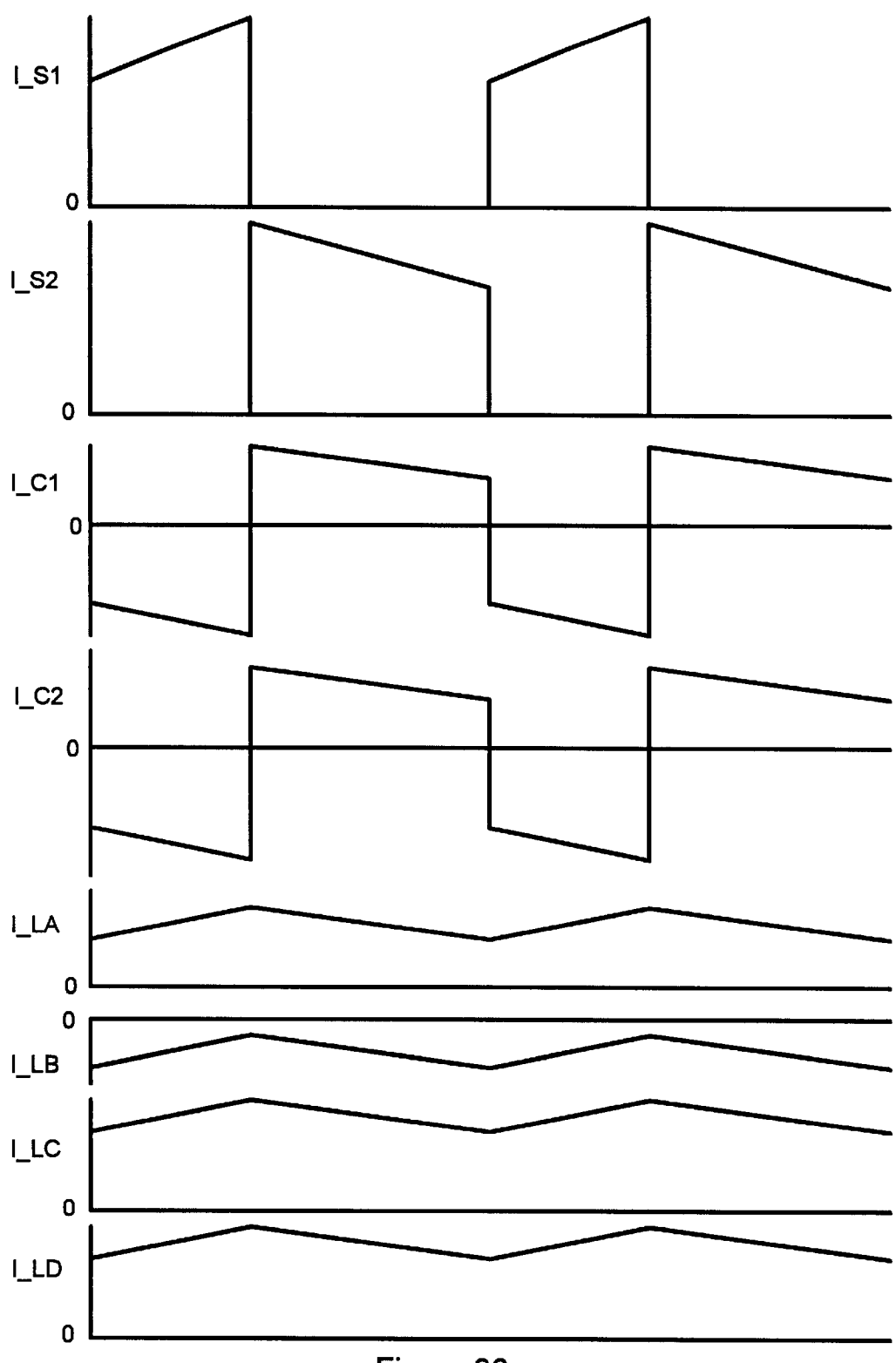
FIG. 36 illustrates the current wave forms for each component in the FIG. 34 circuit.
Figure 37:
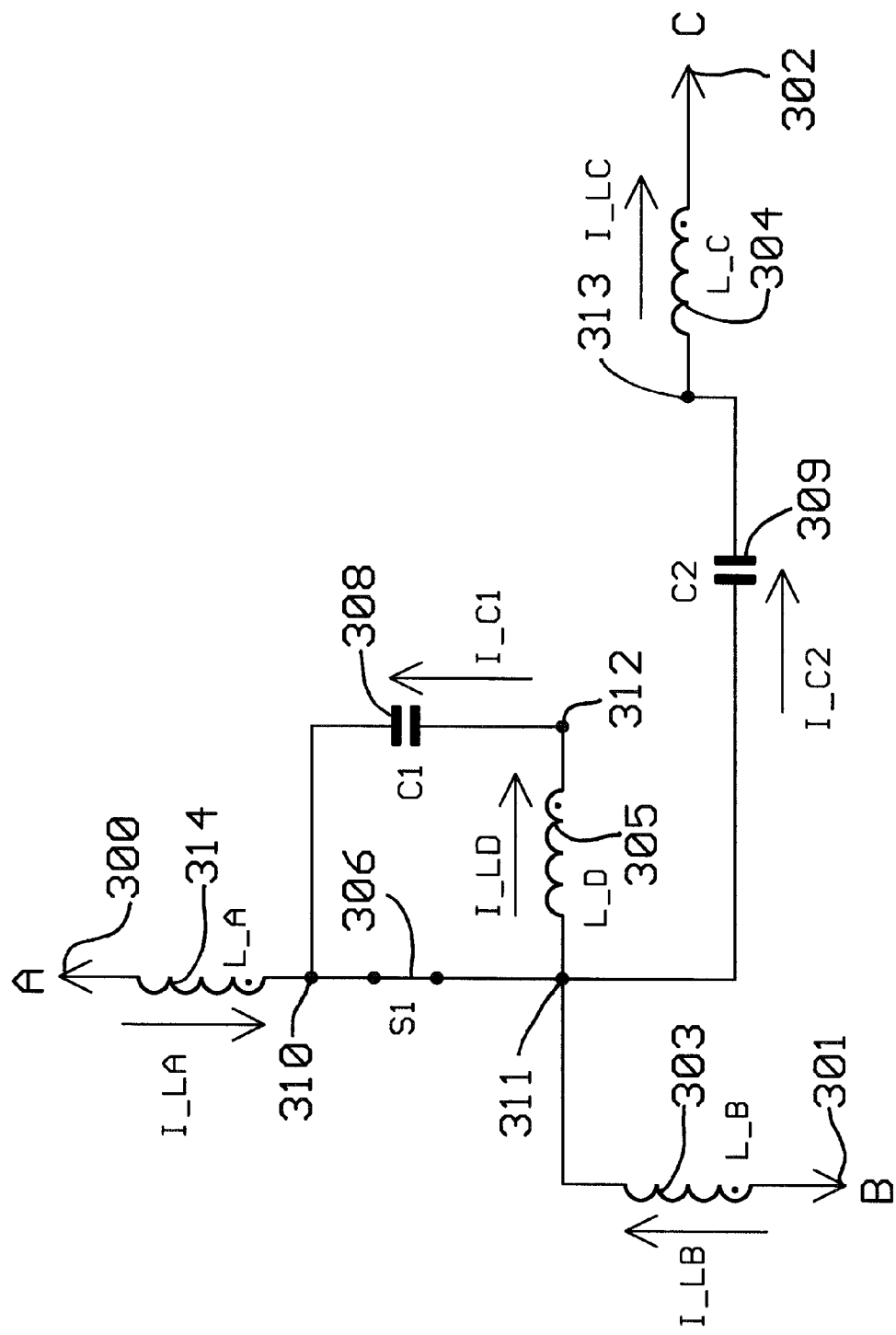
FIG. 37 illustrates an on state of the FIG. 34 circuit.

It is assumed in this analysis that the system has reached a settled operating condition. Except for the short, but finite, switching intervals there are two states of the circuit of FIG. 34, an on state and an off state. We will assume for the operational state analysis that the A first network terminal 300 voltage is more positive than the B second network terminal 301 voltage and that the C third network terminal 302 voltage is more positive than the B second network terminal 301 voltage. The applied voltage to the capacitor 308, Vc1, will be equal to the voltage difference between the A first network terminal 300 voltage, $V_A$ and the B second network terminal 301 voltage, $V_B$, or $V_{C1}=V_A-V_B$. This results from the fact that both terminals of the capacitor 308 are connected to the network terminals 300 and 301 through inductors 314 and 303, respectively, whose average applied voltages are zero. The applied voltage to the capacitor 309, $V_{C2}$, will be equal to the voltage difference between the C third network terminal 302 voltage, $V_C$, and the B second network terminal 301 voltage, $V_B$, or $V_{C2}=V_C-V_B$. This results from the fact that the terminals of the capacitor 309 are connected to the B second network terminal 301 through an inductor 303 and to the C third network terminal 302 through the inductor 304, whose average applied voltages are zero. Consider an initial condition as illustrated in FIG. 37. The initial condition represents the on state. During the initial condition the switch 306 is on (closed) and the switch 307 is off (open). The voltage wave forms for each component are illustrated in FIG. 35. The current wave forms for each component are illustrated in FIG. 36. The current in the inductor 314, $I_{LA}$, is flowing from top to bottom into the undotted terminal and out of the dotted terminal. The current in the inductor 303, $I_{LB}$, is flowing from bottom to top into the dotted terminal and out of the undotted terminal. The current in the inductor 304, $I_{LC}$, is flowing from left to right into the undotted terminal and out of the dotted terminal. The current in the inductor 305, $I_{LD}$, is flowing from left to right into the undotted terminal and out of the dotted terminal. The current in all three inductors will be becoming more positive in value during the on state, where the positive direction is into the undotted terminal and out of the dotted terminal. Since the switch 307 is off (open) the current in the capacitor 308 will be equal to the current in the inductor 305, or $-I_{LD}$, discharging the capacitor 308 and the current in the capacitor 309 will be equal to the current in the inductor 304, or $-I_{LC}$, discharging the capacitor 309. The inductor 305 current, $I_{LD}$, is equal to the inductor 304 current, $I_{LC}$, so that the two capacitors have the same charging current. The current in the first switch 308 will be equal to the sum of the currents in the inductors 314 and 305 or $I_{S1}=I_{LD}+I_{LA}$. The voltage applied to the inductor 305 is equal to the capacitor 308 voltage, $V_{C1}=V_A-V_B$. The voltage between the A first network terminal 300 and the B second network terminal 301 is divided between the inductor 314 voltage and the inductor 303 voltage so that $V_{LA}+V_{LB}=V_A-V_B$. The voltage between the C third network terminal 302 and the B second network terminal 301 is divided between the inductor 304, the capacitor 309, and the inductor 303 so that $V_C-V_B=V_{LB}+V_{C2}-V_{LC}$. Since $V_{C2}=V_C-V_B$ we have $V_{LC}=V_{LB}$.

Figure 38:
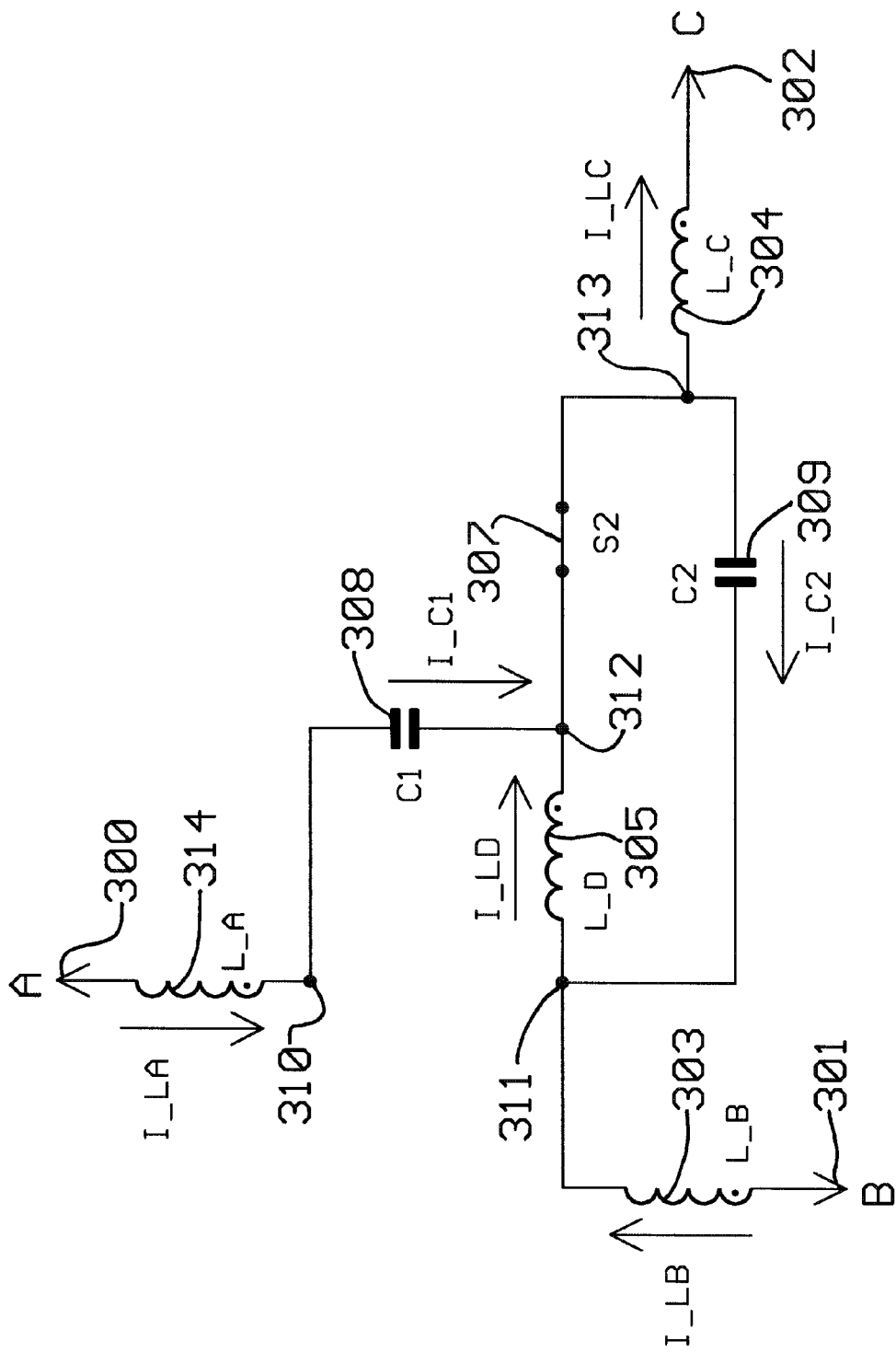
FIG. 38 illustrates an off state of the FIG. 34 circuit.

At a time determined by the control circuit the switches change state so that the S1 switch 306 is off (open) and the S2 switch 307 is on (closed) and the network enters the off state illustrated in FIG. 38. During the off state the currents in all four inductors decrease. With the S1 switch 306 open the inductor 305 current, $I_{LD}$, flows in the S2 switch 307 and the inductor 314 current flows in the capacitor 308. During the off state both capacitors are charged. Since they had the same discharge current during the on state they must have the same charging current during the off state. $I_{LA}$, is the discharge current for the capacitor 308 so $I_{LA}$ must also be the discharge current for the capacitor 309. When the inductors currents have ramped down to their values at the beginning of the on state the switches 306 and 307 change state again and the cycle repeats.

We have already indicated the transfer function for the network which can be readily determined by applying Faraday's Law to set the volt second product for a full cycle for any one of the inductors equal to zero. The universal PWM SPDT complement transfer function was indicated above in equation (17). We can apply the Law of Charge Conservation to the capacitors to find the inductor currents. We find that $$I_A = \frac{D}{1-D} \cdot I_{LC}, \tag{25}$$

$$I_{LB} = \frac{1-2 \cdot D}{1-D} \cdot I_{LC}, \tag{26}$$

and $$I_{LD}=I_{LC}. \tag{27}$$

The desired result is to achieve non-pulsating current at each network terminal. We can see that this must be the case since all of the three network terminal currents must be non-pulsating because they have inductors in series with terminals.

We can have a zero ripple network by judicious choice of self and mutual inductances. Suppose that we couple all four inductors on a single common core such that the inductors 314, 303, and 304 have the same inductance L and the same number of turns and these three inductors are tightly coupled to each other with a mutual inductance of M which is very nearly equal to L. Suppose also that the inductor 305 is loosely coupled to the other three inductors and that the mutual inductance of each pair consisting of the inductor 305 and one of the other three inductors is m. Then during the on state the applied voltage to each of the tightly coupled inductors will be $$V_L = \frac{1}{2} \cdot (V_A - V_B)$$

and the applied voltage to the inductor 305 is $V_L$. Applying Faraday's Law to each inductor we have $$V_L = L \cdot \frac{dI_{LA}}{dt} + M \cdot \frac{dI_{LB}}{dt} + M \cdot \frac{dI_{LC}}{dt} + m \cdot \frac{dI_{LD}}{dt} \tag{28}$$

$$V_L = L \cdot \frac{dI_{LB}}{dt} + M \cdot \frac{dI_{LA}}{dt} + M \cdot \frac{dI_{LC}}{dt} + m \cdot \frac{dI_{LD}}{dt} \tag{29}$$

$$V_L = L \cdot \frac{dI_{LC}}{dt} + M \cdot \frac{dI_{LB}}{dt} + M \cdot \frac{dI_{LA}}{dt} + m \cdot \frac{dI_{LD}}{dt} \tag{30}$$

and $2 \cdot V_L = L_D \cdot \frac{dI_{LD}}{dt} + m \cdot \frac{dI_{LA}}{dt} + m \cdot \frac{dI_{LB}}{dt} + m \cdot \frac{dI_{LC}}{dt}.$ (31)

From conservation of charge we have $$\frac{dI_{LA}}{dt} = \frac{dI_{LB}}{dt} + \frac{dI_{LC}}{dt}. \tag{32}$$

Solving the equations (28) through (32) for $$\frac{dI_{LB}}{dt}$$

and setting the result equal to zero we get the condition $$L_D=2 \cdot m=4 \cdot k^2 \cdot L, \tag{33}$$

where k is the coupling coefficient for any one of the pairs of windings which includes the inductor 305. The same condition given by equation (33) results in zero current slopes for all of the windings except for the winding associated with inductor 305 so that the ripple is zero at all three of the network terminals simultaneously. The condition given by equation (33) can be realized by choosing the number of turns for the D winding to be slightly less than twice the number of turns for the other three windings and physically separating the D winding from the other three windings. Adjusting the core gap can effect the coupling coefficient if the gap separates the windings in addition to separating the core halves.

Related Embodiments

Figure 39:
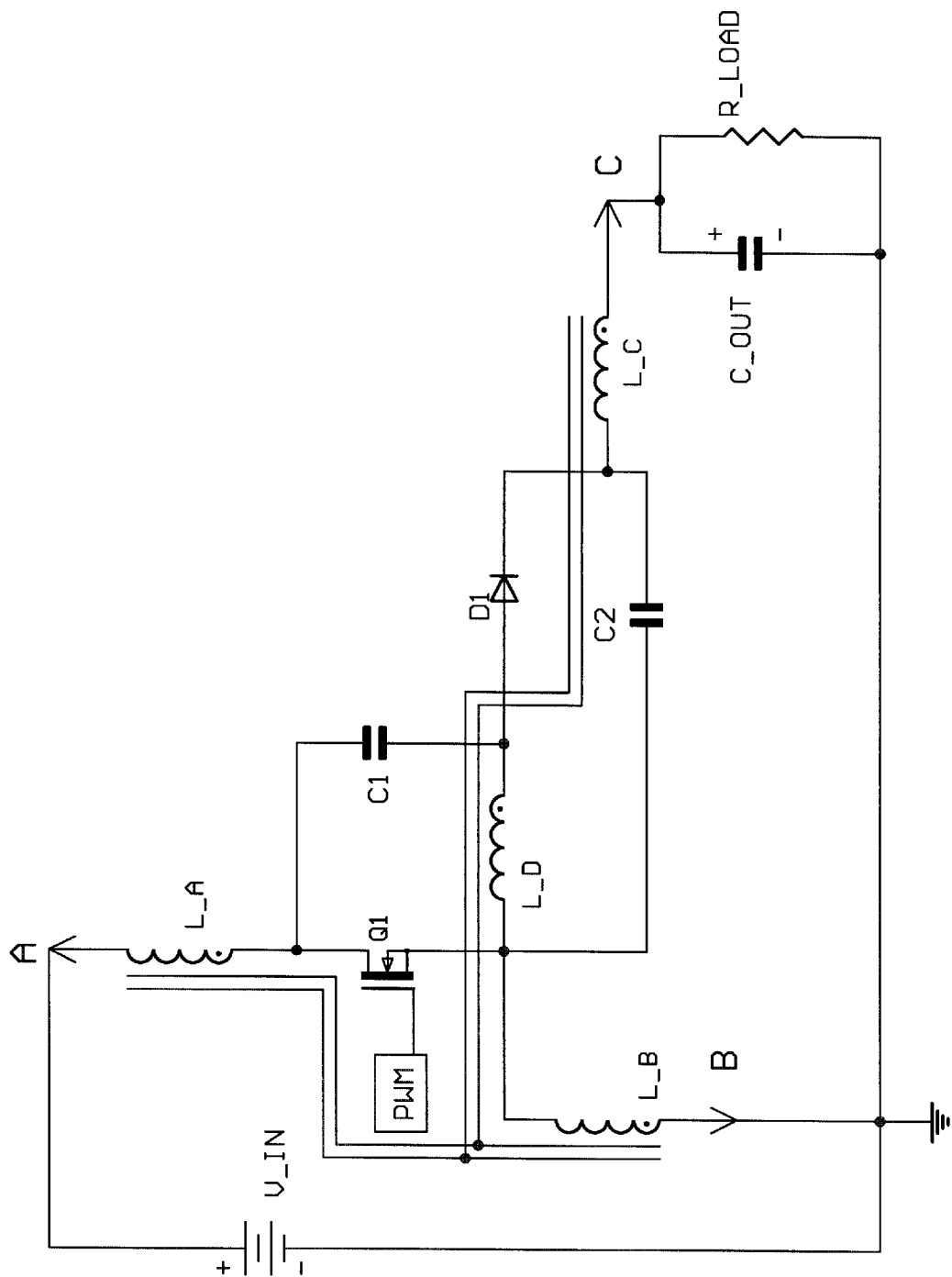
FIG. 39 illustrates the FIG. 34 circuit with the terminals connected to form a flyback complement converter in which all four inductors are coupled on a single magnetic core and the S1 switch is implemented with a mosfet and the S2 switch is implemented with a diode.

FIG. 39 illustrates an embodiment of the FIG. 34 network in which all four inductors are coupled on a single common core. The FIG. 39 circuit is a flyback complement implementation of the FIG. 34 circuit which will be recognized as a non-pulsating implementation of a SEPIC converter. Applying the unified PWM SPDT complement transfer function, equation (17), with $V_B=0$, $V_A=V_{IN}$, and $V_C=V_{OUT}$ yields the transfer function for the SEPIC converter $$V_{OUT} = \frac{D}{1-D} \cdot V_{IN}. \tag{34}$$

The transfer function is exactly equal to the negative of the transfer function for a flyback or buck boost converter. The output voltage range of the flyback is from zero to negative infinity. The output voltage range for the flyback complement is from zero to positive infinity. The FIG. 39 implementation uses a mosfet for the S1 switch 306 and a diode for the S2 switch 307.

Figure 40:
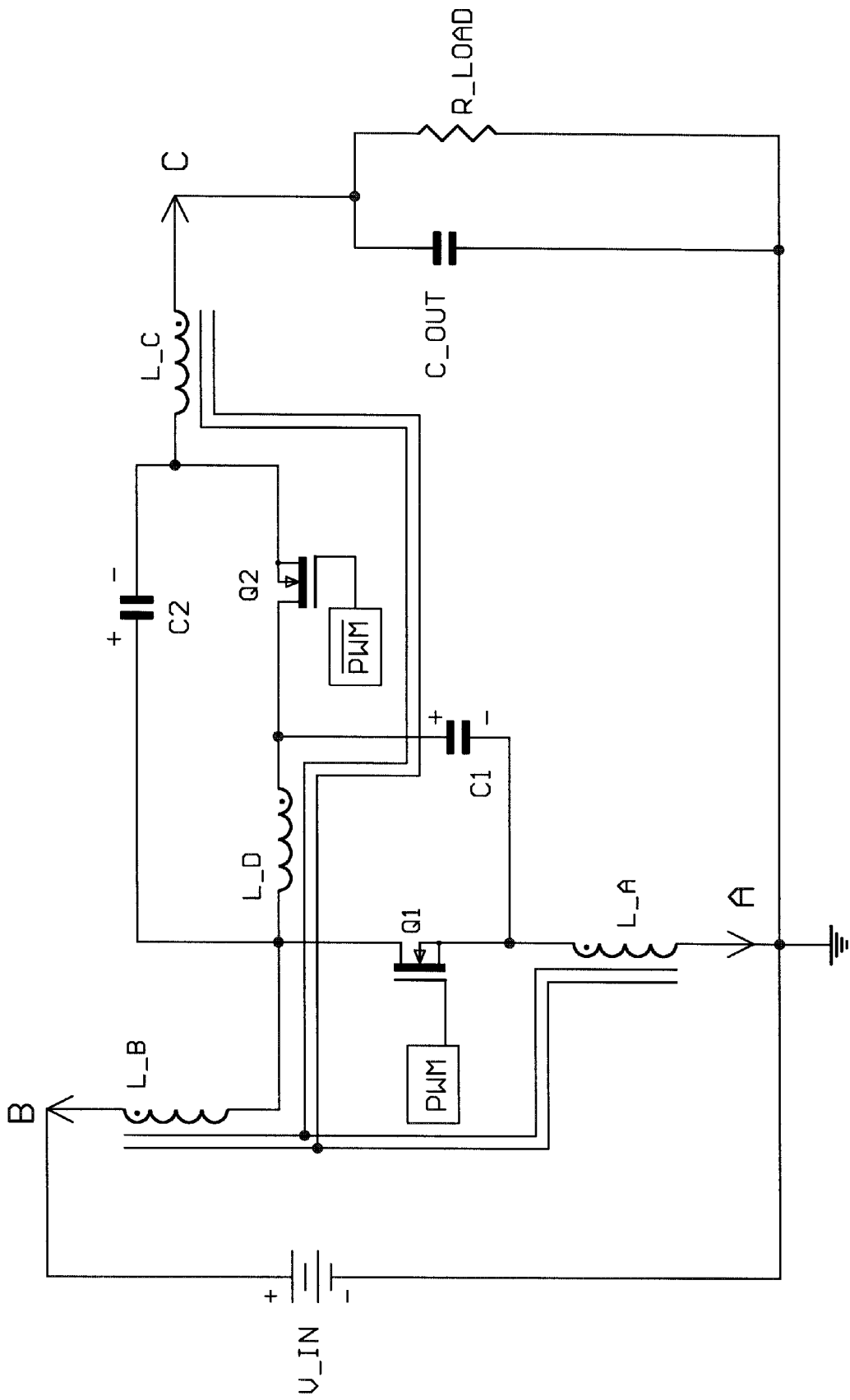
FIG. 40 illustrates the FIG. 34 circuit with the terminals arranged to form a boost complement converter in which all four inductors are coupled on a single magnetic core and both the S1 and S2 switches are implemented with power mosfets.

FIG. 40 illustrates a boost complement implementation of the FIG. 34 network. Both switches are implemented with mosfets so that power flow in two directions is possible. In this case $V_A=0$, $V_B=V_{IN}$, and $V_C=V_{OUT}$. By making these substitutions in the unified PWM SPDT complement transfer function we get the transfer function $$V_{OUT} = \frac{1-2 \cdot D}{1-D} \cdot V_{IN}. \tag{35}$$

This function yields $V_{OUT}=V_{IN}$, for D=0, $V_{OUT}=0$, for D=0.5, and $V_{OUT}=-\infty$ for D=1. Since the output voltage range of a boost converter is $V_{IN}$ to infinity one can see how this is a boost complement. This circuit has the unique ability to convert a positive voltage to either a positive or a negative voltage and to generate an AC output wave form from a positive supply with DC coupling using only two switches, one magnetic, and two capacitors. The FIG. 40 circuit also has the property of non-pulsating terminal currents at all terminals.

Figure 41:
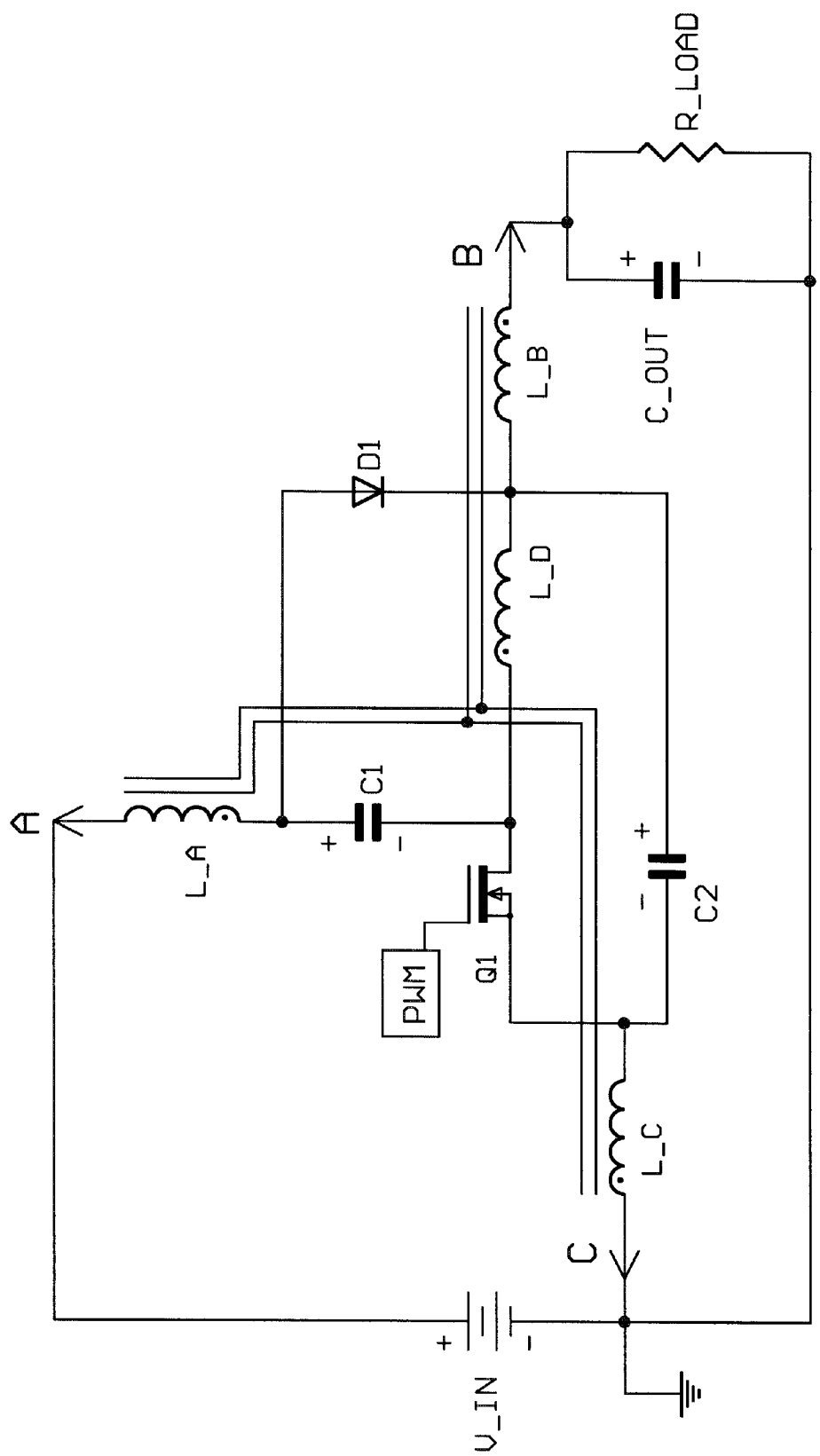
FIG. 41 illustrates the FIG. 34 circuit with the terminals arranged to form a buck complement converter with positive output in which all four inductors are coupled on a single magnetic core and the S1 switch is implemented with a diode and the S2 switch is implemented with a mosfet.

FIG. 41 illustrates the FIG. 34 network configured as a positive output buck complement converter with all terminal currents non-pulsating. Applying the unified PWM SPDT complement transfer function with $V_A=V_{IN}$, $V_B=V_{OUT}$, and $V_C=0$ yields $$V_{OUT} = \frac{1-D'}{1-2 \cdot D'} \cdot V_{IN}, \tag{36}$$

where D'=1−D is the duty cycle of the S2 switch, which is implemented here with a mosfet while the S1 switch is implemented with a diode. The output voltage is greater than the input voltage for D'≦0.5. At D'=0.5 the output voltage goes to infinity and changes sign so the FIG. 32 circuit is intended for operation at duty cycles less than one half.

Figure 42:
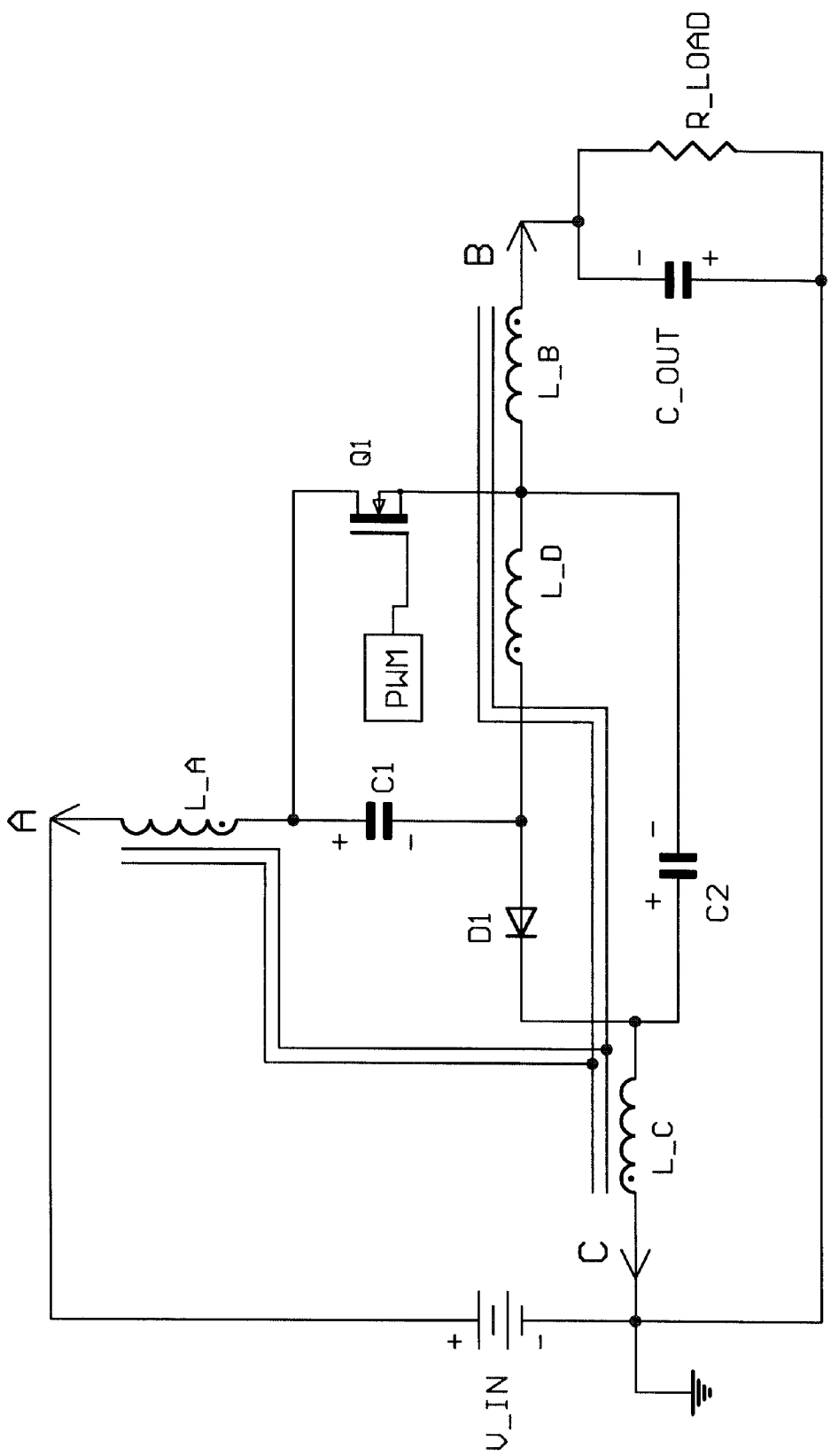
FIG. 42 illustrates the FIG. 34 circuit with the terminals arranged to form a buck complement converter with negative output in which all three inductors are coupled on a single magnetic core and the S2 switch is implemented with a diode and the S1 switch is implemented with a mosfet.

FIG. 42 illustrates the FIG. 34 network configured as a negative output buck complement converter with all terminal currents non-pulsating. The transfer function is $$V_{OUT} = \frac{-D}{1-2 \cdot D} \cdot V_{IN}. \tag{37}$$

The output voltage range is zero to negative infinity for duty cycles less than one half. The FIG. 42 circuit is implemented with a mosfet for the S1 switch and a diode for the S2 switch.

Figure 43:
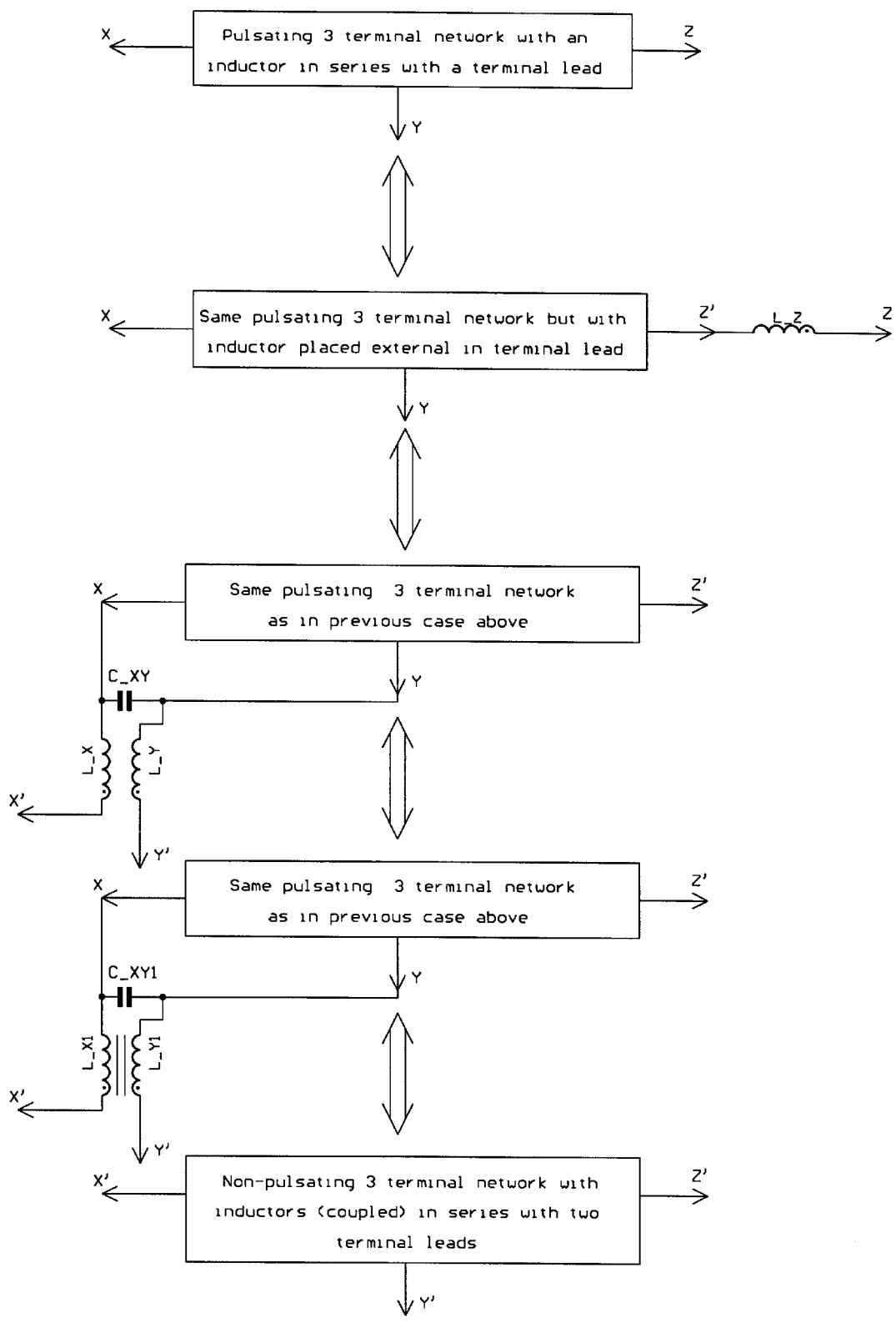
FIG. 43 illustrates a generalized methodology for transforming pulsating three terminal networks with an inductor in series with one of the terminal leads to equivalent non-pulsating three terminal networks with inductors in series with two of the terminal leads.

FIG. 43 illustrates a general procedure for transforming a three terminal network with pulsating terminal currents in two of its three terminals with an inductor in series with one of its three terminals at which the terminal current is non-pulsating into a three terminal network with inductors in two of its three terminals and non-pulsating currents in all three terminals. The FIG. 43 procedure creates two inductors and a capacitor that did not previously existed. The inductors are added in series with the two terminals that do not connect to the inductor that is to be removed. The capacitor is added to connect the two terminals of the original network that do not connect directly to the inductor that is to be removed. This procedure does not generally apply if the current in the inductor to be removed is not equal at all times to the current in the terminal to which it is connected.

Figure 44:
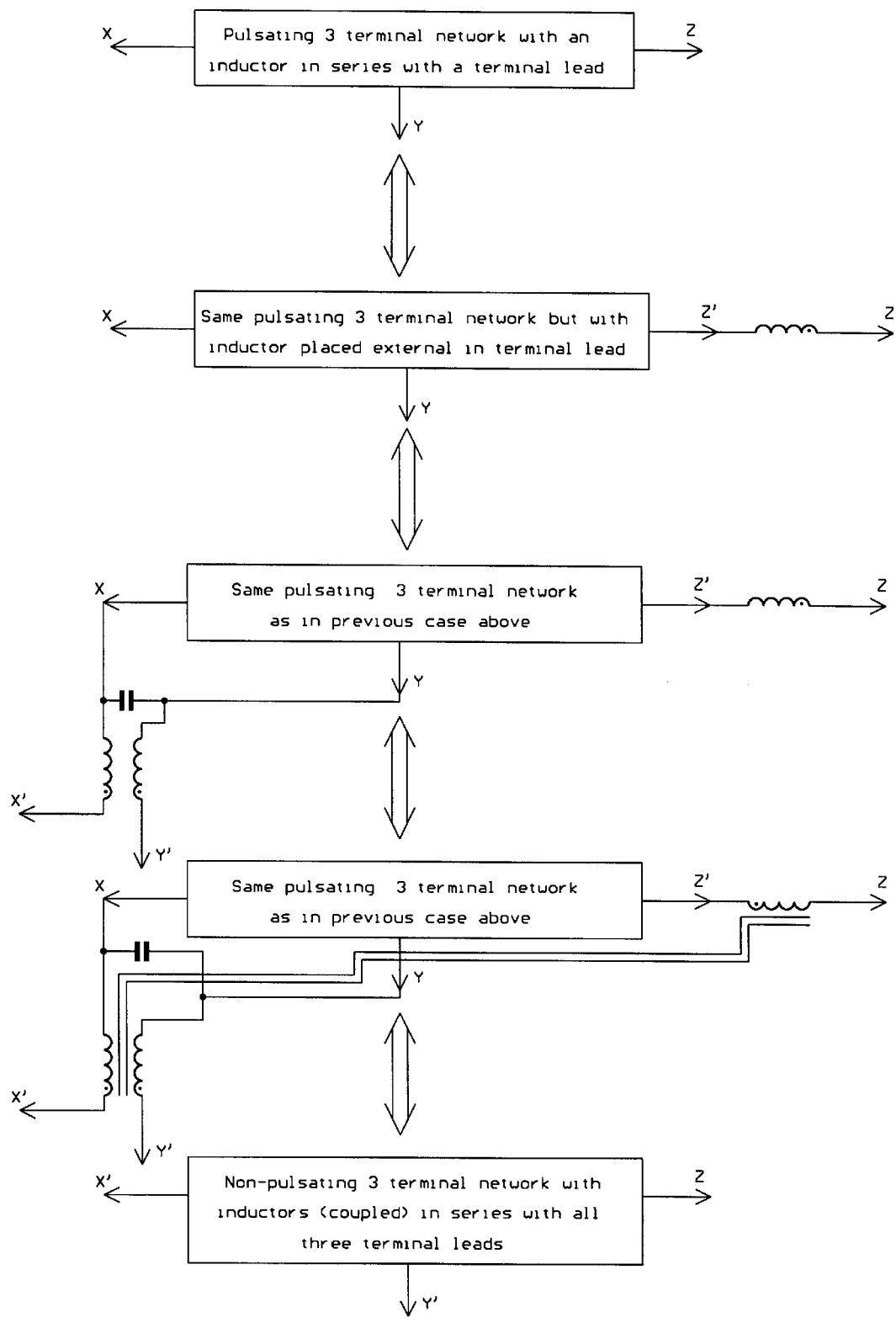
FIG. 44 illustrates a generalized methodology for transforming pulsating three terminal networks with an inductor in series with one of the terminal leads to equivalent non-pulsating three terminal networks with inductors in series with all three terminal leads

FIG. 44 illustrates another procedure, similar to the procedure described above and illustrated in FIG. 43, that adds two additional inductors, as shown, but does not remove the original inductor. The same conditions apply to the original network for this procedure as for the procedure described above. This procedure does not generally apply if the current in an inductor in the original network is not equal at all times to the current in a terminal to which it is connected.

Conclusions, Ramifications, and Scope of Invention

Thus the reader will see that the three terminal converter networks of the subject invention provide relatively simple mechanisms for converting a DC voltage at one level to a DC voltage at a different level with all terminal currents non-pulsating. In addition, in many cases, these results can be achieved using a single coupled inductor.

While my above description contains many specificities, these should not be construed as limitations on the scope of the invention, but rather as exemplifications of preferred embodiments thereof. Many other variations are possible. For example, interleaved, parallel DC to DC converters with two or more parallel DC to DC converter sections using common input and output filter capacitors, DC to DC converters similar to those shown but which have instead high AC ripple voltages on input filter capacitors, DC to DC converters, similar to those shown in the drawings, but where the DC input source is instead a varying rectified AC signal, converters with multiple isolated outputs, cascaded converters containing multiple connected conversion networks of the type revealed here, converters in which the output is an AC voltage with a frequency less than the switching frequency of the converter network, converters similar to those described here but with one or both of the switches replaced by zero voltage transition switching cells. Accordingly, the scope of the invention should be determined not by the embodiments illustrated, but by the appended claims and their legal equivalents.

I claim:

1. A three terminal power conversion network comprising, a first network terminal, a first inductor having first and second terminals with said first terminal of said first inductor connected to said first network terminal, first switch means having first and second terminals with said first terminal of said first switch means connected to said second terminal of said first inductor, a first capacitor having first and second terminals with said first terminal of said first capacitor connected to said first terminal of said first switch means and to said second terminal of said first inductor, second switch means having first and second terminals with said first terminal of said second switch means connected to said second terminal of said first switch means and with said second terminal of said second switch means connected to said second terminal of said first capacitor, operable substantially in anti-synchronization to said first switch means, a second inductor having first and second terminals with said second terminal of said second inductor connected to said second terminal of said first capacitor and to said second terminal of said second switch means, a second network terminal connected to said first terminal of said second inductor, a third inductor having first and second terminals with said first terminal of said third inductor connected to said second terminal of said first switch means and to said first terminal of said second switch means, a third network terminal connected to said second terminal of said third inductor, whereby one of said first, said second, or said third network terminals is connected to a load and the remaining two of said first, said second, and said third network terminals are connected to substantially DC voltage sources, one of which sources may be ground or common, thereby forming a complete power converter circuit with the property of non-pulsating terminal currents at all said network terminals.

2. The network of claim 1 wherein said switch means comprise semiconductor switch means.

3. The network of claim 2 wherein said first, said second, and said third inductors are integrated on a single common core.

4. The network of claim 3 wherein the self inductances of said inductors and the mutual inductances of said inductor pairs are set to achieve zero ripple current at on of or all of said network terminals.

5. The network of claim 3 further comprising
a second capacitor placed in series with said first capacitor,
a fourth inductor having first and second terminals with said first terminal of said inductor connected to said third network terminal and with said second terminal of said fourth inductor connected to the junction of said first capacitor and said second capacitor,
whereby said fourth inductor is magnetically coupled to said first, said second, and said third inductors on a single common core and the self inductance of said fourth inductor is set to achieve zero ripple current slope at said first, said second, and said third network terminals.

6. A three terminal power conversion network comprising,
a first network terminal,
first switch means having first and second terminals with said first terminal of said first switch means connected to said first network terminal,
a first capacitor having first and second terminals with said first terminal of said first capacitor connected to said first network terminal and to said first terminal of said first switch means,
a first inductor having first and second terminals with said first terminal of said first inductor connected to said second terminal of said first switch means and with said second terminal of said first inductor connected to said second terminal of said first capacitor,
a second inductor having first and second terminals with said first terminal of said second inductor connected to said second terminal of said first switch means and to said first terminal of said first inductor,
a second network terminal connected to said second terminal of said second inductor,
second switch means having first and second terminals with said first terminal of said second switch means connected to said second terminal of said first capacitor and to said second terminal of said first inductor, operable substantially in anti-synchronization to said first switch means,
a second capacitor having first and second terminals with said first terminal of said second capacitor connected to said second terminal of said first switch means and to said first terminal of said first inductor and to said first terminal of said second inductor and with said second terminal of said second capacitor connected to said second terminal of said second switch means,
a third inductor having first and second terminals with said first terminal of said third inductor connected to said second terminal of said second switch means and to said second terminal of said second capacitor,
a third network terminal connected to said second terminal of said third inductor,
whereby one of said first, said second, or said third network terminals is connected to a load and the remaining two of said first, said second, and said third network terminals are connected to substantially DC voltage sources, one of which sources may be ground or common, thereby forming a complete power converter circuit with the property of non-pulsating terminal currents at all said network terminals.

7. The network of claim 6 wherein said switch means comprise semiconductor switch means.

8. The network of claim 6 wherein said first, said second, and said third inductors are integrated on a single common core.

9. A three terminal power conversion network comprising,
a first network terminal,
first switch means having first and second terminals,
a first capacitor having first and second terminals with said first terminal of said first capacitor connected to said first terminal of said first switch means,
a first inductor having first and second terminals with said first terminal of said first inductor connected to said second terminal of said first switch means and with said second terminal of said first inductor connected to said second terminal of said first capacitor,
a second inductor having first and second terminals with said first terminal of said second inductor connected to said second terminal of said first switch means and to said first terminal of said first inductor,
a second network terminal connected to said second terminal of said second inductor,
second switch means having first and second terminals with said first terminal of said second switch means connected to said second terminal of said first capacitor and to said second terminal of said first inductor, operable substantially in anti-synchronization to said first switch means,
a second capacitor having first and second terminals with said first terminal of said second capacitor connected to said second terminal of said first switch means and to said first terminal of said first inductor and to said first terminal of said second inductor and with said second terminal of said second capacitor connected to said second terminal of said second switch means,
a third inductor having first and second terminals with said first terminal of said third inductor connected to said second terminal of said second switch means and to said second terminal of said second capacitor,
a third network terminal connected to said second terminal of said third inductor,
a fourth inductor having first and second terminals with said first terminal of said fourth inductor connected to said first network terminal and with said second terminal of said fourth inductor connected to said first terminal of said first switch means and to said first terminal of said first capacitor,
whereby one of said first, said second, or said third network terminals is connected to a load and the remaining two of said first, said second, and said third network terminals are connected to substantially DC voltage sources, one of which sources may be ground or common, thereby forming a complete power converter circuit with the property of non-pulsating terminal currents at all said network terminals.

10. The network of claim 9 wherein said switch means comprise semiconductor switch means.

11. The network of claim 9 wherein said first, said second, and said third inductors are integrated on a single common core.

12. The network of claim 11 wherein the self inductance of said fourth inductor is set to achieve zero ripple current slope at said first, said second, and said third network terminals.

* * * * *